United States Patent
Tabata et al.

(10) Patent No.: US 7,488,269 B2
(45) Date of Patent: Feb. 10, 2009

(54) AUTOMATIC TRANSMISSION

(75) Inventors: Atsushi Tabata, Okazaki (JP); Akira Hoshino, Nishikamo-gun (JP); Terufumi Miyazaki, Toyota (JP); Atsushi Honda, Seto (JP); Akiharu Abe, Toyota (JP); Hirofumi Ota, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/837,440

(22) Filed: Aug. 10, 2007

(65) Prior Publication Data
US 2007/0287572 A1    Dec. 13, 2007

Related U.S. Application Data

(62) Division of application No. 10/893,388, filed on Jul. 19, 2004, now Pat. No. 7,276,011.

(30) Foreign Application Priority Data

Aug. 18, 2003 (JP) .............. 2003-294279
Aug. 18, 2003 (JP) .............. 2003-294280

(51) Int. Cl.
*F16H 3/44* (2006.01)
(52) U.S. Cl. .............. 475/286; 475/317; 475/323; 475/329; 475/330
(58) Field of Classification Search .............. 475/275, 475/286, 317, 323, 329, 330
See application file for complete search history.

(56) References Cited

U.S. PATENT DOCUMENTS

| | | | |
|---|---|---|---|
| 3,835,732 A | 9/1974 | Mori et al. |
| 6,634,980 B1 | 10/2003 | Ziemer |
| 6,758,784 B2 | 7/2004 | Lee et al. |
| 6,960,149 B2 | 11/2005 | Ziemer |
| 7,101,305 B2 | 9/2006 | Tabata et al. |
| 2003/0232685 A1 | 12/2003 | Sugihara et al. |
| 2004/0185984 A1 | 9/2004 | Haka |
| 2004/0242366 A1 | 12/2004 | Tabata et al. |
| 2004/0248694 A1 | 12/2004 | Ishimaru |

(Continued)

FOREIGN PATENT DOCUMENTS

DE    101 15 983 A1    10/2002

(Continued)

*Primary Examiner*—David D. Le
(74) *Attorney, Agent, or Firm*—Oblon, Spivak, McClelland, Maier & Neustadt, P.C.

(57)    ABSTRACT

An automatic transmission having first and second groups of successive forward-drive positions for outputting a rotary motion a speed of which is higher than the speed of a rotary motion received from an input member, the first group being established by an engaging action of a first input clutch while the second group being established by an engaging action of a second input clutch, or first and second groups of successive forward-drive positions for reducing the speed of the rotary motion received from the input member, the first and second groups being established by an engaging action of a first and second input clutches respectively. The successive operating positions of the first group have respective speed ratios different from those of the second group. The automatic transmission is shiftable to a selected one of the successive operating positions of a selected one of the first and second groups.

32 Claims, 16 Drawing Sheets

U.S. PATENT DOCUMENTS

2005/0003924 A1    1/2005    Tabata et al.

FOREIGN PATENT DOCUMENTS

| | | |
|---|---|---|
| JP | 8-105496 | 4/1996 |
| JP | 2956173 | 7/1999 |
| JP | 2000-199549 | 7/2000 |
| JP | 2000-266138 | 9/2000 |
| JP | 2001-82555 | 3/2001 |
| JP | 2001-182785 | 7/2001 |
| JP | 2002-206601 | 7/2002 |
| JP | 2002-227940 | 8/2002 |
| JP | 2002-295609 | 10/2002 |
| JP | 2002-323098 | 11/2002 |
| JP | 2003-130152 | 5/2003 |
| WO | WO 02079669 A1 | 10/2002 |

|  | C1 | C2 | C3 | C4 | B1 | B2 | B3 | SPEED RATIO | STEPPING RATIO |
|---|---|---|---|---|---|---|---|---|---|
| 1st | O |  |  |  |  |  | O | 4.169 | 1.359 |
| 2nd | O |  |  |  |  | O |  | 3.067 | 1.351 |
| 3rd | O |  |  | O |  |  |  | 2.271 | 1.301 |
| 4th | O | O |  |  |  |  |  | 1.745 | 1.321 |
| 5th | O |  | O |  |  |  |  | 1.321 | 1.321 |
| 6th |  |  | O | O |  |  |  | 1.000 | 1.282 |
| 7th |  | O | O |  |  |  |  | 0.780 | 1.295 |
| 8th |  |  | O |  | O |  |  | 0.602 | SPREAD 6.921 |
| Rev |  | O |  |  |  | O |  | 2.644 |  |

|      | C1 | C2 | C3 | C4 | B1 | B2 | B3 | SPEED RATIO | STEPPING RATIO |
|------|----|----|----|----|----|----|----|-------------|----------------|
| 1st  | O  |    |    |    |    |    | O  | 4.169       |                |
| 2nd  | O  |    |    |    |    | O  |    | 3.067       | 1.359          |
| 3rd  | O  |    |    | O  |    |    |    | 2.271       | 1.351          |
| 4th  | O  | O  |    |    |    |    |    | 1.745       | 1.301          |
| 5th  | O  |    | O  |    |    |    |    | 1.321       | 1.321          |
| 6th  |    |    | O  | O  |    |    |    | 1.000       | 1.321          |
| 7th  |    | O  |    | O  |    |    |    | 0.811       | 1.232          |
| 8th  |    |    | O  |    | O  |    |    | 0.648       | 1.253          |
| Rev  |    | O  |    |    |    | O  |    | 2.644       | SPREAD 6.433   |

|  | C1 | C2 | C3 | C4 | B1 | B2 | B3 | SPEED RATIO | STEPPING RATIO |
|---|---|---|---|---|---|---|---|---|---|
| 1st | O |  |  |  |  |  | O | 4.169 | 1.359 |
| 2nd | O |  |  |  |  | O |  | 3.067 | 1.351 |
| 3rd | O |  |  |  | O |  |  | 2.271 | 1.301 |
| 4th | O | O |  |  |  |  |  | 1.745 | 1.321 |
| 5th | O |  |  | O |  |  |  | 1.321 | 1.321 |
| 6th |  |  | O | O |  |  |  | 1.000 | 1.282 |
| 7th |  | O |  | O |  |  |  | 0.780 | 1.295 |
| 8th |  |  | O | O |  |  |  | 0.602 | SPREAD |
| Rev |  | O |  |  |  | O |  | 2.644 | 6.921 |

|   | C1 | C2 | C3 | C4 | B1 | B2 | B3 | SPEED RATIO | STEPPING RATIO |
|---|---|---|---|---|---|---|---|---|---|
| 1st | O |   |   |   |   |   | O | 4.169 | 1.359 |
| 2nd | O |   |   |   |   | O |   | 3.067 | 1.351 |
| 3rd | O |   |   | O |   |   |   | 2.271 | 1.301 |
| 4th | O | O |   |   |   |   |   | 1.745 | 1.321 |
| 5th | O |   |   | O |   |   |   | 1.321 | 1.321 |
| 6th |   |   | O | O |   |   |   | 1.000 | 1.308 |
| 7th |   | O | O |   |   |   |   | 0.765 | 1.316 |
| 8th |   |   | O |   | O |   |   | 0.581 | SPREAD 7.175 |
| Rev |   | O |   |   |   | O |   | 2.644 |  |

|  | C1 | C2 | C3 | C4 | B1 | B2 | B3 | SPEED RATIO | STEPPING RATIO |
|---|---|---|---|---|---|---|---|---|---|
| 1st | O |  |  |  |  |  | O | 4.169 | 1.359 |
| 2nd | O |  |  |  |  | O |  | 3.067 | 1.351 |
| 3rd | O |  |  |  | O |  |  | 2.271 | 1.301 |
| 4th | O | O |  |  |  |  |  | 1.745 | 1.321 |
| 5th | O |  | O |  |  |  |  | 1.321 | 1.321 |
| 6th |  |  | O | O |  |  |  | 1.000 | 1.282 |
| 7th |  | O | O |  |  |  |  | 0.780 | 1.295 |
| 8th |  |  | O | O |  |  |  | 0.602 | SPREAD |
| Rev |  |  | O |  |  | O |  | 2.644 | 6.921 |

|  | C1 | C2 | C3 | C4 | B1 | B2 | B3 | SPEED RATIO | STEPPING RATIO |
|---|---|---|---|---|---|---|---|---|---|
| 1st | ○ |  |  |  |  |  | ○ | 4.169 | 1.359 |
| 2nd | ○ |  |  |  |  | ○ |  | 3.067 | 1.351 |
| 3rd | ○ |  |  | ○ |  |  |  | 2.271 | 1.301 |
| 4th | ○ | ○ |  |  |  |  |  | 1.745 | 1.321 |
| 5th | ○ |  | ○ |  |  |  |  | 1.321 | 1.321 |
| 6th |  |  | ○ | ○ |  |  |  | 1.000 | 1.119 |
| 7th |  | ○ |  | ○ |  |  |  | 0.894 | 1.142 |
| 8th |  |  | ○ | ○ |  |  |  | 0.783 | SPREAD 5.324 |
| Rev |  | ○ |  |  |  | ○ |  | 2.644 |  |

|  | C1 | C2 | C3 | C4 | C5 | B1 | B2 | SPEED RATIO | STEPPING RATIO |
|---|---|---|---|---|---|---|---|---|---|
| 1st | O |  |  |  |  |  | O | 5.014 | 1.669 |
| 2nd | O |  |  |  |  | O |  | 3.005 | 1.502 |
| 3rd | O | O |  |  |  |  |  | 2.000 | 1.334 |
| 4th | O |  |  | O |  |  |  | 1.499 | 1.200 |
| 5th | O |  | O |  |  |  |  | 1.249 | 1.249 |
| 6th |  |  | O | O |  |  |  | 1.000 | 1.250 |
| 7th |  | O | O |  |  |  |  | 0.800 | 1.200 |
| 8th |  |  | O |  |  | O |  | 0.667 | SPREAD 7.521 |
| Rev |  | O |  |  |  |  | O | 4.000 |  |

|      | C1  | C2 | C3 | C4 | C5 | B1 | B2 | SPEED RATIO | STEPPING RATIO |
|------|-----|----|----|----|----|----|----|-------------|----------------|
| 1st  |     |    |    |    | O  |    | O  | 4.286       | 1.552          |
| 2nd  |     |    |    |    | O  | O  |    | 2.762       | 1.381          |
| 3rd  | (O) | O  |    |    | O  |    |    | 2.000       | 1.334          |
| 4th  | O   |    |    | O  |    |    |    | 1.499       | 1.200          |
| 5th  | O   |    | O  |    |    |    |    | 1.249       | 1.249          |
| 6th  |     |    | O  | O  |    |    |    | 1.000       | 1.250          |
| 7th  |     | O  | O  |    |    |    |    | 0.800       | 1.200          |
| 8th  |     | O  |    |    |    | O  |    | 0.667       | SPREAD 6.429   |
| Rev  |     | O  |    |    |    |    | O  | 4.000       |                |

|  | C1 | C2 | C3 | C4 | C5 | B1 | B2 | SPEED RATIO | STEPPING RATIO |
|---|---|---|---|---|---|---|---|---|---|
| 1st | ○ |  |  |  |  |  | ○ | 3.550 | 1.445 |
| 2nd | ○ |  |  |  |  | ○ |  | 2.456 | 1.351 |
| 3rd | ○ | ○ |  |  |  |  |  | 1.818 | 1.348 |
| 4th | ○ |  | ○ |  |  |  |  | 1.349 | 1.349 |
| 5th |  |  | ○ | ○ |  |  |  | 1.000 | 1.263 |
| 6th |  | ○ |  | ○ |  |  |  | 0.792 | 1.254 |
| 7th |  |  |  | ○ |  | ○ |  | 0.632 | 1.200 |
| 8th |  |  | ○ |  |  | ○ |  | 0.526 | SPREAD 6.745 |
| Rev |  | ○ |  |  |  |  | ○ | 2.597 | |

|  | C1 | C2 | C3 | C4 | C5 | B1 | B2 | SPEED RATIO | STEPPING RATIO |
|---|---|---|---|---|---|---|---|---|---|
| 1st |  |  |  |  | ○ |  | ○ | 4.589 | |
| 2nd |  |  |  |  | ○ | ○ |  | 2.839 | 1.616 |
| 3rd |  | ○ |  |  | ○ |  |  | 1.818 | 1.561 |
| 4th |  |  |  | ○ | ○ |  |  | 1.259 | 1.444 |
| 5th |  |  | ○ | ○ |  |  |  | 1.000 | 1.259 |
| 6th |  | ○ |  | ○ |  |  |  | 0.792 | 1.263 |
| 7th |  |  | ○ |  |  | ○ |  | 0.632 | 1.254 |
| 8th |  |  |  | ○ |  | ○ |  | 0.526 | 1.200 |
| Rev |  | ○ |  |  |  |  | ○ | 2.597 | SPREAD 8.719 |

AUTOMATIC TRANSMISSION

CROSS REFERENCE TO RELATED APPLICATIONS

This application is a divisional application of U.S. application Ser. No. 10/893,388, filed Jul. 19, 2004, which is based on Japanese Patent Application Nos. 2003-294279 and 2003-294280 both filed Aug. 18, 2003, the entire contents of each of which are incorporated hereinto by reference.

BACKGROUND OF THE INVENTION

1. Field of the Invention

The present invention relates in general to an automatic transmission, and more particularly to a vehicle automatic transmission having a plurality of groups of operating positions each of which consists of a plurality of successive operating positions and which are selected depending upon a running condition of a vehicle, so that the automatic transmission is controlled to be a selected one of the successive operating positions of the selected group.

2. Description of the Related Art

For vehicles, there have been widely used various types of automatic transmission having a plurality of planetary gear sets, clutches and brakes. One of these types of automatic transmission is a multiple-step transmission having at least seven forward-drive positions. JP-2003-130152A discloses a typical example of this type of automatic transmission, which has (a) a first input path for transmitting a rotary motion of an input member at a predetermined first speed ratio, (b) a second input path for transmitting the rotary motion of the input member at a predetermined second speed ratio higher than the first speed ratio, such that the speed of the rotary motion received from the input member is lowered during transmission of the rotary motion through the second input path, and (c) a primary shifting portion having a total of seven or eight forward-drive positions and including an output member, three planetary gear sets, a plurality of clutches, and a plurality of brakes. The planetary gear sets have a plurality of rotary elements which include an output rotary element connected to the output member and which are connected to each other such that the rotary elements are rotated relative to each other in predetermined relationships with each other. The clutches are selectively engaged to connect selected ones of the rotary elements to the first or second input path, and the brakes are selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member.

Similar types of automatic transmission are disclosed in JP-2002-206601 A, JP-8-105496A, JP-2000-199549A, JP-2000-266138A, JP-2001-82555A, JP-2002-227940A, JP-2002-295609A, and JP-2956173B2.

The conventional types of automatic transmission described above are generally shifted on the basis of running condition parameters of the vehicle such as the running speed and the operating amount of an accelerator pedal of the vehicle, and according to predetermined shifting conditions represented by a plurality of suitable shift-up and shift-down maps, which correspond to respective different running modes or conditions of the vehicle such as a sporty-running mode or a snow-running mode, which are desired by an operator of the vehicle. The shift-up and shift-down maps represent predetermined relationships between the running condition parameters and the operating positions of the automatic transmission. However, the number of operating positions available, the speed ratios of the operating positions, stepping ratios (ratios of the speed ratios of the adjacent operating positions), and an overall range of the speed ratio (so-called "spread", which is a ratio of the maximum speed ratio to the minimum speed ratio of the transmission) are the same for all of the shift-up and shift-down maps corresponding to the different running modes. In this respect, the shifting of the automatic transmission cannot be controlled so as to sufficiently satisfy the operator's desire regarding the running mode or condition of the vehicle. Although the automatic transmission can be manually shifted up and down by the vehicle operator, this manual control is not completely satisfactory to the operator, since the individual operating positions have the respective fixed speed ratios.

The automatic transmission may be given a plurality of groups of operating positions, each group consisting of a plurality of operating positions having respective different speed ratios, by increasing the numbers of the planetary gear sets, clutches and brakes. In this case, one of the groups is selected depending upon the running mode or condition of the vehicle desired by the operator. While this type of automatic transmission is improved in the versatility of its control, the automatic transmission tends to be complicated in construction with increased numbers of the planetary gear sets, clutches and brakes, and suffer from an increased cost of manufacture and difficulty in installation of the automatic transmission on the vehicle.

SUMMARY OF THE INVENTION

The present invention was made in view of the background discussed above. It is therefore an object of the present invention to provide an automatic transmission which is economical to manufacture and easy to be installed on a vehicle, and which has a plurality of groups of operating positions that are selected depending upon a running mode or condition of the vehicle desired by the vehicle operator. The above object may be achieved according to any one of the following modes of the present invention, each of which is numbered like the appended and depends from the other mode or modes, where appropriate, to indicate and clarify possible combinations of elements of technical features. It is to be understood that the present invention is not limited to the technical features or any combinations thereof which will be described for illustrative purpose only.

(1) An automatic transmission comprising an input member, and a primary shifting portion having a plurality of operating positions and including an output member, a plurality of planetary gear sets, a plurality of clutches and a plurality of brakes, the plurality of planetary gear sets having a plurality of rotary elements which include an output rotary element connected to the output member and which are connected to each other such that the rotary elements are rotated relative to each other in predetermined relationships with each other, the automatic transmission having a first input path for transmitting a rotary motion of the input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, wherein an improvement comprises: the primary shifting portion including at least four rotary elements including a first input rotary element and a second input rotary element, the plurality of clutches including a first input clutch for selectively connecting the first input rotary element to the first input path, and a second input clutch for selectively connecting the second input rotary element to the first input path; the primary shifting portion having a first group of successive operating positions for outputting a rotary motion a speed of which is higher than a speed of the rotary motion received from the first input path, the successive operating portions of the first group being established by an engaging action of the first input clutch and a releasing action of the second input clutch, for rotation of the first input rotary element through the first input path, and by controlling engaging and releasing actions of the other of the plurality of clutches and the plurality of brakes; the primary shifting portion having a second group of successive operating positions for outputting a rotary motion a speed of which is higher than the speed of the rotary motion received from the first input path, the successive operating positions of the second group being established by an engaging action of the second input clutch and a releasing action of the first input clutch, for rotation of the second input rotary element through the first input path, and by controlling engaging and releasing actions of the other of the plurality of clutches and the plurality of clutches, the successive operating positions of the second group having respective speed ratios different from those of the successive operating positions of the first group; and the automatic transmission is shiftable to a selected one of the successive operating positions of a selected one of the first and second groups.

In the automatic transmission constructed according to the above-described mode (1) of this invention, the first input rotary element is connected to the first input path by the first input clutch, to establish the successive operating positions of the first group, and the second input rotary element is connected to the first input path by the second input clutch, to establish the successive operating positions of the second group. The automatic transmission, which is usable for a motor vehicle, is shiftable to a selected one of the successive operating positions of one of the first and second groups, which is selected depending upon a specific running mode or condition of the vehicle desired by the vehicle operator, or specific characteristics of the vehicle. Thus, the shifting of the present automatic transmission can be controlled in a more adequate manner than the conventional automatic transmission discussed above.

In the present automatic transmission, the rotary motion of the input member is transmitted to the primary shifting portion through the first and second input paths, and the rotary motion received from the first input path is transmitted to the first input rotary element by engaging the first input clutch, or to the second input rotary element by engaging the second input clutch, so that the successive operating positions of the first group are established by the engaging action of the first input clutch, while the successive operating positions of the second group are established by the engaging action of the second input clutch. Accordingly, the automatic transmission can be easily shifted to a selected one of the successive operating position of the selected first or second group, and can be simplified in construction and made compact, and is available at a comparatively low cost of manufacture, while permitting easy installation on a motor vehicle, for example.

(2) An automatic transmission comprising an input member, and a primary shifting portion having a plurality of operating positions and including an output member, a plurality of planetary gear sets, a plurality of clutches and a plurality of brakes, the plurality of planetary gear sets having a plurality of rotary elements which include an output rotary element connected to the output member and which are connected to each other such that the rotary elements are rotated relative to each other in predetermined relationships with each other, the automatic transmission having a first input path for transmitting a rotary motion of the input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, wherein an improvement comprises:

the primary shifting portion including at least four rotary elements including a first input rotary element and a second input rotary element which are disposed at an almost intermediate position of a collinear chart as seen in a direction in which parallel straight lines of the collinear chart are spaced apart from each other, relative rotating speeds of the above-indicated at least four rotary elements being taken along the respective parallel straight lines, the plurality of clutches including a first input clutch for selectively connecting the first input rotary element to the first input path, and a second input clutch for selectively connecting the second input rotary element to the first input path; and the output rotary element being located on one side of a set of the first and second input rotary elements, while at least one of the other of the plurality of rotary elements each of which is selectively connected to the second input path by one of the plurality of clutches other than the first and second input clutches or brought into a stationary state by one of the plurality of brakes is located on the other side of the set of the first and second input rotary elements.

In the automatic transmission constructed according to the above-described mode (2) of this invention, the first and second input rotary elements which are disposed at an almost intermediate position of the collinear chart are selectively connected to the first input path by the respective first and second input clutches, and the output rotary element is located on one side of the set of the first and second input rotary elements, while each of at least one other rotary element is located on the other side of the above-indicated set and is selectively connected to the second input path by one of the clutches other than the first and second input clutches or brought into a stationary state by one of the brakes. This arrangement permits the first and second groups of successive operating positions to be easily established by engaging the respective first and second input clutches, as in the following mode (3) of the invention. In these first and second groups of operating positions, the output member is rotated at speeds higher than the speed of the rotary motion received from the first input path, and the selection of the first or second group assures a high degree of freedom in the selection of the speed ratio of the output member with respect to the input member, leading to improved adequacy of control of the shifting actions of the automatic transmission. Further, the rotary motion of the input member is transmitted to the primary shifting portion through the first and second input paths, and the selective engagement of the first or second input clutch permits the selection of the first or second group of successive operating positions. Accordingly, the automatic transmission according to the present mode (2) of this invention has substantially the same advantages as the automatic transmission according to the above-described mode (1), namely, simple and compact construction, reduced cost of manufacture and easy installation on the vehicle. The first rotary element which will be described with respect to the following modes (7)-(15) of the invention corresponds to the rotary element located on the above-indicated other side of the set of the first and second input clutches.

(3) The automatic transmission according to the above-described mode (2), wherein the primary shifting portion has a first group of successive operating positions for outputting a rotary motion a speed of which is higher than a speed of the rotary motion received from the first input path, the successive operating positions of the first group being established by an engaging action of the first input clutch, together with an engaging action of the above-indicated one clutch corresponding to the rotary element located on the above-indicated other side, and an engaging action of the above-indicated one brake corresponding to the rotary element located on the above-indicated other side, respectively, and wherein the primary shifting portion has a second group of successive operating positions for outputting a rotary motion a speed of which is higher than the speed of the rotary motion received from the first input path, the successive operating positions of the second group being established by an engaging action of the second input clutch, together with an engaging action of the above-indicated one clutch corresponding to the rotary element located on the above-indicated other side, and an engaging action of the above-indicated one brake corresponding to the rotary element located on the above-indicated other side, respectively, the successive operating positions of the second group having respective speed ratios different from those of the successive operating positions of the first group, the automatic transmission being shiftable to a selected one of the successive operating positions of a selected one of the first and second groups.

(4) The automatic transmission according to the above-described mode (1) or (3), wherein combinations of operating states of the plurality of clutches and the plurality of brakes to establish the successive operating positions of the first group are the same as those to establish the successive operating positions of the second group, except for the operating states of the first and second input clutches.

In the automatic transmission according to the above-described mode (4), the first and second groups of successive operating positions are different from each other, only in that the first input clutch is engaged for establishing the operating positions of the first group, while the second input clutch is engaged for establishing the operating positions of the second group. Except for the operating states (engaged and released states) of the first and second input clutches, the combinations of the operating states of the clutches and brakes to establish the first group of operating positions are the same as those to establish the operating positions of the second group. The same set of clutches and brakes is used for the two groups of operating positions. Thus, the present automatic transmission can be made simpler in construction and more compact and available at a lower cost, than an automatic transmission wherein different sets of clutches and brakes are used for the respective two groups of operating positions.

(5) The automatic transmission according to any one of the above-described modes (1), (3) and (4), wherein one of the first and second groups of successive operating positions is selected by a shift control device, and the automatic transmission is shifted to a selected one of the successive operating position of the selected group, under the control of the shift control device.

(6) The automatic transmission according to any one of the above-described modes (1)-(5), wherein the first and second input rotary elements are ring gears or sun gears of two adjacent ones of the plurality of planetary gear sets, the two adjacent planetary gear sets having a common stepped pinion which has a large-diameter portion and a small-diameter portion, the ring gears or sun gears of the two adjacent planetary gear sets meshing with one and the other of the large-diameter and small-diameter portions, respectively.

In the automatic transmission according to the above-described mode (6), the first and second input rotary elements are ring gears or sun gears of the two adjacent planetary gear sets which have a common stepped pinion, and those two ring or sun gears mesh with the large-diameter and small-diameter portions of the stepped pinion. The automatic transmission having this compact arrangement can be easily manufactured at a relatively low cost, by modifying a conventional planetary gear type automatic transmission such that a planetary gear set having a ring gear or sun gear serving as the first input rotary element for establishing a plurality of successive operating positions for outputting a rotary motion a speed of which is higher than the speed of the rotary element received from the first input path is provided with a stepped pinion which meshes with the ring gear or sun gear serving as the second input rotary element, which is connected to the first input path by the second input clutch.

(7) The automatic transmission according to any one of the above-described modes (1)-(6), wherein the primary shifting portion has six rotary elements consisting of a first rotary element, a second rotary element, a third rotary element, a fourth rotary element, a fifth rotary element and a sixth rotary element, which are arranged according to a collinear chart having a vertical axis and a horizontal axis and wherein relative rotating speeds of the six rotary elements are taken along respective six straight lines parallel to the vertical axis, which six straight lines are spaced apart from each other in a direction parallel to the horizontal axis from one of opposite ends of the collinear chart toward the other end, such that distances between adjacent ones of the six straight lines in the direction are determined by gear ratios of the plurality of planetary gear sets, the plurality of clutches consisting of a first clutch through which the sixth rotary element is selectively connected to the second input path, a second clutch through which the first rotary element is selectively connected to the second input path, a third clutch through which the second rotary element is selectively connected to the first input path, and a fourth clutch through which the third rotary element is selectively connected to the first input path, the plurality of brakes consisting of a first brake by which the first rotary element is selectively brought into a stationary state, a second brake by which the second rotary element is selectively brought into a stationary state, and a third brake by which the fourth rotary element is selectively brought into a stationary state, the fifth rotary element being connected to the output member, and wherein the second, third and fifth rotary elements respectively serve as the first input rotary element, the second input rotary element and the output rotary element, and the third and fourth clutches respectively serve as the first and second input clutches.

(8) The automatic transmission according to the above-described mode (7), wherein the primary shifting portion includes a primary first planetary gear set of single-pinion type, a primary second planetary gear set of double-pinion type, a primary third planetary gear set of single-pinion type and a primary fourth planetary gear set, and wherein the first rotary element is a sun gear of the primary third planetary gear set, and the second rotary element is one of a ring gear of the primary first planetary gear set and a ring gear of the primary fourth planetary gear set, while the third rotary element is the other of the ring gear of the primary first planetary gear set and the ring gear of the primary fourth planetary gear set, the fourth rotary element being mutually connected carriers of the primary first, second and fourth planetary gear sets, the fifth rotary element being a ring gear of the primary second planetary gear set and a carrier of the primary third planetary gear set which are connected to each other, and the sixth rotary element being sun gears of the primary first and second planetary gear set and a ring gear of the primary third planetary gear set which are connected to each other.

(9) An automatic transmission comprising an input member, and a primary shifting portion having a plurality of operating positions and including an output member, a plurality of planetary gear sets, a plurality of clutches and a plurality of brakes, the plurality of planetary gear sets having a plurality of rotary elements which include an output rotary element connected to the output member and which are connected to each other such that the rotary elements are rotated relative to each other in predetermined relationships with each other, the automatic transmission having a first input path for transmitting a rotary motion of the input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, wherein an improvement comprises: the primary shifting portion including a primary first planetary gear set of single-pinion type, a primary second planetary gear set of double-pinion type, a primary third planetary gear set of single-pinion type and a primary fourth planetary gear set, and having six rotary elements consisting of a first rotary element, a second rotary element, a third rotary element, a fourth rotary element, a fifth rotary element and a sixth rotary element; the first rotary element being a sun gear of the primary third planetary gear set, and the second rotary element being one of a ring gear of the primary first planetary gear set and a ring gear of the primary fourth planetary gear set, while the third rotary element being the other of the ring gear of the primary first planetary gear set and the ring gear of the primary fourth planetary gear set, the fourth rotary element being mutually connected carriers of the primary first, second and fourth planetary gear sets, the fifth rotary element being a ring gear of the primary second planetary gear set and a carrier of the primary third planetary gear set which are connected to each other, and the sixth rotary element being sun gears of the primary first and second planetary gear sets and a ring gear of the primary third planetary gear set which are connected to each other; and the plurality of clutches consisting of a first clutch through which the sixth rotary element is selectively connected to the second input path, a second clutch through which the first rotary element is selectively connected to the second input path, a third clutch through which the second rotary element is selectively connected to the first input path, and a fourth clutch through which the third rotary element is selectively connected to the first input path, the plurality of brakes consisting of a first brake by which the first rotary element is selectively brought into a stationary state, a second brake by which the second rotary element is selectively brought into a stationary state, and a third brake (B3) by which the fourth rotary element is selectively brought into a stationary state, the fifth rotary element being connected to the output member.

(10) The automatic transmission according to the above-described modes (8) or (9), wherein the primary first planetary gear set has a stepped pinion which has a large-diameter portion meshing with the ring gear of the primary fourth planetary gear set, and a small-diameter portion which serve a pinion gear of the primary first planetary gear set.

(11) The automatic transmission according to any one of the above-described modes (7)-(10), wherein the plurality of operating positions of the primary shifting portion include a plurality of operating positions selected from among a first-speed position which is established by engaging actions of the first clutch and the third brake and which has a highest speed ratio, a second-speed position which is established by engaging actions of the first clutch and the second brake and which has a speed ratio lower than the first-speed position, a third-speed position which is established by engaging actions of the first clutch and the first brake and which has a speed ratio lower than the second-speed position, a fourth-speed position which is established by engaging actions of the first and second clutches and which has a speed ratio lower than the third-speed position, a fifth-speed position which is established by engaging actions of the first and third clutches and which has a speed ratio lower than the fourth-speed position, a sixth-speed position which is established by engaging actions of the third and fourth clutches and which has a speed ratio lower than the fifth-speed position, a seventh-speed position which is established by an engaging action of the second clutch and an engaging action of the third clutch or the fourth clutch and which has a speed ratio lower than the sixth-speed position, and an eighth-speed position which is established by an engaging action of the third clutch or the fourth clutch and the first brake and which has a speed ratio lower than the seventh-speed position, and wherein the primary shifting portion has a first group of two successive operating positions and a second group of two successive operating positions for outputting a rotary motion a speed of which is higher than a speed of the rotary motion received from the first input path, the two successive operating positions of the first group consisting of the seventh-speed position established by the engaging action of the second and third clutches, and the eight-speed position established by the engaging action of the third clutch and the first brake, and the two successive operating positions of the second group consisting of the seventh-speed position established by the engaging action of the second and fourth clutches, and the eighth-speed position established by the engaging action of the fourth clutch and the engaging action of the first brake.

The third and fourth clutches correspond to the first and second input clutches in the above-described modes (1) and (3).

In the automatic transmission constructed according to any one of the above-described modes (7)-(11), a maximum of eight operating positions can be provided by the primary shifting portion including the four planetary gear sets, four clutches and three brakes, in combination with the two input paths having different speed ratios. This arrangement permits light-weight and compact construction of the automatic transmission, and facilitate the shifting operations of the automatic transmission, with a reduced shifting shock, by engaging actions of the appropriate combination of two coupling devices selected from among the four clutches and three brakes.

In the automatic transmission according to the above-described mode (8) or (9), the first through sixth rotary elements are constituted by the respective elements of the four primary planetary gear sets of the primary shifting portion, as described above. By determining the gear ratios ρ of the four planetary gear sets within a suitable range, the speed ratios of the individual operating positions including the first and second groups of successive operating positions, and the stepping ratios of the adjacent two successive positions can be determined as desired, with the overall speed ratio range or so-called "spread" being as broad as about 6, by using the planetary gear sets having comparatively small sizes (diameters).

The automatic transmission according to the above-described mode (10) is one form of the above-described mode (6), wherein the primary first planetary gear set has a stepped pinion which has a large-diameter portion meshing with the ring gear of the primary fourth planetary gear set, which is selectively connected to the first input path through the fourth clutch. This arrangement permits simple and compact construction and reduced cost of manufacture of the automatic transmission having the selectable first and second groups of successive operating positions.

(12) The automatic transmission according to any one of the above-described modes (1)-(6), wherein the primary shifting portion has five rotary elements consisting of a first rotary element, a second rotary element, a third rotary element, a fourth rotary element and a fifth rotary element, which are arranged according to a collinear chart having a vertical axis and a horizontal axis and wherein relative rotating speeds of the five rotary elements are taken along respective five straight lines parallel to the vertical axis, which five straight lines are spaced apart from each other in a direction parallel to the horizontal axis from one of opposite ends of the collinear chart toward the other end, such that distances between adjacent ones of the five straight lines in the direction are determined by gear ratios of the plurality of planetary gear sets, the plurality of clutches consisting of a first clutch through which the fifth rotary element is selectively connected to the second input path, a second clutch through which the first rotary element is selectively connected to the second input path, a third clutch through which the second rotary element is selectively connected to the first input path, and a fourth clutch through which the third rotary element is selectively connected to the first input path, the plurality of brakes consisting of a first brake by which the first rotary element is selectively brought into a stationary state, a second brake by which the second rotary element is selectively brought into a stationary state, and a third brake by which the third rotary element is selectively brought into a stationary state, the fourth rotary element being connected to the output member, and wherein the second, third and fourth rotary elements respectively serve as the first input rotary element, the second input rotary element and the output rotary element, and the third and fourth clutches respectively serve as the first and second input clutches.

(13) The automatic transmission according to the above-described mode (12), wherein the primary shifting portion includes a primary first planetary gear set of single-pinion type, a primary second planetary gear set of double-pinion type, and a primary third planetary gear set of single-pinion type, and wherein the first rotary element consists of a sun gear of the primary first planetary gear set, a carrier of the primary second planetary gear set and a sun gear of the primary third planetary gear set, which are connected to each other, the second rotary element consisting of a carrier of the primary first planetary gear set and a ring gear of the primary second planetary gear set, the third rotary element consisting of a ring gear of the primary first planetary gear set, the fourth rotary element consisting of a carrier of the primary third planetary gear set, and the fifth rotary element consisting of a ring gear of the primary third planetary gear set and a sun gear of the primary second planetary gear set which are connected to each other.

(14) An automatic transmission comprising an input member, and a primary shifting portion having a plurality of operating positions and including an output member, a plurality of planetary gear sets, a plurality of clutches and a plurality of brakes, the plurality of planetary gear sets having a plurality of rotary elements which include an output rotary element connected to the output member and which are connected to each other such that the rotary elements are rotated relative to each other in predetermined relationships with each other, the automatic transmission having a first input path for transmitting a rotary motion of the input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, wherein an improvement comprises:

the primary shifting portion including a primary first planetary gear set of single-pinion type, a primary second planetary gear set of double-pinion type, and a primary third planetary gear set of single-pinion type, and having five rotary elements consisting of a first rotary element, a second rotary element, a third rotary element, a fourth rotary element and a fifth rotary element; the first rotary element consisting of a sun gear of the primary first planetary gear set, a carrier of the primary second planetary gear set and a sun gear of the primary third planetary gear set, which are connected to each other, the second rotary element consisting of a carrier of the primary first planetary gear set and a ring gear of the primary second planetary gear set, the third rotary element consisting of a ring gear of the primary first planetary gear set, the fourth rotary element consisting of a carrier of the primary third planetary gear set, and the fifth rotary element consisting of a ring gear of the primary third planetary gear set and a sun gear of the primary second planetary gear set which are connected to each other; and the plurality of clutches consisting of a first clutch through which the fifth rotary element is selectively connected to the second input path, a second clutch through which the first rotary element is selectively connected to the second input path, a third clutch through which the second rotary element is selectively connected to the first input path, and a fourth clutch through which the third rotary element is selectively connected to the first input path, the plurality of brakes consisting of a first brake by which the first rotary element is selectively brought into a stationary state, a second brake by which the second rotary element is selectively brought into a stationary state, and a third brake by which the third rotary element is selectively brought into a stationary state, the fourth rotary element being connected to the output member.

(15) The automatic transmission according to any one of the above modes (12)-(14), wherein the plurality of operating positions of the primary shifting portion include a plurality of positions selected from among a first-speed position which is established by engaging actions of the first clutch and the third brake and which has a highest speed ratio, a second-speed position which is established by engaging actions of the first clutch and the second brake and which has a speed ratio lower than the first-speed position, a third-speed position which is established by engaging actions of the first clutch and the first brake and which has a speed ratio lower than the second-speed position, a fourth-speed position which is established by engaging actions of the first and second clutches and which has a speed ratio lower than the third-speed position, a fifth-speed position which is established by engaging actions of the first and third clutches and which has a speed ratio lower than the fourth-speed position, a sixth-speed position which is established by engaging actions of the third and fourth clutches and which has a speed ratio lower than the fifth-speed position, a seventh-speed position which is established by an engaging action of the second clutch and an engaging action of the third clutch or the fourth clutch and which has a speed ratio lower than the sixth-speed position, and an eighth-speed position which is established by an engaging action of the third clutch or the fourth clutch and the first brake and which has a speed ratio lower than the seventh-speed position, and wherein the primary shifting portion has a first group of two successive operating positions and a second group of two successive operating positions for outputting a rotary motion a speed of which is higher than a speed of the rotary motion received from the first input path, the two successive operating positions of the first group consisting of the seventh-speed position established by the engaging action of the second and third clutches, and the eight-speed position established by the engaging action of the third clutch and the first brake, and the two successive operating positions of the second group consisting of the seventh-speed position established by the engaging action of the second and fourth clutches, and the eighth-speed position established by the engaging action of the fourth clutch and the engaging action of the first brake.

In the automatic transmission constructed according to any one of the above-described modes (12)-(15), a maximum of eight operating positions can be provided by the primary shifting portion including the four planetary gear sets, four clutches and three brakes, in combination with the two input paths having different speed ratios. This arrangement permits light-weight and compact construction of the automatic transmission, and facilitate the shifting operations of the automatic transmission, with a reduced shifting shock, by engaging actions of the appropriate combination of two coupling devices selected from among the four clutches and three brakes.

In the automatic transmission according to the above-described mode (13) or (14), the first through fifth rotary elements are constituted by the respective elements of the four primary planetary gear sets of the primary shifting portion, as described above. By determining the gear ratios $\rho$ of the four planetary gear sets within a suitable range, the speed ratios of the individual operating positions including the first and second groups of successive operating positions, and the stepping ratios of the adjacent two successive positions can be determined as desired, by using the planetary gear sets having comparatively small sizes (diameters).

(16) The automatic transmission according to any one of the above-described modes (1)-(15), wherein the second input path is partially defined by a first planetary gear set having three rotary elements consisting of a first element which is connected to and rotated by the input member, a second element which is held stationary, and a third element which functions as an intermediate output member a rotary motion of which is transmitted to the primary shifting portion such that a speed of the rotary motion received from the input member is lowered during transmission of the rotary member through the second input path, and wherein the first input path is arranged such that the rotary motion of the input member is transmitted through the first input path to the primary shifting portion at a speed ratio of 1.0.

The above-described modes (9) and (14) are preferred arrangements of the above-described modes (1)-(5), and have substantially the same advantages as described above with respect to the modes (1) and (2).

(17) An automatic transmission comprising an input member, and a primary shifting portion having a plurality of operating positions and including an output member, a plurality of planetary gear sets, a plurality of clutches and a plurality of brakes, the plurality of planetary gear sets having a plurality of rotary elements which include an output rotary element connected to the output member and which are connected to each other such that the rotary elements are rotated relative to each other in predetermined relationships with each other, the automatic transmission having a first input path for transmitting a rotary motion of the input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, wherein an improvement comprises: the primary shifting portion including at least four rotary elements including a first input rotary element and a second input rotary element, the plurality of clutches including a first input clutch for selectively connecting the first input rotary element to the second input path, and a second input clutch for selectively connecting the second input rotary element to the second input path; the primary shifting portion having a first group of successive operating positions for outputting a rotary motion a speed of which is lower than a speed of the rotary motion received from the first input path, the successive operating positions of the first group being established by an engaging action of the first input clutch and a releasing action of the second input clutch, for connection of the first input rotary element to the second input path, and by controlling engaging and releasing actions of the other of the plurality of clutches and the plurality of brakes; the primary shifting portion having a second group of successive operating positions for outputting a rotary motion a speed of which is lower than the speed of the rotary motion received from the first input path, the successive operating positions of the second group being established by an engaging action of the second input clutch and a releasing action of the first input clutch, for connection of the second input rotary element to the second input path, and by controlling engaging and releasing actions of the other of the plurality of clutches and the plurality of brakes, the successive operating positions of the second group having respective speed ratios different from those of the successive operating positions of the first group; and the automatic transmission being shiftable to a selected one of the successive operating positions of a selected one of the first and second groups.

In the automatic transmission constructed according to the above-described mode (17) of this invention, the first input rotary element is connected to the second input path by the first input clutch, to establish the successive operating positions of the first group, and the second input rotary element is connected to the second input path by the second input clutch, to establish the successive operating positions of the second group. The automatic transmission, which is usable for a motor vehicle, is shiftable to a selected one of the successive operating positions of one of the first and second groups, which is selected depending upon a specific running mode or condition of the vehicle desired by the vehicle operator, or specific characteristics of the vehicle. Thus, the shifting of the present automatic transmission can be controlled in a more adequate manner than the conventional automatic transmission discussed above.

In the present automatic transmission, the rotary motion of the input member is transmitted to the primary shifting portion through the first and second input paths, and the rotary motion received from the second input path is transmitted to the first input rotary element by engaging the first input clutch, or to the second input rotary element by engaging the second input clutch, so that the successive operating positions of the first group are established by the engaging action of the first input clutch, while the successive operating positions of the second group are established by the engaging action of the second input clutch. Accordingly, the automatic transmission can be easily shifted to a selected one of the successive operating position of the selected first or second group, and can be simplified in construction and made compact, and is available at a comparatively low cost of manufacture, while permitting easy installation on a motor vehicle, for example.

(18) An automatic transmission comprising an input member, and a primary shifting portion having a plurality of operating positions and including an output member, a plurality of planetary gear sets, a plurality of clutches and a plurality of brakes, the plurality of planetary gear sets having a plurality of rotary elements which include an output rotary element connected to the output member and which are connected to each other such that the rotary elements are rotated relative to each other in predetermined relationships with each other, the automatic transmission having a first input path for transmitting a rotary motion of the input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, wherein an improvement comprises: the primary shifting portion includes at least four rotary elements including a first input rotary element and a second input rotary element which are disposed at one end of a collinear chart as seen in a direction in which parallel straight lines of the collinear chart are spaced apart from each other, relative rotating speeds of the at least four rotary elements being taken along the respective parallel straight lines, the plurality of clutches including a first input clutch for selectively connecting the first input rotary element to the second input path, and a second input clutch for selectively connecting the second input rotary element to the first input path; and the output rotary element is located on an inner side of a set of the first and second input rotary elements, while at least one of the other of the plurality of rotary elements each of which is selectively connected to the first input path and/or the second input path by at least one of the plurality of clutches other than the first and second input clutches or brought into a stationary state by at least one of the plurality of brakes is located on the other side of the set of said first and second input rotary elements.

In the automatic transmission constructed according to the above-described mode (18) of this invention, the first and second input rotary elements which are disposed at one end of the collinear chart are selectively connected to the second input path by the respective first and second input clutches, and the output rotary element is located on one side of the set of the first and second input rotary elements, while each of at least one other rotary element is located on the other side of the above-indicated set and is selectively connected to the second input path by the clutch or clutches other than the first and second input clutches or brought into a stationary state by at least one of the brakes. This arrangement permits the first and second groups of successive operating positions to be easily established by engaging the respective first and second input clutches, as in the following mode (19) of the invention. In these first and second groups of operating positions, the output member is rotated at speeds lower than the speed of the rotary motion received from the first input path, and the selection of the first or second group assures a high degree of freedom in the selection of the speed ratio of the output member with respect to the input member, leading to improved adequacy of control of the shifting actions of the automatic transmission. Further, the rotary motion of the input member is transmitted to the primary shifting portion through the first and second input paths, and the selective engagement of the first or second input clutch permits the selection of the first or second group of successive operating positions. Accordingly, the automatic transmission according to the present mode (18) of this invention has substantially the same advantages as the automatic transmission according to the above-described mode (17), namely, simple and compact construction, reduced cost of manufacture and easy installation on the vehicle. The first rotary element which will be described with respect to the following modes (7)-(15) of the invention corresponds to the rotary element located on the above-indicated other side of the set of the first and second input clutches.

(19) The automatic transmission according to the above-described above (18), wherein the primary shifting portion has a first group of successive operating positions for outputting a rotary motion a speed of which is lower than a speed of the rotary motion received from the first input path, the successive operating positions of the first group being established by an engaging action of the first input clutch, together with an engaging action of the above-indicated at least one clutch corresponding to the above-Indicated at least one rotary element located on the above-indicated other side, and an engaging action of the above-indicated at least one brake corresponding to the above-indicated at least one rotary element located on the above-indicated other side, respectively, and wherein the primary shifting portion has a second group of successive operating positions for outputting a rotary motion a speed of which is lower than the speed of the rotary motion received from the first input path, the successive operating positions of the second group being established by an engaging action of the second input clutch, together with the engaging action of the above-indicated at least one clutch corresponding to the above-indicated at least one rotary element located on the above-indicated other side, and the engaging action of the above-indicated at least one brake corresponding to the above-indicated at least one rotary element located on the above-indicated other side, respectively, the successive operating positions of the second group having respective speed ratios different from those of the successive operating positions of the first group, the automatic transmission being shiftable to a selected one of the successive operating positions of a selected one of said first and second groups.

(20) The automatic transmission according to any one of the above-described modes (17)-(19), wherein combinations of operating states of said plurality of clutches and said plurality of brakes to establish the successive operating positions of the first group are the same as those to establish the successive operating positions of the second group, except for the operating states of said first and second input clutches.

In the automatic transmission according to the above-described mode (20), the first and second groups of successive operating positions are different from each other, only in that the first input clutch is engaged for establishing the operating positions of the first group, while the second input clutch is engaged for establishing the operating positions of the second group. Except for the operating states (engaged and released states) of the first and second input clutches, the combinations of the operating states of the clutches and brakes to establish the first group of operating positions are the same as those to establish the operating positions of the second group. The same set of clutches and brakes is used for the two groups of operating positions. Thus, the present automatic transmission can be made simpler in construction and more compact and available at a lower cost, than an automatic transmission wherein different sets of clutches and brakes are used for the respective two groups of operating positions.

(21) The automatic transmission according to any one of the above-described modes (17), 19 and (20), wherein one of the first and second groups of successive operating positions is selected by a shift control device, and the automatic transmission is shifted to a selected one of the successive operating position of the selected group, under the control of the shift control device.

(22) The automatic transmission according to any one of the above-described modes (17)-(21), wherein said first and second input rotary elements are ring gears or sun gears of two adjacent ones of the plurality of planetary gear sets, the two adjacent planetary gear sets having a common stepped pinion which has a large-diameter portion and a small-diameter portion, the ring gears or sun gears of the two adjacent planetary gear sets meshing with one and the other of the large-diameter and small-diameter portions, respectively.

In the automatic transmission according to the above-described mode (22), the first and second input rotary elements are ring gears or sun gears of the two adjacent planetary gear sets which have a common stepped pinion, and those two ring or sun gears mesh with the large-diameter and small-diameter portions of the stepped pinion. The automatic transmission having this compact arrangement can be easily manufactured at a relatively low cost, by modifying a conventional planetary gear type automatic transmission such that a planetary gear set having a ring gear or sun gear serving as the first input rotary element for establishing a plurality of successive operating positions for outputting a rotary motion a speed of which is higher than the speed of the rotary element received from the first input path is provided with a stepped pinion which meshes with the ring gear or sun gear serving as the second input rotary element, which is connected to the first input path by the second input clutch.

(23) The automatic transmission according to any one of the above-described modes (17)-(22), wherein the primary shifting portion has five rotary elements consisting of a first rotary element, a second rotary element, a third rotary element, a fourth rotary element, and a fifth rotary element, which are arranged according to a collinear chart having a vertical axis and a horizontal axis and wherein relative rotating speeds of the five rotary elements are taken along respective six straight lines parallel to the vertical axis, which five straight lines are spaced apart from each other in a direction parallel to the horizontal axis from one of opposite ends of the collinear chart toward the other end, such that distances between adjacent ones of the six straight lines in the direction are determined by gear ratios of the plurality of planetary gear sets, the plurality of clutches consisting of a first clutch through which the fifth rotary element is selectively connected to the second input path, a second clutch through which the first rotary element is selectively connected to the second input path, a third clutch through which the second rotary element is selectively connected to the first input path, a fourth clutch through which the first rotary element is selectively connected to the first input path, and a fifth clutch through which the fourth rotary element is selectively connected to the second input path, the plurality of brakes consisting of a first brake by which the first rotary element is selectively brought into a stationary state, and a second brake by which the second rotary element is selectively brought into a stationary state, the third rotary element being connected to the output member, and wherein the fifth, fourth and third rotary elements respectively serve as the first input rotary element, the second input rotary element and the output rotary element, and the first and fifth clutches respectively serve as the first and second input clutches.

(24) The automatic transmission according to the above-described mode (23), wherein the primary shifting portion includes a primary first planetary gear set of double-pinion type, a primary second planetary gear set of single-pinion type, and a primary third planetary gear set, and wherein the first rotary element consists of a carrier of the primary first planetary gear set, a sun gear of the primary second planetary gear set and a carrier of the primary third planetary gear set, which are connected to each other, the second rotary element consisting of a ring gear of the primary first planetary gear set and a carrier of the primary second planetary gear set, which are connected to each other, the third rotary element being a ring gear of the primary second planetary gear set, the fourth rotary element being a sun gear of the primary third planetary gear set, the fifth rotary element being a sun gear of the primary first planetary gear set.

(25) An automatic transmission comprising an input member, and a primary shifting portion having a plurality of operating positions and including an output member, a plurality of planetary gear sets, a plurality of clutches and a plurality of brakes, the plurality of planetary gear sets having a plurality of rotary elements which include an output rotary element connected to the output member and which are connected to each other such that the rotary elements are rotated relative to each other in predetermined relationships with each other, the automatic transmission having a first input path for transmitting a rotary motion of the input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, characterized in that: the primary shifting portion includes a primary first planetary gear set of double-pinion type, a primary second planetary gear set of single-pinion type, and a primary third planetary gear set, and has five rotary elements consisting of a first rotary element, a second rotary element, a third rotary element, a fourth rotary element and a fifth rotary element, and wherein the first rotary element consists of a carrier of the primary first planetary gear set, a sun gear of the primary second planetary gear set and a carrier of the primary third planetary gear set, which are connected to each other, the second rotary element consisting of a ring gear of the primary first planetary gear set and a carrier of the primary second planetary gear set, which are connected to each other, the third rotary element being a ring gear of the primary second planetary gear set, the fourth rotary element being a sun gear of the primary third planetary gear set, the fifth rotary element being a sun gear of the primary first planetary gear set, and further wherein the plurality of clutches consisting of a first clutch through which the fifth rotary element is selectively connected to the second input path, a second clutch through which the first rotary element is selectively connected to the second input path, a third clutch through which the second rotary element is selectively connected to the first input path, a fourth clutch through which the first rotary element is selectively connected to the first input path, and a fifth clutch through which the fourth rotary element is selectively connected to the second input path, the plurality of brakes consisting of a first brake by which the first rotary element is selectively brought into a stationary state, and a second brake by which the second rotary element is selectively brought into a stationary state, the third rotary element being connected to the output member.

(26) The automatic transmission according to the above-described mode (24) or (25), wherein the primary first planetary gear set has a stepped pinion which has a large-diameter portion meshing with the ring gear of the primary fourth planetary gear set, and a small-diameter portion which serve a pinion gear of the primary first planetary gear set.

(27) The automatic transmission according to any one of the above-described modes (23)-(26), wherein the plurality of positions of the primary shifting portion include a plurality of operating positions selected from among a first-speed position which is established by engaging actions of the first or fifth clutch and the second brake and which has a highest speed ratio, a second-speed position which is established by engaging actions of the first or fifth clutch and the first brake and which has a speed ratio lower than the first-speed position, a third-speed position which is established by engaging actions of at least two of the first, second and fifth clutches and which has a speed ratio lower than the second-speed position, a fourth-speed position which is established by engaging actions of the first or fifth clutch and the second clutch and which has a speed ratio lower than the third-speed position, a fifth-speed position which is established by engaging actions of the first or fifth clutch and the third clutch and which has a speed ratio lower than the fourth-speed position, a sixth-speed position which is established by engaging actions of the third and fourth clutches and which has a speed ratio lower than the fifth-speed position, a seventh-speed position which is established by engaging actions of the second and third clutches and which has a speed ratio lower than the sixth-speed position, and an eighth-speed position which is established by engaging actions of the third clutch and the first brake and which has a speed ratio lower than the seventh-speed position, and wherein the first group of successive operating positions consist of a plurality of successive positions selected from among the first-speed through fifth-speed positions, each of the plurality of successive positions being established by the engaging action of the first clutch serving as the first input clutch, and the engaging action of another of the plurality of clutches or one of the plurality of brakes), and the second group of successive operating positions consist of the plurality of successive positions each of which is established by the engaging action of the fifth clutch serving as the second input clutch, and the engaging action of the above-indicated another of the plurality of clutches and the above-indicated one of the plurality of brakes.

For example, the above-indicated plurality of successive positions of the first group selected from among the first-speed through fifth-speed positions may consist of all of the first-speed through fifth-speed positions, or the first-speed through third-speed positions, or the third-speed through fifth-speed positions. Alternatively, the successive positions of the first group may consist of the first-speed, third-speed and fifth-speed positions, or only the second-speed and fourth-speed positions.

In the automatic transmission constructed according to any one of the above-described modes (23)-(27), a maximum of eight operating positions can be provided by the primary shifting portion including the three planetary gear sets, five clutches and two brakes, in combination with the two input paths having different speed ratios. This arrangement permits light-weight and compact construction of the automatic transmission, and facilitate the shifting operations of the automatic transmission, with a reduced shifting shock, by engaging actions of the appropriate combination of two coupling devices selected from among the five clutches and two brakes.

In the automatic transmission according to the above-described mode (24) or (25), the first through fifth rotary elements are constituted by the respective elements of the three primary planetary gear sets of the primary shifting portion, as described above. By determining the gear ratios ρ of the three planetary gear sets within a suitable range, the speed ratios of the individual operating positions including the first and second groups of successive operating positions, and the stepping ratios of the adjacent two successive positions can be determined as desired, with the overall speed ratio range or so-called "spread" being as broad as about 6 or more, by using the planetary gear sets having comparatively small sizes (diameters).

The automatic transmission according to the above-described mode (26) is one form of the above-described mode (22), wherein the primary first planetary gear set has a stepped pinion which has a large-diameter portion meshing with the sun gear of the primary third planetary gear set, which is selectively connected to the second input path through the fifth clutch. This arrangement permits simple and compact construction and reduced cost of manufacture of the automatic transmission having the selectable first and second groups of successive operating positions.

(28) The automatic transmission according to any one of the above-described modes (17)-(22), wherein the primary shifting portion has six rotary elements consisting of a first rotary element, a second rotary element, a third rotary element, a fourth rotary element, a fifth rotary element, and a sixth rotary element, which are arranged according to a collinear chart having a vertical axis and a horizontal axis and wherein relative rotating speeds of the five rotary elements are taken along respective six straight lines parallel to the vertical axis, which six straight lines are spaced apart from each other in a direction parallel to the horizontal axis from one of opposite ends of the collinear chart toward the other end, such that distances between adjacent ones of the six straight lines in the direction are determined by gear ratios of the plurality of planetary gear sets, the plurality of clutches consisting of a first clutch through which the fifth rotary element is selectively connected to the second input path, a second clutch through which the first rotary element is selectively connected to the second input path, a third clutch through which the second rotary element is selectively connected to the first input path, a fourth clutch through which the third rotary element is selectively connected to the first input path, and a fifth clutch through which the sixth rotary element is selectively connected to the second input path, the plurality of brakes consisting of a first brake by which the first rotary element is selectively brought into a stationary state, and a second brake by which the third rotary element is selectively brought into a stationary state, the third rotary element being connected to the output member, and wherein the fifth, sixth and fourth rotary elements respectively serve as the first input rotary element, the second input rotary element and the output rotary element, and the first and second clutches respectively serve as the first and second input clutches.

(29) The automatic transmission according to the above-described mode (28), wherein the primary shifting portion includes a primary first planetary gear set of single-pinion type, a primary second planetary gear set of double-pinion type, a primary third planetary gear set of single-pinion type, and a primary fourth planetary gear set, and wherein the first rotary element consists of mutually connected sun gears of the primary first and second planetary gear sets, the second rotary element consisting of a ring gear of the primary third planetary gear set, the third rotary element consisting of a ring gear of the primary second planetary gear set and a carrier of the primary third planetary gear set, which are connected to each other, the fourth rotary element consisting of carriers of the primary first, second and fourth planetary gear sets and a sun gear of the primary third planetary gear set, which are connected to each other, the fifth rotary element consisting of a ring gear of the primary first planetary gear set, and the sixth rotary element consisting of a ring gear of the primary fourth planetary gear set.

(30) An automatic transmission comprising an input member, and a primary shifting portion having a plurality of operating positions and including an output member, a plurality of planetary gear sets, a plurality of clutches and a plurality of brakes, the plurality of planetary gear sets having a plurality of rotary elements which include an output rotary element connected to the output member and which are connected to each other such that the rotary elements are rotated relative to each other in predetermined relationships with each other, the automatic transmission having a first input path for transmitting a rotary motions of the input member at a predetermined first speed ratio, and a second input path for transmitting the rotary motion of the input member at a predetermined second speed ratio higher than the first speed ratio, such that a speed of the rotary motion received from the input member is lower during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, characterized in that: the primary shifting portion includes a primary first planetary gear set of single-pinion type, a primary second planetary gear set of double-pinion type, a primary third planetary gear set of single-pinion type, and a primary fourth planetary gear set, and has six rotary elements consisting of a first rotary element, a second rotary element, a third rotary element, a fourth rotary element, a fifth rotary element and a sixth rotary element, and wherein the first rotary element consists of mutually connected sun gears of the primary first and second planetary gear sets, the second rotary element consisting of a ring gear of the primary third planetary gear set, the third rotary element consisting of a ring gear of the primary second planetary gear set and a carrier of the primary third planetary gear set, which are connected to each other, the fourth rotary element consisting of carriers of the primary first, second and fourth planetary gear sets and a sun gear of the primary third planetary gear set, the fifth rotary element consisting of a ring gear of the primary first planetary gear set, and the sixth rotary element consisting of a ring gear of the primary fourth planetary gear set, and further wherein the plurality of clutches consist of a first clutch through which the fifth rotary element is selectively connected to the second input path, a second clutch through which the first rotary element is selectively connected to the second input path, a third clutch through which the second rotary element is selectively connected to the first input path, a fourth clutch through which the third rotary element is selectively connected to the first input path, and a fifth clutch through which the sixth rotary element is selectively connected to the second input path, the plurality of brakes consisting of a first brake by which the first rotary element is selectively brought into a stationary state, and a second brake by which the third rotary element is selectively brought into a stationary state, the fourth rotary element being connected to the output member.

(31) The automatic transmission according to the above-described mode (29) or (30), wherein said primary first planetary gear set has a stepped pinion having a large-diameter portion and a small-diameter portion one of which functions as a pinion gear of said primary first planetary gear set, and the other of which meshes with the ring gear of said primary fourth planetary gear set.

(32) The automatic transmission according to any one of the above modes (28)-(31), wherein the plurality of operating positions of the primary shifting portion include a plurality of positions selected from among a first-speed position which is established by engaging actions of the first or fifth clutch and the second brake and which has a highest speed ratio, a second-speed position which is established by engaging actions of the first or fifth clutch and the first brake and which has a speed ratio lower than the first-speed position, a third-speed position which is established by engaging actions of at least two of the first, second and third clutches and which has a speed ratio lower than the second-speed position, a fourth-speed position which is established by engaging actions of the first or second clutches and the third or fourth clutch and which has a speed ratio lower than the third-speed position, a fifth-speed position which is established by engaging actions of the third and fourth clutches and which has a speed ratio lower than the fourth-speed position, a sixth-speed position which is established by engaging actions of the second and fourth clutches and which has a speed ratio lower than the fifth-speed position, a seventh-speed position which is established by engaging actions of the fourth clutch and the second brake and which has a speed ratio lower than the sixth-speed position, and an eighth-speed position which is established by engaging actions of the third clutch and the first brake and the first brake and which has a speed ratio lower than the seventh-speed position, and wherein the first group of successive operating positions consist of a plurality of successive positions selected from among the first-speed through fourth-speed positions, each of the plurality of successive positions being established by the engaging action of the first clutch serving as the first input clutch, and the engaging action of another of the plurality of clutches or one of the plurality of brakes, and the second group of successive operating positions consist of the plurality of successive positions each of which is established by the engaging action of the fifth clutch serving as the second input clutch, and the engaging action of the above-indicated another of the plurality of clutches and the above-indicated one of the plurality of brakes.

The above-indicated plurality of successive positions of the first and second groups selected from among the first-speed through fourth-speed positions may be selected in a manner similar to that described with respect to the above-described mode (27). The engaging actions of the first or fifth clutch and the third or fourth clutch to establish the fourth-speed position mean the engaging actions of the two clutches which consist of one of the first and fifth clutches and one of the third and fourth clutches. Namely, the fourth-speed position may be established by the engaging actions of one of four combinations of the clutches, that is, 1) the engaging actions of the first and third clutches, 2) the engaging actions of the first and fourth clutches, 3) the engaging actions of the third and fifth clutches, and 4) the engaging actions of the fourth and fifth clutches.

In the automatic transmission constructed according to any one of the above-described modes (28)-(32), a maximum of eight operating positions can be provided by the primary shifting portion including the four planetary gear sets, five clutches and two brakes, in combination with the two input paths having different speed ratios. This arrangement permits light-weight and compact construction of the automatic transmission, and facilitate the shifting operations of the automatic transmission, with a reduced shifting shock, by engaging actions of the appropriate combination of two coupling devices selected from among the four clutches and three brakes.

In the automatic transmission according to the above-described mode (29) or (30), the first through sixth rotary elements are constituted by the respective elements of the four primary planetary gear sets of the primary shifting portion, as described above. By determining the gear ratios ρ of the four planetary gear sets within a suitable range, the speed ratios of the individual operating positions including the first and second groups of successive operating positions, and the stepping ratios of the adjacent two successive positions can be determined as desired, with the overall speed ratio range or so-called "spread" being as broad as about 6 or more, by using the planetary gear sets having comparatively small sizes (diameters).

The automatic transmission according to the above-described mode (31) is one form of the automatic transmission according to the above-described mode (22), wherein the primary first planetary gear set has a stepped pinion which has a large-diameter portion meshing with the ring gear of the primary third planetary gear set, which is selectively connected to the second input path through the fifth clutch. This arrangement permits simple and compact construction and reduced cost of manufacture of the automatic transmission having the selectable first and second groups of successive operating positions.

(33) The automatic transmission according to any one of the above-described modes (17)-(32), wherein the second input path is partially defined by a first planetary gear set having three rotary elements consisting of a first element which is connected to and rotated by the input member, a second element which is held stationary, and a third element which functions as an intermediate output member a rotary motion of which is transmitted to the primary shifting portion such that a speed of the rotary motion received from the input member is lowered during transmission of the rotary member through the second input path, and wherein the first input path is arranged such that the rotary motion of the input member is transmitted through the first input path to the primary shifting portion at a speed ratio of 1.0.

The above-described modes (25) and (30) are preferred arrangements of the above-described modes (17)-(21), and have substantially the same advantages as described above with respect to the modes (17) and (18).

The automatic transmission according to the present invention is suitably used for a motor vehicle. In this case, a rotary motion of a vehicle drive power source such as an internal combustion engine is received by the automatic transmission through a suitable fluid-operated coupling device such as a torque converter, for example, and the speed of the rotary motion is changed at a selected speed ratio by the automatic transmission. The output of the automatic transmission is transmitted from its output gear or output shaft to right and left drive wheels of the vehicle through a differential gear device. However, the present automatic transmission is usable for any equipment or machines other than motor vehicles. The input member of the automatic transmission may be connected to the turbine shaft of the torque converter of a motor vehicle.

Where the automatic transmission is used for a motor vehicle of an FF type (front-engine front-drive) type, the automatic transmission is installed on the vehicle such that the axial direction of the automatic transmission is parallel to the direction of width of the vehicle. Where the automatic transmission is used for a motor vehicle of a FR type (front-engine rear-drive type), the automatic transmission is installed on the vehicle such that the axial direction of the automatic transmission is parallel to the longitudinal or running direction of the vehicle.

The automatic transmission may be controlled so as to be automatically shifted up and down on the basis of running conditions of the vehicle such as the operating amount of an accelerator pedal and the vehicle running speed. However, the automatic transmission may be shifted up and down depending upon operating states of operator-controlled switches. The number of the operating positions of the automatic transmission of the present invention is not particularly limited. The automatic transmission according to the above-described modes (7)-(15) and (23)-(32) may have a maximum eight operating positions. Although the automatic transmission desirably has more than six or seven operating positions, it may have four or five operating positions. The operating positions may be selected from among the eight forward-drive positions described above with respect to the mode (27) or (32), depending upon the desired speed ratios of the individual positions, the desired stepping ratios of the adjacent successive positions, and the desired overall speed ratio range ("spread"). For instance, the seven or smaller operating positions are selected by eliminating only the first-speed position and/or any one or ones of the second-speed through sixth-speed positions of the above-indicated eight forward-drive positions.

The number of the successive operating positions of the first and second groups may be at least two. The first and second groups may have the same number of the successive operating positions, or respective different numbers of the successive operating positions. For instance, the number of the successive operating positions of one of the two groups may be larger or smaller by one than that of the other group. For example, the first group has three operating positions while the second group has two operating positions.

In the automatic transmission according to any one of the above-described modes (4), (11), (15), (20), (27) and (32), the combinations of operating states (engaged and released states) of the clutches and brakes to establish the successive operating positions of the first group are the same as those to establish the successive operating positions of the second group, except for the operating states of the first and second input clutches. In the above-described modes (1)-(3) and (17)-(19), for example, the clutches or brakes that are engaged together with the first input clutch to establish the successive operating positions of the first group may be different from those that are engaged together with the second input clutch to establish the successive operating positions of the second group.

In operation of the automatic transmission, one of the first and second groups of successive operating positions may be automatically selected depending upon one of different running modes (e.g., power running mode, a snow-running mode, an economy running mode) of the vehicle which is selected by the vehicle operator, or may be directly selected by the vehicle operator, by operating a selector switch. Alternatively, the first or second group may be automatically selected depending upon outputs of detectors or sensors that are provided to detect a vehicle driving behavior of the vehicle operator, an anti-lock brake control mode of a vehicle braking system, an accelerating state or an engine-braking state of the vehicle, and a running condition or environment of the vehicle (e.g., running on a snow-covered road surface or an uphill road surface). Further, the first or second group of successive operating positions is permanently selected depending upon the specific model or configuration of the vehicle. In the automatic transmission according to the above-described mode (2), the first and second groups need not be provided, provided that some of the operating positions of the automatic transmission are established by selectively engaging the firsts input clutch or the second input clutch. The automatic transmission according to the mode (2) can be given a relatively large number of operating positions the speed ratios, stepping ratio and spread (overall speed ratio range) of which are determined as needed.

Where the automatic transmission is automatically shifted up and down on the basis of vehicle running conditions (accelerator pedal position and running speed) and according to shift-up and shift-down maps, one of the first and second groups of successive operating positions may be selected depending upon the selected running mode of the vehicle as described above. In this case, the automatic transmission is controlled more adequately depending upon the specific running conditions and the selected running mode. Namely, the number of the operating positions, their speed ratios, stepping ratios and overall speed ratio range can be changed by changing the selected group of successive operating positions. In this respect, the shift-up and shift-down maps used for shifting the automatic transmission depending upon the running conditions of the vehicle are desirable changed depending upon the selected first or second group of successive operating positions. In other words, it is desirable to use two sets of shift-up and shift-down maps corresponding to the respective first and second groups of successive operating positions. In this case, one of the first and second groups is selected by the vehicle operator, by using a suitable selector switch, for example, and one of the two sets of shift-up and shift-down maps is automatically selected depending upon the selected first group or second group.

Although the principle of the present invention requires the automatic transmission to have at least the first and second groups of successive operating positions corresponding to the respective first and second input clutches, the automatic transmission may have three or more groups of successive operating positions including the first and second groups described above. For example, the three groups consist of the first and second groups described above, and a third group the successive operating positions of which are established by an engaging action of a third input clutch together with an engaging action of at least one frictional coupling device selected from among the other clutches and the brakes.

In the automatic transmission according to any one of the above-described modes (6), (10), (22), (26) and (31), the adjacent two planetary gear sets have one and the other of the first and second rotary elements in the form of sun gears or ring gears, and have a common stepped pinion having a large-diameter portion and a small-diameter portion which mesh with one and the other of the large-diameter and small-diameter portions. However, those adjacent two planetary gear sets may be ordinary planetary gear sets which do not have such a common stepped pinion.

The first through fourth clutches and the first through third brakes in the above-described modes (1), (2), (9) and (14), and the first through fifth clutches and the first and second clutches in the above-described modes (17), (18), (25) and (30) are preferably hydraulically operated frictional coupling devices of multiple- or single-disk type or belt type, which are engaged by respective hydraulic cylinders. However, other coupling devices such as electromagnetically operated coupling devices may be used as the clutches and brakes. For facilitating the shifting actions of the automatic transmission, one-way clutches may be disposed in parallel with selected ones of the clutches and brakes. For instance, the provision of one-way clutches in parallel with the third brake in the automatic transmission according to any one of the above-described modes (7)-(15) and (23)-(32) permits the first-speed position to be established by engaging only the first clutch, and the second-speed position to be established by engaging only the second brake. Where the application of an engine brake to the vehicle is not required, the third brake may be replaced by a one-way clutch, since the one-way clutch is capable of stopping the rotary motion of the appropriate rotary element, like the third brake. Other modifications are possible. For example, a series connection of a brake and a one-way clutch may be disposed in parallel with the second brake.

In the automatic transmission according to any one of the above described modes (7)-(15), the output rotary element is disposed on one side of the second rotary element, while only the first rotary element is disposed on the other side of the second rotary element. In the automatic transmission according to the above-described mode (2) or (3), however, two or more rotary elements may be disposed on the above-indicated other side of the second rotary element. In this case, appropriate clutches and brakes may be provided for selectively connecting those two or more rotary elements to the second input path or stopping these rotary elements. However, one clutch may be used for selectively connecting a plurality of the above-indicated two or more rotary elements to the second input path, and a brake may be used for stopping another of those rotary elements.

In the automatic transmission according to any one of the above-described modes (7)-(15), the first clutch is used to selectively connecting the sixth or fifth rotary element to the second input path, to establish the operating positions in which the speed of the output rotary element is lower than that of the rotary element received through the first input path. In the automatic transmission according to any one of the above-described modes (1)-(6), however, the fifth and sixth rotary elements and the first clutch are not essential. In the automatic transmission according to any one of the above-described modes (7)-(11), it is possible to eliminate the fourth rotary element and the third brake for establishing the first-speed position, or the second brake for establishing the second-speed position.

In the automatic transmission according to any one of the above-described modes (23)-(32), the sixth-speed, seventh-speed and eighth-speed positions, or the fifth-speed through eighth-speed positions are provided as the operating positions having the speed ratios equal to or lower than 1.0. However, the automatic transmission according to any one of the above-described modes (17)-(22) may have only the speed-positions having the speed ratios higher than 1.0.

The first and second input paths have respective constant speed ratios. However, each of these input paths has a variable speed ratio, for example, two speed ratios. A third input path having a speed ratio different from those of the first and second input paths may be provided.

In the automatic transmission according to the above-described mode (16) or (33), the second input path is partly defined by the first planetary gear set, and has a speed ratio higher than 1.0. Namely, the ratio of the rotating speed of the input member to the rotating speed of the rotary motion as received by the primary shifting portion through the second input path is higher than 1.0, so that the speed of the rotary motion as received by the primary shifting portion through the second input path is lower than the rotating speed of the input member. On the other hand, the first input path has a speed ratio of 1.0, that is, the speed of the rotary motion as received by the primary shifting portion through the first input path is equal to the rotating speed of the input member. In the other modes of the invention, however, the speed ratio of the first input path need not be 1.0. For instance, the first input path has a speed ratio lower than 1.0, so that the speed of the rotary motion as received by the primary shifting portion through the first input path is higher than the rotating speed of the input member, while on the other hand the second input path has a speed ratio of 1.0, so that the speed of the rotary motion as received by the primary shifting portion through the second input path is equal to the rotating speed of the input member. The first planetary gear set may be disposed coaxially with the primary shifting portion.

The first planetary gear set used in the automatic transmission according to the above-described mode (16) or (33) is preferably a planetary gear set of double-pinion or single-pinion type having three rotary elements in the form of a sun gear, a carrier and a ring gear. One of the sun gear, carrier and ring gear is connected to the input member, and another of these three rotary members is held stationary, while the other one serves as an intermediate output member a rotating speed of which is reduced with respect to the rotating speed of the input member.

Where the planetary gear set is of a single-pinion type, the pinion gear is rotatably supported by the carrier may be a stepped pinion having a large-diameter portion and a small-diameter portion. This type of planetary gear set may be called a composite planetary gear set. In this case, the three rotary elements consist of the carrier, and the sun and ring gears which mesh with one and the other of the large-diameter and small-diameter portions of the stepped pinion. Alternatively, the three rotary elements consist of the carrier, and a large-diameter sun gear and a small-diameter sun gear which respectively mesh with the large-diameter and small-diameter portions of the stepped pinion, or consist of the carrier, and a large-diameter ring gear and a small-diameter ring gear which respectively mesh with the large-diameter and small-diameter portions of the stepped pinion.

In the automatic transmission according to the above described mode (16) or (33), the first input path is partly defined by the first planetary gear set. However, the first and second input paths may be provided in an automatic transmission having two parallel shafts. For instance, the automatic transmission includes (a) a first shaft connected to the input member, (b) a second shaft which is parallel to the first shaft and on which the primary shifting portion is disposed, (c) a first power transmitting mechanism disposed between the first and second shafts and operable to transmit a rotary motion of the input member from the first shaft to the second shaft at a predetermined first speed ratio (=rotating speed of the first shaft to the rotating speed of the second shaft), and (d) a second power transmitting mechanism disposed between the first and second shafts and operable to transmit the rotary motion of the input shaft from the first shaft to the second shaft at a predetermined second speed ratio higher than the first speed ratio. In this type of automatic transmission, the first input path is partly defined by the first power transmitting mechanism, while the second input path is partly defined by the second power transmitting mechanism.

The above-described first and second power transmitting mechanisms for transmitting the rotary motion from the first shaft to the second shaft may use a suitable transmission mechanism, such as a pair of counter gears, a set of a pulley and a belt, or a set of a sprocket and a chain. The primary shifting portion may be constructed as described above with respect to the above-described modes (7)-(15) and (23)-(32), or may be otherwise constructed with various arrangements of connection of the rotary elements through the clutches and brakes.

The positional relationship of the primary first through fourth planetary gear sets, or the primary first, second and third planetary gear sets is not particularly limited. For instance, the first through fourth primary planetary gear sets may be arranged in this order in the axial direction, or the primary first or fourth planetary gear set may be disposed intermediate between the other two adjacent primary planetary gear sets. The clutches and brakes may be arranged as needed. For instance, the clutches and brakes may be disposed at one axial end portion or at opposite end portions of the appropriate planetary gear set.

While the first and second input paths may have respective fixed or constant speed ratios, the speed ratio of each of these input paths may be variable. Further, the automatic transmission may have a third input path a speed ratio of which is different from those of the first and second input paths.

The automatic transmission according to any one of the above-described modes (23)-(27) is substantially identical in construction with an automatic transmission as disclosed in JP-2003-130 152A (described above under the heading of BACKGROUND OF THE INVENTION) and as modified such that the first pinion gear of the planetary gear set of double-pinion type of the primary shifting portion (second shifting portion) is a stepped pinion, which meshes with the third sun gear (sun gear of the primary third planetary gear set) and which is selectively connected to the second input path through the fifth clutch. In this case, the plurality of planetary gear sets, clutches and brakes may be arranged and positioned relative to each other in various manners, as disclosed in JP-2003-130 152.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENTS

Figure 1:
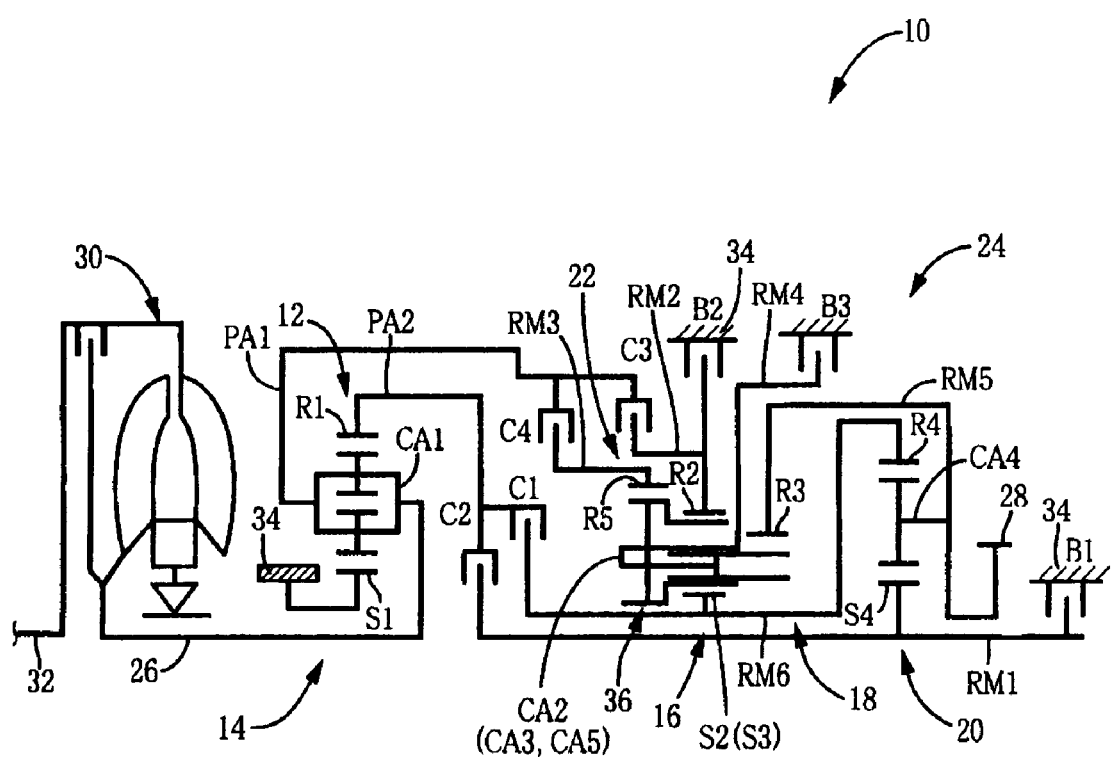
FIG. 1 is a schematic view illustrating a basic arrangement of an automatic transmission for a vehicle, which is constructed according to a first embodiment of the present invention.

Referring to first to the schematic view of FIG. 1, there is illustrated a basic arrangement of an automatic transmission 10 for a motor vehicle, which is constructed according to the first embodiment of this invention. As shown in FIG. 1, the automatic transmission 10 includes a first shifting portion 14 constituted principally by a first planetary gear set 12 of double-pinion type, and a second shifting portion 24 constituted principally by a second planetary gear set 16 of single-pinion type, a third planetary gear set 18 of double-pinion type, a fourth planetary gear set 20 of single-pinion type, and a fifth planetary gear set 22. The automatic transmission 10 has an input shaft 26 and an output gear 28, and is arranged to transmit a rotary motion of the input shaft 26 to the output gear 28 such that a speed ratio of the input shaft 26 and the output gear is controllable. The input shaft 26 and the output gear 28 respectively function as an input member and an output member of the automatic transmission 10. The input shaft 26 receives, through a torque converter 30, a rotary motion of a crankshaft 32 of a drive power source in the form of an internal combustion engine. The crankshaft 32 is connected to a turbine shaft of the torque converter 30. The output gear 28 is operatively connected to right and left drive wheels of the vehicle through a differential gear device. Since the automatic transmission 10 is constructed symmetrically with respect to its axis, the lower half of the automatic transmission 10 located below the axis is omitted in the schematic view of FIG. 1. This omission also applies to automatic transmissions according to the other embodiments which will be described.

The first planetary gear set 12 of the first shifting portion 14 has a carrier CA1 that is connected to and rotated by the input shaft 26, a sun gear S1 that is fixed to a casing 34 of the automatic transmission 10 and is not rotatable, and a ring gear R1 that functions as an intermediate output member for transmitting a rotary motion of the input shaft 26 to the second shifting portion 24 such that the speed of the rotary motion of the second shifting portion 24 is lower than that of the input shaft 26. Thus, a second input path PA2 for transmitting the rotary motion of the input shaft 26 to the second shifting portion 24 is defined by the carrier CA1 of the first planetary gear set 12, pinion gears of the carrier CA1, and the intermediate output member in the form of the ring gear R1 of the first planetary gear set 12. The speed of the rotary motion of the input shaft 26 is reduced by transmission of the rotary motion through the second input path PA2, at a speed ratio $1/(1-\rho 1)$ which is determined by a gear ratio $\rho 1$ of the first planetary gear set 12, which is a ratio of the number of teeth of the sun gear S1 to the number of teeth of the ring gear R1. In addition to the second input path PA2, there is also provided a first input path PA1 through which the rotary motion of the input shaft 26 is transmitted to the second shifting portion 24, without speed reduction, that is, at a speed ratio of 1.0. In the present embodiment, the first input path PA1 is partly defined by the carrier CA1 of the first planetary gear set 12 of the first shifting portion 14.

The second shifting portion 24 is a primary shifting portion, wherein the second, third, fourth and fifth planetary gear sets 16, 18, 20 and 22 are respectively primary first, second, third and fourth planetary gear sets. The second planetary gear set 16 has a stepped pinion 36 including a small-diameter portion functioning as a pinion gear, and a large-diameter portion meshing with a ring gear R5 of the fifth planetary gear set 22. This ring gear R5 corresponds to a fourth ring gear of the second shifting portion 24. The second and third planetary gear sets 16, 18 have respective carriers CA2 and CA3 which are formed of a single common member, and respective sun gears S2 and S3 which are also formed of a single common member. The pinion gear (stepped pinion gear) 36 of the second planetary gear set 16 also functions as a first pinion gear (a pinion gear meshing with the sun gear S3) of the third planetary gear set 18.

The second, third, fourth and fifth planetary gear sets 16, 18, 20, 22 of the second shifting portion 24, which are partly connected to each other, have a total of six rotary elements RM1-RM6. Described in detail, the fourth planetary gear set 20 has a sun gear S4 functioning as the first rotary element RM1, and the second planetary gear set 16 has a ring gear R2 functioning as the second rotary element RM2, while the ring gear R5 of the fifth planetary gear set 22 functions as the third rotary element RM3. The carriers CA2 and CA3 of the second and third planetary gear sets 16, 18 are connected to a carrier CA5 of the fifth planetary gear set 22, and cooperate with this carrier CA5 to constitute the fourth rotary element RM4. The third planetary gear set 18 has a ring gear R3, which cooperates with a carrier CA4 of the fourth planetary gear set 20 to constitute the fifth rotary element RM5. The sun gears S2 and S3 of the second and third planetary gear sets 16, 18 are connected to a ring gear R4 of the fourth planetary gear set 20, and cooperate with this ring gear R4 to constitute the sixth rotary element RM6.

The first rotary element RM1 (sun gear S4) is selectively fixed to the casing 34 by a first brake B1 and is thereby selectively brought into a stationary state, and the second rotary element RM2 (ring gear R2) is selectively fixed to the casing 34 by a second brake B2 and is thereby selective brought into a stationary state. The fourth rotary element RM4 (carriers CA2, CA3 and CA5) is selectively fixed to the casing 34 by a third brake B3 and is thereby selectively brought into a stationary state, and the sixth rotary element RM6 (sun gears S2 and S3, and ring gear R4) is selectively connected through a first clutch C1 to the intermediate output member in the form of the ring gear R1 of the first planetary gear set 12, that is, to the second input path PA2. The first rotary element RM1 (sun gear S4) is selectively connected through a second clutch C2 to the ring gear R1, that is, to the second input path PA2, and the second rotary element RM2 (ring gear R2) is selectively connected through a third clutch C3 to the input shaft 26, that is, to the first input path PA1. The third rotary element RM3 (ring gear R5) is selectively connected through a fourth clutch C4 to the input shaft 26, that is, to the first input path PA1, and the fifth rotary element RM5 (ring gear R3 and carrier CA4) is integrally connected to the output member in the form of the output gear 28, so that the rotary motion is outputted from the automatic transmission 10 through the output gear 28. The third clutch C3 corresponds to a first input clutch, and the fourth clutch C4 corresponds to a second input clutch. The second rotary element RM2 corresponds to a first input rotary element, and the third rotary element RM3 corresponds to a second input rotary element, while the fifth rotary element RM5 corresponds to an output rotary element. The first, second and third brakes B1, B2, B3, and the first through fourth clutches C1-C4 are all hydraulically operated, multiple-disc type frictional coupling devices, which are operable by respective hydraulic cylinders.

Figures 2A, 2B:
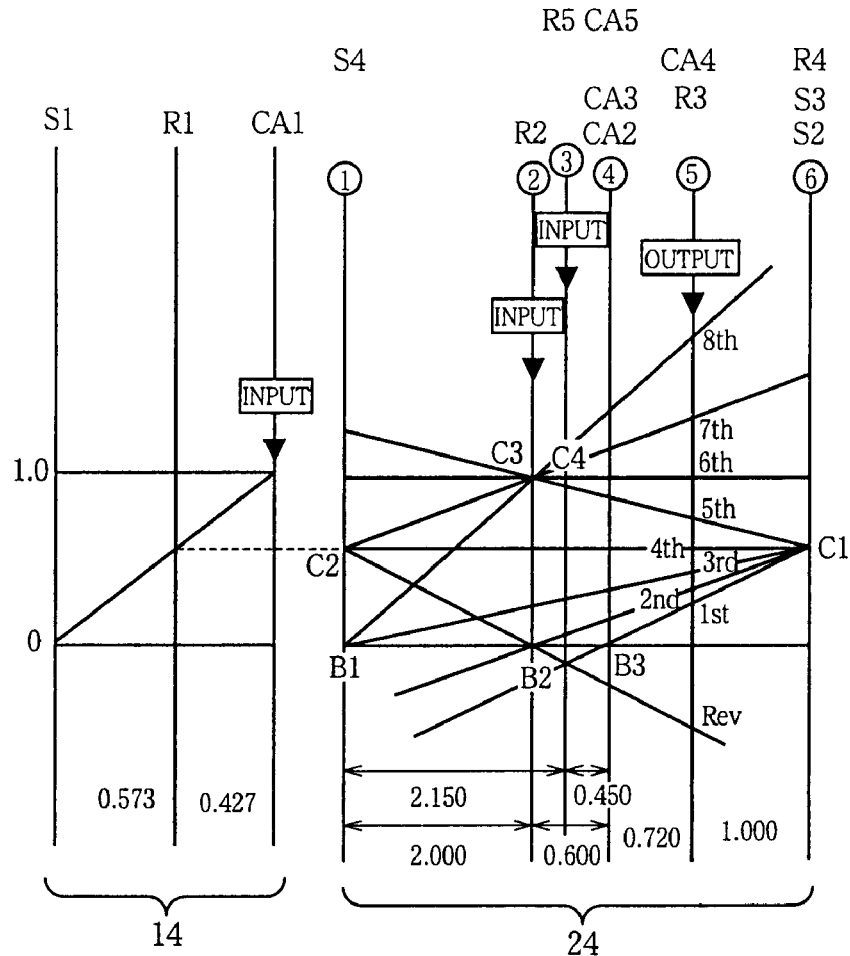
FIG. 2A is a collinear chart showing an operational relationship of the automatic transmission of FIG. 1 when a first group of operating positions of the transmission is selected.
FIG. 2B is a view indicating a relationship between the operating positions of the transmission of FIG. 1 and respective combinations of operating states of hydraulically operated frictional coupling devices, when the first group of operating positions is selected.

The collinear chart of FIG. 2A indicates, by straight lines, a relationship among the rotating speeds of the rotary elements of the first and second shifting portions 14, 24 when the automatic transmission 10 is placed in each of its operating positions. The collinear chart of FIG. 2A is a two-dimensional coordinate system having a vertical axis and a horizontal axis and wherein relative rotating speeds of the rotary elements are taken along respective nine straight lines parallel to the vertical axis, which straight lines are spaced apart from each other in a direction parallel to the horizontal axis, such that distances between adjacent ones of the three vertical straight lines corresponding to the three rotary elements S1, R1 and CA1 of the first shifting portion 14 are determined by a gear ratio $\rho 1$ of 0.427 of the first planetary gear set 12, and such that distances between adjacent ones of the six vertical straight lines corresponding to the six rotary elements RM1-RM6 of the second shifting portion 24 are determined by a gear ratio $\rho 2$ of 0.349 of the second planetary gear set 16, a gear ratio $\rho 3$ of 0.419 of the third planetary gear set 18, a gear ratio $\rho 4$ of 0.301 of the fourth planetary gear set 20 and a gear ratio $\rho 5$ of the fifth planetary gear set 22. A lower one of two horizontal straight lines corresponds to the rotating speed of 0, while the upper straight line corresponds to the rotating speed of 1.0, that is, indicates the rotating speed of the input shaft 26. The first three vertical straight lines as counted from the left to the right respectively correspond to the sun gear S1 ring gear R1 and carrier CA1, while the remaining six vertical straight lines as counted from the left to the right respectively correspond to the first rotary element RM1 (sun gear S4), the second rotary element RM2 (ring gear R2), the third rotary element RM3 (ring gear R5), the fourth rotary element RM4 (carriers CA2, CA3 and CA5), the fifth rotary element RM5 (ring gear R3 and carrier CA4), and the sixth rotary element RM6 (sun gears S2, S3 and ring gear R4). In the collinear chart, the numbers indicated within respective circles represent the rotary elements RM1-RM6. This numerical representation applies to collinear charts corresponding to the other embodiments described below.

As indicated in FIG. 2B, the automatic transmission 10 have eight forward-drive positions and one rear-drive position "Rev". The forward-drive positions are: a first-speed position "1st", "2nd", "3rd", "4th", "5th", "6th", "7th" and "8th". The first-speed position "1st" has a highest speed ratio (rotating speed of the input shaft 26/rotating speed of the output gear 28). As is apparent from the collinear chart of FIG. 2A, the first-speed position "1st" is established by engaging actions of the first clutch C1 and the third brake B3, which cause deceleration of the sixth rotary element RM6 through the first shifting portion 14, and stopping of the fourth rotary element RM4, so that the fifth rotary element RM5 connected to the output gear 28 is rotated in the forward direction at a speed indicated by a point of intersection between the vertical straight line corresponding to the fifth rotary element RM5 and an inclined straight line indicated, by "1st" in the collinear chart. The second-speed position "2nd" having a lower speed ratio than the first-speed position "1st" is established by engaging actions of the first clutch C1 and the second brake B2, which cause deceleration of the sixth rotary element RM6 through the first shifting portion 14 and stopping of the second rotary element RM2, so that the fifth rotary element RM5 connected to the output gear 28 is rotated at a speed indicated by a point of intersection between the vertical straight line corresponding to the fifth rotary element RM5 and an inclined straight line indicated by "2nd". The third-speed position "3rd" having a lower speed ratio than the second-speed position "2nd" is established by engaging actions of the first clutch C1 and the first brake B1, which cause deceleration of the sixth rotary element RM6 through the first shifting portion 14 and stopping of the first rotary element RM1, so that the fifth rotary element RM5 is rotated at a speed indicated by a point of intersection between the vertical straight line corresponding to the fifth rotary element RM5 and an inclined line indicated by "3rd". The fourth-speed position "4th" having a lower speed ratio than the third-speed position "3rd" is established by engaging actions of the first and second clutches C1, C2, which cause deceleration of the second shifting portion 24 as a unit through the first shifting portion 14, so that the fifth rotary element RM5 is rotated at a speed indicated by a point of intersection between the vertical straight line corresponding to the fifth rotary element RM5 and a horizontal straight line indicated by "4th".

The fifth-speed position "5th" having a lower speed ratio than the fourth-speed position "4th" is established by engaging actions of the first and third clutches C1, C3, which cause deceleration of the sixth rotary element RM6 through the first shifting portion 14 and rotation of the second rotary element RM2 with the input shaft 26, so that the fifth rotary element RM5 is rotated at a speed indicated by a point of intersection between the vertical straight line corresponding to the fifth rotary element RM5 and an inclined line indicated by "5th". This fifth-speed position "5th" may be established by engaging actions of the first and fourth clutches C1, C4. The sixth-speed position "6th" having a lower speed ratio than the fifth-speed position "5th" is established by engaging actions of the third and fourth clutches C3, C4, which cause rotation of the second shifting portion 24 as a unit with the input shaft 26, so that the fifth rotary element RM5 is rotated at a speed indicated by a point of intersection between the vertical straight line corresponding to the fifth rotary element RM5 and an inclined line indicated by "6th", that is, rotated at a speed equal to that of the input shaft 26. This sixth-speed position "6th" has the speed ratio of 1.0. The seventh-speed position "7th" having a lower speed ratio than the sixth-speed position "6th" is established by engaging actions of the second and third clutches C2, C3, which cause deceleration of the first rotary element RM1 through the first shifting portion 14 and rotation of the second rotary element RM2 with the input shaft 26, so that the fifth rotary element RM5 is rotated at a speed indicated by a point of intersection between the vertical straight line corresponding to the fifth rotary element RM5 and an inclined line indicated by "7th". The eighth-speed position "8th" having a lower speed ratio than the seventh-speed position "7th" is established by engaging actions of the third clutch C3 and the first brake B1, which cause rotation of the second rotary element RM2 with the input shaft 26 and stopping of the first rotary element RM1, so that the fifth rotary element RM5 is rotated at a speed indicated by a point of intersection between the vertical straight line corresponding to the fifth rotary element RM5 and an inclined line indicated by "8th".

The reverse-drive position "Rev" is established by engaging actions of the second clutch C2 and the second brake B2, which cause deceleration of the first rotary element RM1 through the first shifting portion 14 and stopping of the second rotary element RM2, so that the fifth rotary element RM5 is rotated in the reverse direction, at a speed indicated by a point of intersection between the vertical straight line corresponding to the fifth rotary element RM5 and an inclined line indicated by "Rev". The reverse-drive position "Rev" having a higher speed ratio than the reverse-drive position established by the engaging actions of the second clutch C2 and the second brake B2 may be established by engaging actions of the second clutch C2 and the third brake B3, which cause deceleration of the first rotary element RM1 through the first shifting portion 14 and stopping of the fourth rotary element RM4. One of these two reverse-drive positions "Rev" is used as the reverse-drive position. Alternatively, those two reverse-drive positions are selectively established depending upon the situation.

Referring to FIG. 2B, there is indicated a relationship between the above-indicated nine operating positions of the automatic transmission 10 and respective combinations of operating states of the frictional coupling devices in the form of the clutches C1-C4 and brakes B1-B3. In this figure, circles "o" indicate the engaged states of the clutches and brakes, while the absence of the circles indicates the released states of the clutches and brakes. It will be understood from FIG. 2B that a selected one of the eight successive forward-drive positions can be established by engaging the appropriate combination of two frictional coupling devices selected from among the four clutches C1-C4 and three brakes B1-B3. The speed ratios of the nine operating positions are determined by gear ratios $\rho1$-$\rho4$ of the first, second, third and fourth planetary gear sets 12, 16, 18, 20. For example, the nine operating positions have speed ratios indicated in FIG. 2B, where the gear ratios $\rho1$-$\rho4$ are as follows: $\rho1=0.427$, $\rho2=0.349$, $\rho3=0.419$, $\rho4=0.301$. In this specific example, the stepping ratios of the adjacent operating positions are almost equal to each other, and the overall range of the speed ratio ("spread"=4.169/0.602) of the forward-drive positions is as broad as about 6.921. Further, the reverse-drive position "Rev" has a suitably selected speed ratio of 2.644. Thus, the automatic transmission 10 as a whole exhibits satisfactory speed ratio characteristics.

Figures 3A, 3B:
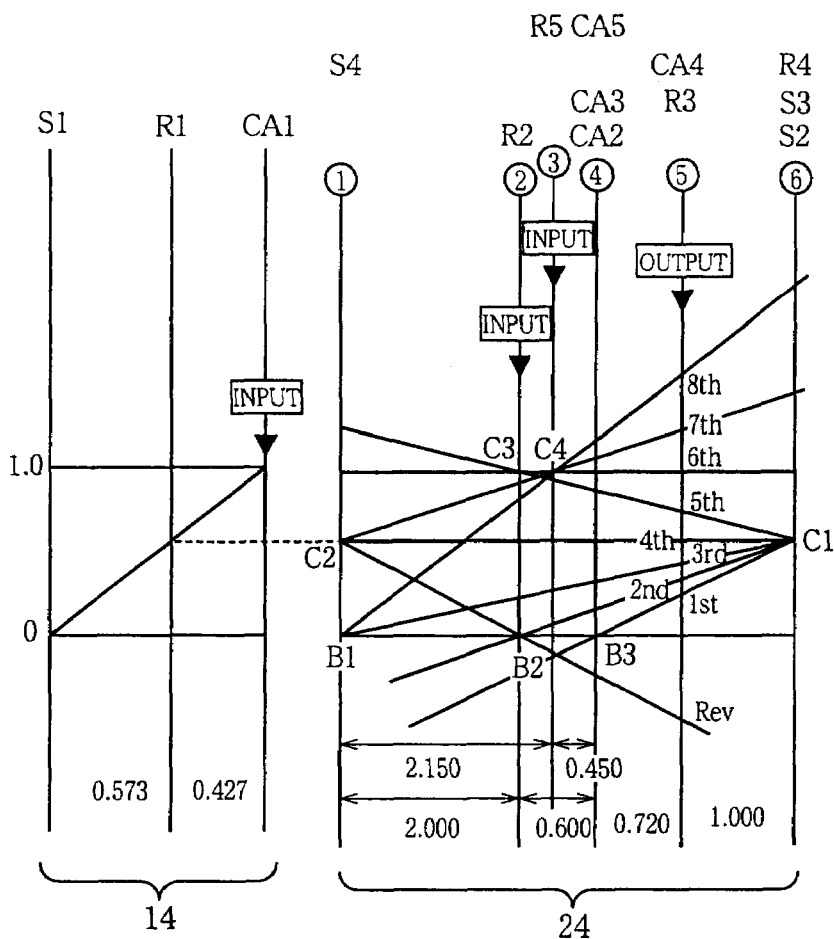
FIG. 3A is a collinear chart showing an operational relationship of the automatic transmission of FIG. 1 when a second group of operating positions of the transmission is selected.
FIG. 3B is a view indicating a relationship between the operating positions of the transmission of FIG. 1 and respective combinations of operating states of hydraulically operated frictional coupling devices, when the second group of operating positions is selected.

The eight forward-drive positions "1st" through "8th" indicated in FIGS. 2A and 2B form a first group of operating positions, wherein the seventh-speed and eighth-speed positions "7th" and "8th" having the speed ratios lower than 1.0 (for outputting a rotary motion a speed of which is higher than the speed of the rotary motion received from the first input path PA1) are established by engaging the third clutch C3 as well as the second clutch C2 or first brake B1. The automatic transmission 10 has a second group of operating positions wherein the seventh-speed and eighth-speed positions "7th" and "8th" are established by engaging the fourth clutch C4 as well as the second clutch C2 or first brake B1, as indicated in FIGS. 3A and 3B, so as to rotate the third rotary element RM3 with the input shaft 26. The speed ratios of these seventh-speed and eighth-speed positions of the second group of operating positions of FIG. 3B, which are established by engaging the fourth clutch C4, are different from those of the first group of operating positions of FIG. 2B, which are established by engaging the third clutch C3, and are determined by the position of the third rotary element RM3 (ring gear R5) in the direction parallel to the horizontal axis of the collinear chart of FIG. 3A. That is, the speed ratios of the seventh-speed and eighth-speed positions are determined by a gear ratio $\rho5$ of the fifth planetary gear set 22.

As indicated in FIG. 3B, the seventh-speed position "7th" of the second group of operating positions is established by the engaging actions of the second and fourth clutches C2, C4, which cause deceleration of the first rotary element RM1 through the first shifting portion 14 and rotation of the third rotary element RM3 with the input shaft 26, and the eighth-speed position "8th" is established by the engaging actions of the fourth clutch C4 and the first brake B1, which cause rotation of the third rotary element RM3 with the input shaft 26 and stopping of the first rotary element RM1.

By engaging the appropriate combination of the two frictional coupling devices (C1-C4, B1-B3), a selected one of the eight successive forward-drive positions of the second group of operating positions can be established. The speed ratios of the seventh-speed and eighth-speed positions "7th" and "8th" are determined by the gear ratio $\rho5$ of the fifth planetary gear set 22. For example, these positions "7th" and "8th" have the speed ratios indicated in FIG. 3B, where the gear ratio $\rho5$ is 0.262. Namely, the speed ratio of the seventh-speed position "7th" of the second group is 0.881 slightly higher than the speed ratio of 0.780 of the seventh-speed position of the first group, and the gear ratio of the eighth-speed position "8th" of the second group is 0.648 slightly higher than the speed ratio of 0.602 of the eighth-speed position of the first group. Accordingly, the automatic transmission 10 placed in the seventh-speed or eighth-speed position of the second group provides a larger drive torque than in the corresponding position of the first group. The second group of operating positions has a spread (overall range of speed ratio) of about 6.433, which is narrower than the spread of 6.921 of the first group.

The second group of operating positions of FIG. 3B including the seventh-speed and eighth-speed positions established by engaging the fourth clutch C4 as well as the second clutch C2 or first brake B1 assures a higher degree of drivability at a relatively high running speed of the vehicle, than the first group of operating positions of FIG. 2B including the seventh and eighth-speed positions established by engaging the third clutch C3 as well as the second clutch C2 or first brake B1.

Figure 4:
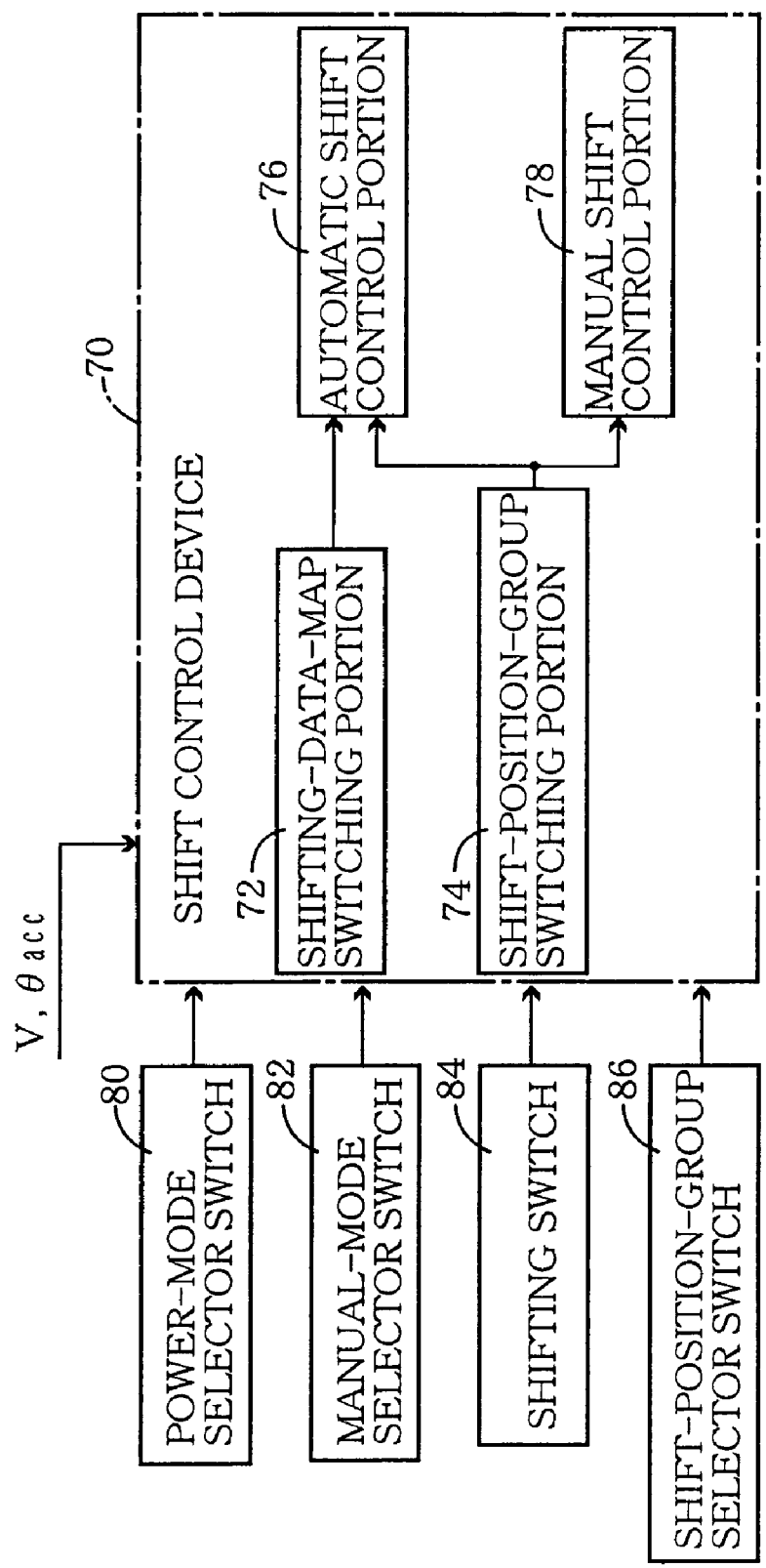
FIG. 4 is a block diagram illustrating functional elements of a control device for controlling the automatic transmission of FIG. 1.

The automatic transmission 10 having the two groups of operating positions as described above is controlled by a shift control device 70 illustrated in the block diagram of FIG. 4. The shift control device 70 is principally constituted by a microcomputer incorporating a central processing unit (CPU), a random-access memory (RAM), and a read-only memory (ROM), and includes a shifting-data-map switching portion 72, a shift-position-group switching portion 74, an automatic shift control portion 76, and a manual shift control portion 78. The shift control device 70 is arranged to receive signals indicative of a running speed V of the vehicle and an operating amount $\theta$acc of an accelerator pedal of the vehicle, and output signals of a power-mode selectors switch 80, a manual-mode selector switch 82, a shifting switch 84 and a shift-position-group selector switch 86. The output signal of the power-mode selector switch 80 is generated to select a POWER RUNNING mode of the vehicle, and the output signal of the manual-mode selector switch 82 is generated to select a MANUAL SHIFT mode of the automatic transmission 10. The output signal of the shifting switch 84 is generated to manually shift up or down the automatic transmission 10 or select one of the operating positions of the automatic transmission 10. The output signal of the shift-position-group selector switch 86 is generated to select one of the first group of operating positions of FIG. 2B and the second group of operating positions of FIG. 3B. The manual-mode selector switch 82 and the shifting switch 84 are operated by operating a shift lever provided on the vehicle, for example. The power-mode selector switch 80 and the shift-position-group selector switch 86 are provided on an instrument panel provided on the vehicle, for example. The shift-position-group selector switch 86 has two positions corresponding to the first and second groups of operating positions, which are identified by respective labels indicating that the highest-speed position (eighth-speed position "8th") of the first and second groups have the respective lower and higher speed ratios, or that the first and second groups of operating positions have respective lower and higher degrees of vehicle drivability at a relatively high running speed.

The automatic shift control portion 106 is arranged to automatically shift the automatic transmission 10 to a selected one of the eight forward-drive positions "1st" through "8th", on the basis of the detected running speed V and operating amount θacc of the accelerator pedal and according to shift-up and shift-down maps representative of predetermined relationships between the operating positions and the running speed V and operating amount θacc. The manual shift control portion 78 is operable, when the MANUAL SHIFT mode of the automatic transmission 10 is selected by the manual-mode selector switch 82, to shift the automatic transmission 10 to one of the forward-drive positions "1st" through "8th", according to a manual shift-down or shift-up signal or a shift-position signal received from the shifting switch 84. The shifting-data-map switching portion 72 is arranged to select one of two sets of shift-up and shift-down maps, depending upon whether the POWER RUNNING mode is selected by the power-mode selector switch 80. Namely, the shifting-data-map switching portion 102 selects a set of shift-up and shift-down maps corresponding to the POWER RUNNING mode, when the POWER RUNNING mode is selected, and a set of shift-up and shift-down maps corresponding to a NORMAL RUNNING mode, when the POWER RUNNING mode is not selected. When the set of shift-up and shift-down maps corresponding to the POWER RUNNING mode is selected, the automatic transmission 10 is shifted up and down at relatively higher speeds than when the set of shift-up and shift-down maps corresponding to the NORMAL RUNNING mode is selected.

The shift-position-group switching portion 74 is arranged to select one of the first group of operating positions of FIG. 2B and the second group of operating positions of FIG. 3B, depending upon the output signal of the manual-mode selector switch 82, the output signal of the shift-position-group selector switch 86 and the output signal of the power-mode selector switch 80, so that the automatic transmission 10 is controlled by the automatic shift control portion 106 or the manual shift control portion 78. Described more specifically, the shift-position-group switching portion 74 commands the manual shift control portion 78 to shift the automatic transmission 10 according to the first or second group of operating positions which is selected by the shift-position-group selector switch 86 while the MANUAL SHIFT mode of the automatic transmission 10 is selected by the manual-mode selector switch 82. When the MANUAL SHIFT mode is not selected, the shift-position-group switching portion 72 commands the automatic shift control portion 78 to shift the automatic transmission 10 according to the second group of operating positions of FIG. 3B having the narrower spread, when the POWER RUNNING mode is selected by the power-mode selector switch 110, and according to the first group of operating positions of FIG. 2B, when the POWER RUNNING mode is not selected. When the shifting actions of the automatic transmission 10 are controlled according to the first group of operating positions, the seventh-speed and eighth-speed positions "7th" and "8th" are established by controlling solenoid-operated valves for controlling the hydraulic cylinders for the clutches C2, C3 and the first brake B1. When the shifting actions are controlled according to the second group of operating positions, the seventh- and eighth-speed positions are established by controlling solenoid-operated valves for the hydraulic cylinders for the clutches C2, C4 and the first brake B1.

The automatic transmission 10 according to the present first embodiment of this invention described above is arranged such that the second rotary element RM2 (first input rotary element) is selectively connected to the first input path PA1 through the third clutch C3 (first input clutch), for establishing the seventh-speed position "7th" and the eighth-speed position "8th" of the first group of operating positions of FIG. 2B, and such that the third rotary element RM3 (second input rotary element) is selectively connected to the first input path PA1 through the fourth clutch C4 (second input clutch), for establishing the seventh- and eighth-speed positions of the second group of operating positions of FIG. 3B. The first or second group of operating positions is selected depending upon the selected position of the shift-position-group selector switch 86 while the MANUAL SHIFT mode is selected, and depending upon whether the POWER RUNNING mode is selected while the MANUAL SHIFT mode is not selected. Accordingly, the shifting actions of the automatic transmission 10 of the present embodiment are controlled in a more adequate manner than those of the conventional automatic transmission.

Further, the rotary motion of the input shaft 26 is transmitted to the second shifting portion 24 through the first and second input paths PA1, PA2, and the first or second group of operating positions is selected by selecting the third clutch C3 or fourth clutch C4 to be engaged for transmission of the rotary motion received from the first input path PA1, so that the automatic transmission 10 can be relatively easily shifted between the seventh-speed and eighth-speed positions of the selected first or second group, while the third or fourth clutch C3, C4 is held in the engaged state. Accordingly, the automatic transmission 10 can be simplified in construction and made compact, and is available at a comparatively low cost of manufacture, while permitting easy installation on the vehicle.

The second and third rotary elements RM2, RM3 connected to the first input path PA1 through the respective third and fourth clutches C3, C4 are disposed adjacent to each other, as indicated at an almost intermediate position of the collinear chart of FIGS. 2A and 3A as seen in the direction parallel to the horizontal axis, and the output rotary element in the form of the fifth rotary element RM5 is located on one side of a set of the second and third rotary elements RM2, RM3, while the first rotary element RM1 which is selectively connected to the second input path PA2 through the second clutch C2 and selectively brought into the stationary state by the first brake B1 is located on the other side of the set of the second and third rotary elements RM2, RM3. The seventh-speed and eighth-speed positions "7th", "8th" of the first group are selectively established by engaging the second clutch C2 and the first brake B1, respectively, while the third clutch C3 is held in its engaged state, and those positions "7th", "8th" of the second group are selectively established by engaging the second clutch C2 and the first brake B1, respectively, while the fourth clutch C4 is held in its engaged state. Thus, the first and second groups of operating positions are available with a relatively simple arrangement of the automatic transmission 10.

As described above, the first and second groups of operating positions of FIGS. 2 and 3 are different from each other, only in that the third clutch C3 as well as the second clutch C2 or first brake B1 is engaged for establishing the seventh- and eighth-speed positions "7th" and "8th" of the first group, while the fourth clutch C4 as well as the second clutch C2 or first brake B1 is engaged for establishing those positions of the second group. Except for the engaging and releasing actions of the second and third clutches C2, C3, the combinations of the engaging and releasing actions of the clutches and brakes to establish the seventh- and eighth-speed positions of the first group are the same as those to establish those positions of the second group. The same set of clutches and brakes is used for the two groups of operating positions. Thus, the present automatic transmission 10 can be made simpler in construction and more compact and available at a lower cost, than an automatic transmission wherein different sets of clutches and brakes are used for the respective two groups of operating positions.

In the present embodiment, the small-diameter portion of the stepped pinion 36 meshes with the ring gear R2 of the second planetary gear set 16, which is connected to the first input path PA1 through the third clutch C3 to establish the seventh-speed and eighth-speed positions "7th" and "8th" of the first group the speed ratios of which are lower than 1.0, and the large-diameter portion of the stepped pinion 36 meshes with the ring gear R5 which is connected to the first input path PA1 through the fourth clutch C4 to establish the seventh- and eighth-speed positions of the second group. This arrangement is also effective to simplify the construction and reduce the size and cost of manufacture of the present automatic transmission 10 wherein the first and second groups of operating positions are selectively available.

Further, the present automatic transmission 10 including the first shifting portion 14 and the second shifting portion 24 provides the eight forward-drive positions, with a relatively simple and compact arrangement using the four planetary gear sets 12, 16, 18, 20, the ring gear R5 of the fifth planetary gear set 22, the four clutches C1-C4 and the three brakes B1-B3, such that one of those eight successive forward-drive positions is selectable by engaging the appropriate one of eight different combinations of two frictional coupling devices selected from among the clutches C1-C4 and brakes B1-B3, so that the shifting of the automatic transmission 10 can be easily controlled with a reduced shifting shock.

In addition, the planetary gear sets 12, 16, 18, 20 have comparatively small diameters, with their gear ratios $\rho1$-$\rho4$ being kept within a range of about 0.3-0.6, and provide the eight forward-drive positions "1st" through "8th" having suitable speed ratios and stepping ratios, and an overall speed ratio range or "spread" as broad as at least 6, and the reverse-drive position "Rev" having a comparatively high speed ratio. Thus, the present automatic transmission 10 exhibits improved overall speed ratio characteristics. The fifth planetary gear set 22 which does not have a sun gear has a comparatively small diameter, even with its gear ratio being as low as about 0.262.

The other embodiments of this invention will be described by reference to FIGS. 5-16. The same reference signs as used in the first embodiment will be used to identify the functionally corresponding elements in the following embodiments, which will not be described in detail.

Figure 5:
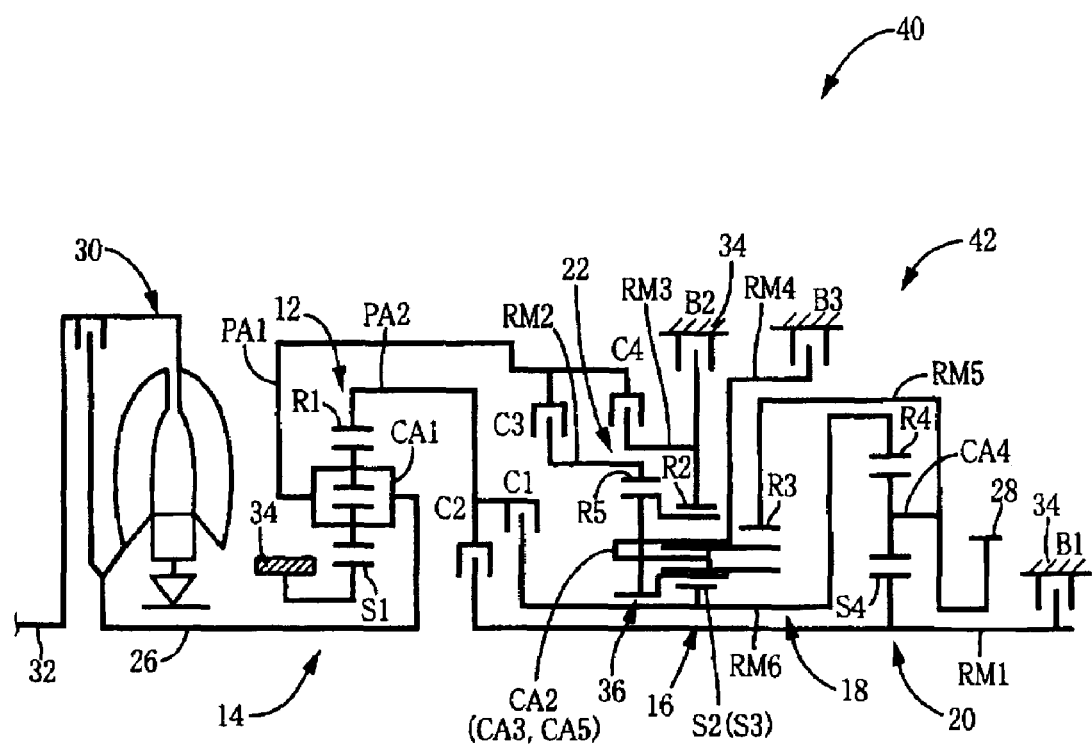
FIG. 5 is a schematic view illustrating a basic arrangement of an automatic transmission for a vehicle, which is constructed according to a second embodiment of the present invention.

Referring to FIGS. 5-7 corresponding to FIGS. 1-3, there is shown a vehicle automatic transmission 40 of the second embodiment including a primary shifting portion in the form of a second shifting portion 42 the fifth planetary gear set 22 of which has a gear ratio $\rho5$ different from that in the automatic transmission 10 of the first embodiment. In this automatic transmission 40, the ring gear R5 of the fifth planetary gear set 22 functions as the second rotary element RM2, and the ring gear R2 of the second planetary gear set 16 functions as the third rotary element RM3. The third rotary element RM3 or ring gear R2 is substantially equivalent to the second rotary element RM2 of the automatic transmission 10, and the fourth clutch C4 for selectively connecting the third rotary element RM3 to the first input path PA1 is equivalent to the third clutch C3 of the automatic transmission 10.

Figures 6A, 6B:
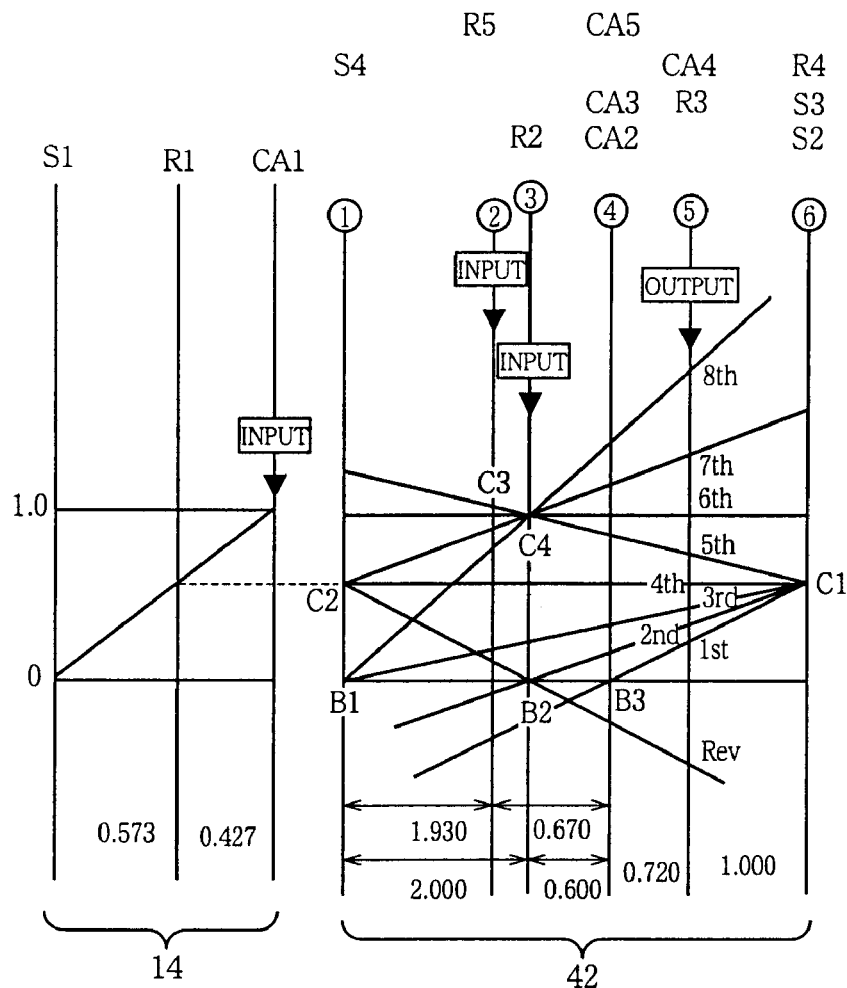
FIG. 6A is a collinear chart showing an operational relationship of the automatic transmission of FIG. 5 when a second group of operating positions of the transmission is selected.
FIG. 6B is a view indicating a relationship between the operating positions of the transmission of FIG. 5 and respective combinations of operating states of hydraulically operated frictional coupling devices, when the second group of operating positions is selected.

As shown in FIGS. 6A and 6B, the fifth-speed position "5th" through the eighth-speed position "8th" are established by engaging the fourth clutch C4 as well as another frictional coupling device. Further, a selected one of the eight successive forward-drive positions can be established by engaging the appropriate combination of two frictional coupling devices selected from among the four clutches C1-C4 and three brakes B1-B3. The nine operating positions have the speed ratio characteristics indicated in FIG. 6B, that are identical with those of FIG. 2B, where the gear ratios $\rho1$-$\rho4$ are respectively 0.427, 0.349, 0.419, and 0.301. The reverse-drive position "Rev" may also be established by engaging actions of the first and third clutches C1, C3 rather than the second clutch C2 and the second brake B2.

Figures 7A, 7B:
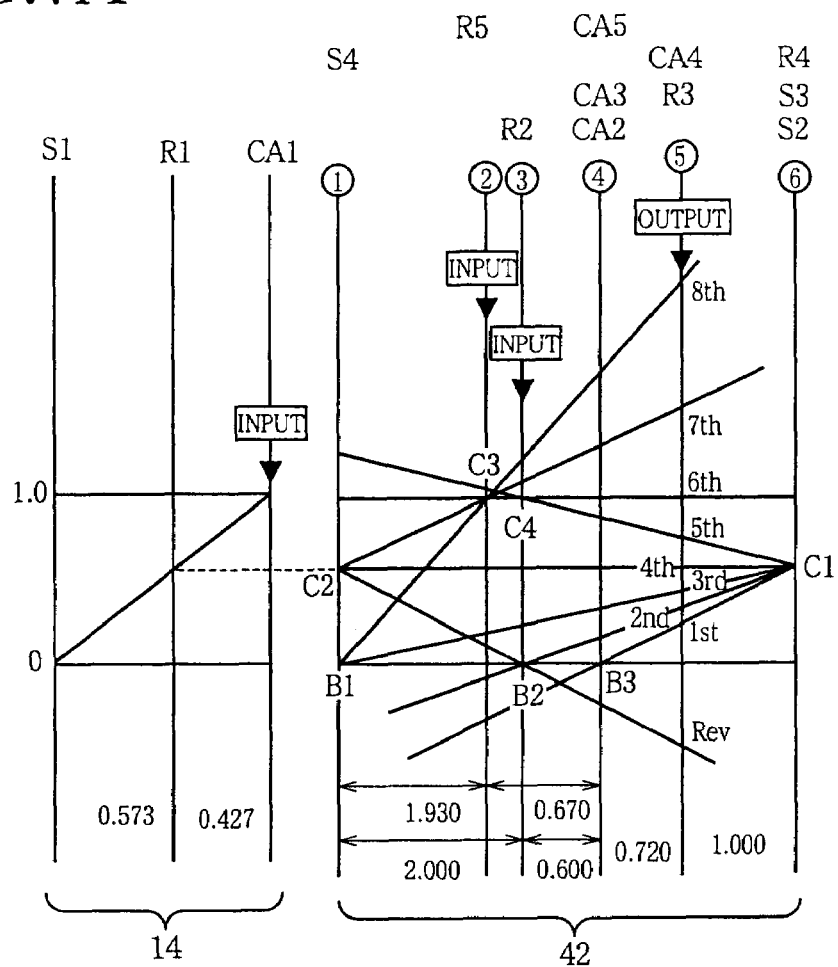
FIG. 7A is a collinear chart showing an operational relationship of the automatic transmission of FIG. 5 when a first group of operating positions of the transmission is selected.
FIG. 7B is a view indicating a relationship between the operating positions of the transmission of FIG. 5 and respective combinations of operating states of hydraulically operated frictional coupling devices, when the first group of operating positions is selected.

The eight forward-drive positions "1st" through "8th" indicated in FIGS. 6A and 6B form a second group of operating positions, wherein the seventh-speed and eighth-speed positions "7th" and "8th" having the speed ratios lower than 1.0 are established by engaging the fourth clutch C4 as well as the second clutch C2 or first brake B1. The automatic transmission 40 has a first group of operating positions wherein the seventh-speed and eighth-speed positions "7th" and "8th" are established by engaging the third clutch C3 as well as the second clutch C2 or first brake B1, as indicated in FIGS. 7A and 7B, so as to rotate the second rotary element RM2 (ring gear R5) with the input shaft 26. The speed ratios of these seventh-speed and eighth-speed positions of the first group of operating positions of FIG. 7B, which are established by engaging the third clutch C3, are different from those of the second group of operating positions of FIG. 6B, which are established by engaging the fourth clutch C4, and are determined by the position of the second rotary element RM2 (ring gear R5) in the direction parallel to the horizontal axis of the collinear chart of FIG. 6A. That is, the speed ratios of the seventh-speed and eighth-speed positions are determined by the gear ratio $\rho5$ of the fifth planetary gear set.

As indicated in FIG. 7B, the seventh-speed position "7th" of the first group of operating positions is established by the engaging actions of the second and third clutches C2, C3, which cause deceleration of the first rotary element RM1 through the first shifting portion 14 and rotation of the second rotary element RM2 with the input shaft 26, and the eighth-speed position "8th" is established by the engaging actions of the third clutch C4 and the first brake B1, which cause rotation of the second rotary element RM2 with the input shaft 26 and stopping of the first rotary element RM1.

By engaging the appropriate combination of the two frictional coupling devices (C1-C4, B1-B3), a selected one of the eight successive forward-drive positions of the first group of operating positions can be established. The speed ratios of the seventh-speed and eighth-speed positions "7th" and "8th" are determined by the gear ratio $\rho5$ of the fifth planetary gear set 22. For example, these positions "7th" and "8th" have the speed ratios indicated in FIG. 7B, where the gear ratio $\rho5$ is 0.390. Namely, the speed ratio of the seventh-speed position "7th" of the second group is 0.765 slightly higher than the speed ratio of 0.780 of the seventh-speed position of the second group, and the gear ratio of the eighth-speed position "8th" of the second group is 0.581 slightly higher than the speed ratio of 0.602 of the eighth-speed position of the second group. Accordingly, the automatic transmission 40 placed in the seventh-speed or eighth-speed position of the first group provides a slightly smaller drive torque than in the corresponding position of the second group. The first group of operating positions has a spread (overall speed ratio range) of about 7.175, which is broader than the spread of 6.921 of the second group of FIG. 6B.

The second group of operating positions of FIG. 6B including the seventh-speed and eighth-speed positions established by engaging the fourth clutch C4 as well as the second clutch C2 or first brake B1 assures a higher degree of drivability at a relatively high running speed of the vehicle, than the first group of operating positions of FIG. 7B including the seventh- and eighth-speed positions established by engaging the third clutch C3 as well as the second clutch C2 or first brake B1.

The automatic transmission 40 according to the present second embodiment of this invention described above is also arranged such that the second rotary element RM2 is selectively connected to the first input path PA1 through the third clutch C3, for establishing the seventh-speed position "7th" and the eighth-speed position "8th" of the first group of operating positions of FIG. 7B, and such that the third rotary element RM3 is selectively connected to the first input path PA1 through the fourth clutch C4, for establishing the seventh- and eighth-speed positions of the second group of operating positions of FIG. 6B. The first or second group of operating positions is selected depending upon the selected position of the shift-position-group selector switch 86 while the MANUAL SHIFT mode is selected, and depending upon whether the POWER RUNNING mode is selected by the power-mode selector switch 80 while the MANUAL SHIFT mode is not selected, as described above with respect to the first embodiment. Accordingly, the automatic transmission 40 of the present second embodiment has substantially the same advantages as the automatic transmission 10 of the first embodiment, such as higher adequacy of control of the shifting actions than in the conventional automatic transmission.

Figure 8:
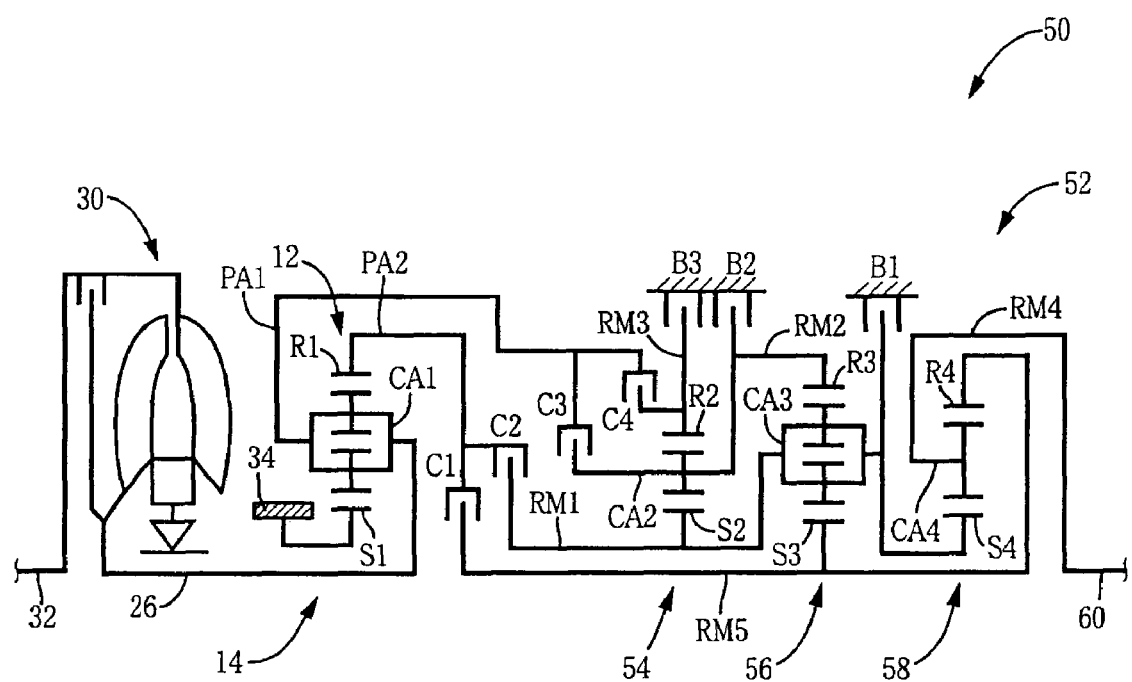
FIG. 8 is a schematic view illustrating a basic arrangement of an automatic transmission for a vehicle, which is constructed according to a third embodiment of the present invention.

Reference is now made to FIGS. 8-10 corresponding to FIGS. 1-3, which show a vehicle automatic transmission 50 constructed according to the third embodiment of this invention. The automatic transmission 50 is different from the automatic transmission 10 of the first embodiment, in the arrangement of the primary shifting portion in the form of a second shifting portion 52. The second shifting portion 52 is constituted principally by a second planetary gear set 54 of single-pinion type, a third planetary gear set 56 of double-pinion type, and a fourth planetary gear set 58 of single-pinion type. The second, third and fourth planetary gear sets 54, 56, 58 of the second shifting portion 52, which are partly connected to each other, have a total of five rotary elements RM1-RM5. Described in detail, the sun gear S2 of the second planetary gear set 54, the carrier CA3 of the third planetary gear set 56 and the sun gear S4 of the fourth planetary gear set 58 are connected to each other, so as to provide the first rotary element RM1, while the carrier CA2 of the second planetary gear set 54 and the ring gear R5 of the third planetary gear set 56 are connected to each other, so as to provide the second rotary element RM2. The ring gear R2 of the second planetary gear set 54 functions as the third rotary element RM3, and the carrier CA4 of the fourth planetary gear set 58 functions as the fourth rotary element RM4, while the sun gear S3 of the third planetary gear set 56 and the ring gear R4 of the fourth planetary gear set 58 are connected to each other, so as to provide the fifth rotary element RM5. The second, third and fourth planetary gear sets 54, 56 and 58 are respectively primary first, second and third planetary gear sets of the primary shifting portion 52.

The first rotary element RM1 (sun gear S2, carrier CA3 and sun gear S4) is selectively fixed to the casing 34 by the first brake B1 and is thereby selectively brought into a stationary state, and the second rotary element RM2 (carrier CA2 and ring gear R3) is selectively fixed to the casing 34 by the second brake B2 and is thereby selective brought into a stationary state. The third rotary element RM3 (ring gear R2) is selectively fixed to the casing 34 by the third brake B3 and is thereby selectively brought into a stationary state, and the fifth rotary element RM5 (sun gear S3 and ring gear R4) is selectively connected through the first clutch C1 to the intermediate output member in the form of the ring gear R1 of the first planetary gear set 12, that is, to the second input path PA2. The first rotary element RM1 (sun gear S4, carrier CA3 and sun gear S4) is selectively connected through the second clutch C2 to the ring gear R1, that is, to the second input path PA2, and the second rotary element RM2 (carrier CA2 and ring gear R3) is selectively connected through the third clutch C3 to the input shaft 26, that is, to the first input path PA1. The third rotary element RM3 (ring gear R2) is selectively connected through the fourth clutch C4 to the input shaft 26, that is, to the first input path PA1, and the fourth rotary element RM4 (carrier CA4) is integrally connected to the output member in the form of an output shaft 60, so that the rotary motion is outputted from the automatic transmission 50 through the output shaft 60. The third clutch C3 corresponds to a first input clutch, and the fourth clutch C4 corresponds to a second input clutch. The second rotary element RM2 corresponds to a first input rotary element, and the third rotary element RM3 corresponds to a second input rotary element, while the fourth rotary element RM4 corresponds to an output rotary element. The first, second and third brakes B1, B2, B3, and the first through fourth clutches C1-C4 are all hydraulically operated, multiple-disc type frictional coupling devices, which are operable by respective hydraulic cylinders.

Figures 9A, 9B:
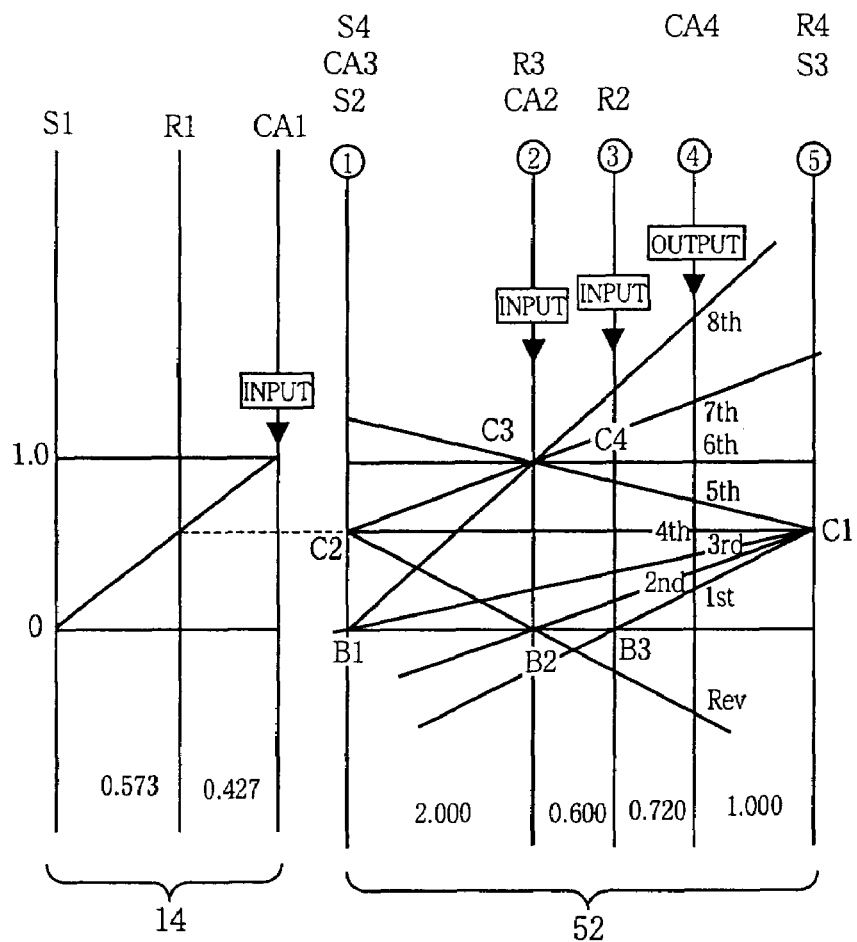
FIG. 9A is a collinear chart showing an operational relationship of the automatic transmission of FIG. 8 when a first group of operating positions of the transmission is selected.
FIG. 9B is a view indicating a relationship between the operating positions of the transmission of FIG. 8 and respective combinations of operating states of hydraulically operated frictional coupling devices, when the first group of operating positions is selected.

The collinear chart of FIG. 9A indicates, by straight lines, a relationship among the rotating speeds of the rotary elements of the first and second shifting portions 14, 52 when the automatic transmission 50 is placed in each of its operating positions. In the collinear chart of FIG. 8A, a lower one of the two horizontal straight lines corresponds to the rotating speed of 0, while the upper straight line corresponds to the rotating speed of 1.0, that is, indicates the rotating speed of the input shaft 26, and the distances between adjacent ones of the five vertical straight lines respectively correspondingly to the five rotary elements RM1 (S2, CA3 and S4), RM2 (CA2 and R3), RM3 (R2), RM4 (CA4) and RM5 (S3 and R4) of the second shifting portion 52 are determined by the gear ratio ρ2 of 0.300 of the second planetary gear set 12, the gear ratio ρ3 of 0.463 of the third planetary gear set 56, and the gear ratio ρ4 of 0.301 of the fourth planetary gear set 58.

As indicated in FIG. 9B, the automatic transmission 50 also has the eight forward-drive positions "1st" through "8th", and the rear-drive position "Rev". As is apparent from the collinear chart of FIG. 9A, the first-speed position "1st" having the highest speed ratio (rotating speed of the input shaft 26/rotating speed of the output shaft 60) is established by engaging actions of the first clutch C1 and the third brake B3, which cause deceleration of the fifth rotary element RM5 through the first shifting portion 14, and stopping of the third rotary element RM3, so that the fourth rotary element RM4 connected to the output shaft 60 is rotated in the forward direction at a speed indicated by a point of intersection between the vertical straight line corresponding to the fourth rotary element RM4 and an inclined straight line indicated by "1st" in the collinear chart. The second-speed position "2nd" having a lower speed ratio than the first-speed position "1st" is established by engaging actions of the first clutch C1 and the second brake B2, which cause deceleration of the fifth rotary element RM5 through the first shifting portion 14 and stopping of the second rotary element RM2, so that the fourth rotary element RM4 connected to the output shaft 60 is rotated at a speed indicated by a point of intersection between the vertical straight line corresponding to the fourth rotary element RM4 and an inclined straight line indicated by "2nd". The third-speed position "3rd" having a lower speed ratio than the second-speed position "2nd" is established by engaging actions of the first clutch C1 and the first brake B1, which cause deceleration of the fifth rotary element RM5 through the first shifting portion 14 and stopping of the first rotary element RM1, so that the fourth rotary element RM4 is rotated at a speed indicated by a point of intersection between the vertical straight line corresponding to the fourth rotary element RM4 and an inclined line indicated by "3rd". The fourth-speed position "4th" having a lower speed ratio than the third-speed position "3rd" is established by engaging actions of the first and second clutches C1, C2, which cause deceleration of the second shifting portion 52 as a unit through the first shifting portion 14, so that the fourth rotary element RM4 is rotated at a speed indicated by a point of intersection between the vertical straight line corresponding to the fourth rotary element RM4 and a horizontal straight line indicated by "4th".

The fifth-speed position "5th" having a lower speed ratio than the fourth-speed position "4th" is established by engaging actions of the first and third clutches C1, C3, which cause deceleration of the fifth rotary element RM5 through the first shifting portion 14 and rotation of the second rotary element RM2 with the input shaft 26, so that the fourth rotary element RM4 is rotated at a speed indicated by a point of intersection between the vertical straight line corresponding to the fourth rotary element RM4 and an inclined line indicated by "5th". This fifth-speed position "5th" may be established by engaging actions of the first and fourth clutches C1, C4. The sixth-speed position "6th" having a lower speed ratio than the fifth-speed position "5th" is established by engaging actions of the third and fourth clutches C3, C4, which cause rotation of the second shifting portion 52 as a unit with the input shaft 26, so that the fourth rotary element RM4 is rotated at a speed indicated by a point of intersection between the vertical straight line corresponding to the fourth rotary element RM4 and an inclined line indicated by "6th", that is, rotated at a speed equal to that of the input shaft 26. This sixth-speed position "6th" has the speed ratio of 1.0. The seventh-speed position "7th" having a lower speed ratio than the sixth-speed position "6th" is established by engaging actions of the second and third clutches C2, C3, which cause deceleration of the first rotary element RM1 through the first shifting portion 14 and rotation of the second rotary element RM2 with the input shaft 26, so that the fourth rotary element RM4 is rotated at a speed indicated by a point of intersection between the vertical straight line corresponding to the fourth rotary element RM4 and an inclined line indicated by "7th". The eighth-speed position "8th" having a lower speed ratio than the seventh-speed position "7th" is established by engaging actions of the third clutch C3 and the first brake B1, which cause rotation of the second rotary element RM2 with the input shaft 26 and stopping of the first rotary element RM1, so that the fourth rotary element RM4 is rotated at a speed indicated by a point of intersection between the vertical straight line corresponding to the fourth rotary element RM4 and an inclined line indicated by "8th".

The reverse-drive position "Rev" is established by engaging actions of the second clutch C2 and the second brake B2, which cause deceleration of the first rotary element through the first shifting portion 14 and stopping of the second rotary element RM2, so that the fourth rotary element RM4 is rotated in the reverse direction, at a speed indicated by a point of intersection between the vertical straight line corresponding to the fourth rotary element RM4 and an inclined line indicated by "Rev". The reverse-drive position "Rev" having a higher speed ratio than the reverse-drive position established by the engaging actions of the second clutch C2 and the second brake B2 may be established by engaging actions of the second clutch C2 and the third brake B3, which cause deceleration of the first rotary element RM1 through the first shifting portion 14 and stopping of the third rotary element RM3. One of these two reverse-drive positions "Rev" is used as the reverse-drive position. Alternatively, those two reverse-drive positions are selectively established depending upon the situation.

Referring to FIG. 9B, there is indicated a relationship between the above-indicated nine operating positions of the automatic transmission 10 and respective combinations of operating states of the frictional, coupling devices in the form of the clutches C1-C4 and brakes B1-B3. In this figure, circles "o" indicate the engaged states of the clutches and brakes, while the absence of the circles indicates the released states of the clutches and brakes. It will be understood from FIG. 9B that a selected one of the eight successive forward-drive positions can be established by engaging the appropriate combination of two frictional coupling devices selected from among the four clutches C1-C4 and three brakes B1-B3. The speed ratios of the nine operating positions are determined by gear ratios $\rho1$-$\rho4$ of the first, second, third and fourth planetary gear sets 12, 54, 56, 58. For example, the nine operating positions have speed ratios indicated in FIG. 9B, where the gear ratios $\rho1$-$\rho4$ are as follows: $\rho1$=0.427, $\rho2$=0.300, $\rho3$=0.463, $\rho4$=0.301. These speed ratios of FIG. 9B are the same as those of FIG. 6B.

Figures 10A, 10B:
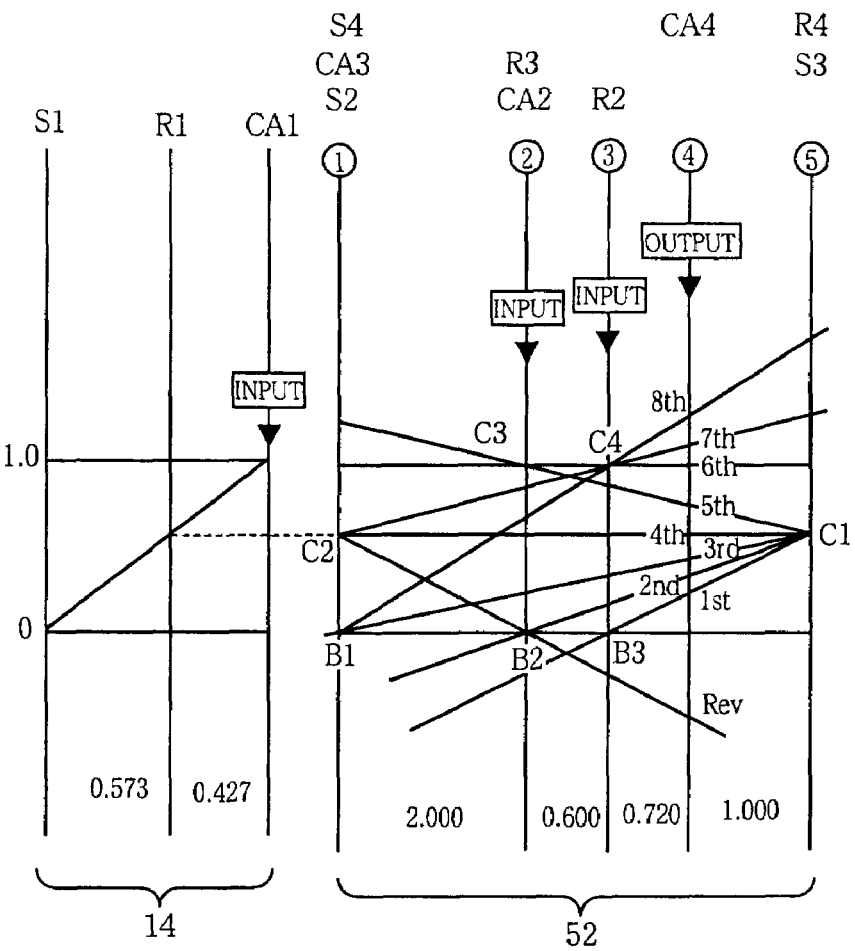
FIG. 10A is a collinear chart showing an operational relationship of the automatic transmission of FIG. 8 when a second group of operating positions of the transmission is selected.
FIG. 10B is a view indicating a relationship between the operating positions of the transmission of FIG. 8 and respective combinations of operating states of hydraulically operated frictional coupling devices, when the second group of operating positions is selected.

The eight forward-drive positions "1st" through "8th" indicated in FIGS. 9A and 9B form a first group of operating positions, wherein the seventh-speed and eighth-speed positions "7th" and "8th" having the speed ratios lower than 1.0 are established by engaging the third clutch C3 as well as the second clutch C2 or first brake B1. The automatic transmission 50 has a second group of operating positions wherein the seventh-speed and eighth-speed positions "7th" and "8th" are established by engaging the fourth clutch C4 as well as the second clutch C2 or first brake B1, as indicated in FIGS. 10A and 10B, so as to rotate the third rotary element RM3 with the input shaft 26. The speed ratios of these seventh-speed and eighth-speed positions of the second group of operating positions of FIG. 10B, which are established by engaging the fourth clutch C4, are different from those of the first group of operating positions of FIG. 9B, which are established by engaging the third clutch C3, and are determined by the position of the third rotary element RM3 (ring gear R2) in the direction parallel to the horizontal axis of the collinear chart of FIG. 9A. That is, the speed ratios of the seventh-speed and eighth-speed positions are determined by the gear ratio $\rho2$ of the second planetary gear set 54. By suitably determining the gear ratio $\rho2$, the seventh-speed and eighth-speed positions "7th" and "8th" of the second group have speed ratio characteristics different from those of the first group.

As indicated in FIG. 10B, the seventh-speed position "7th" of the second group of operating positions is established by the engaging actions of the second and fourth clutches C2, C4, which cause deceleration of the first rotary element RM1 through the first shifting portion 14 and rotation of the third rotary element RM3 with the input shaft 26, and the eighth-speed position "8th" is established by the engaging actions of the fourth clutch C4 and the first brake B1, which cause rotation of the third rotary element RM3 with the input shaft 26 and stopping of the first rotary element RM1.

By engaging the appropriate combination of the two frictional coupling devices (C1-C4, B1-B3), a selected one of the eight successive forward-drive positions of the second group of operating positions can be established. The speed ratios of the seventh-speed and eighth-speed positions "7th" and "8th" are determined by the gear ratio ρ2 of the second planetary gear set 54. For example, these positions "7th" and "8th" have the speed ratios indicated in FIG. 10B, where the gear ratio ρ2 is 0.300. Namely, the speed ratio of the seventh-speed position "7th" of the second group is 0.894 slightly higher than the speed ratio of 0.780 of the seventh-speed position of the first group, and the gear ratio of the eighth-speed position "8th" of the second group is 0.783 slightly higher than the speed ratio of 0.602 of the eighth-speed position of the first group. Accordingly, the automatic transmission 50 placed in the seventh-speed or eighth-speed position of the second group provides a larger drive torque than in the corresponding position of the first group. The second group of operating positions has a spread (overall range of speed ratio) of about 5.324, which is narrower than the spread of 6.921 of the first group.

The second group of operating positions of FIG. 10B including the seventh-speed and eighth-speed positions established by engaging the fourth clutch C4 as well as the second clutch C2 or first brake B1 assures a higher degree of drivability at a relatively high running speed of the vehicle, than the first group of operating positions of FIG. 9B including the seventh- and eighth-speed positions established by engaging the third clutch C3 as well as the second clutch C2 or first brake B1.

The automatic transmission 50 according to the present third embodiment of this invention described above is also arranged such that the second rotary element RM2 is selectively connected to the first input path PA1 through the third clutch C3, for establishing the seventh-speed position "7th" and the eighth-speed position "8th" of the first group of operating positions of FIG. 9B, and such that the third rotary element RM3 is selectively connected to the first input path PA1 through the fourth clutch C4, for establishing the seventh- and eighth-speed positions of the second group of operating positions of FIG. 10B. The first or second group of operating positions is selected depending upon the selected position of the shift-position-group selector switch 86 while the MANUAL SHIFT mode is selected, and depending upon whether the POWER RUNNING mode is selected while the MANUAL SHIFT mode is not selected. Accordingly, the shifting actions of the automatic transmission 50 of the present embodiment are controlled in a more adequate manner than those of the conventional automatic transmission.

Further, the rotary motion of the input shaft 26 is transmitted to the second shifting portion 52 through the first and second input paths PA1, PA2, and the first or second group of operating positions is selected by selecting the third clutch C3 or fourth clutch C4 to be engaged for transmission of the rotary motion received from the first input path PA1, so that the automatic transmission 50 can be relatively easily shifted between the seventh-speed and eighth-speed positions of the selected first or second group, while the third or fourth clutch C3, C4 is held in the engaged state. Accordingly, the automatic transmission 50 can be simplified in construction and made compact, and is available at a comparatively low cost of manufacture, while permitting easy installation on the vehicle.

The second and third rotary elements RM2, RM3 connected to the first input path PA1 through the respective third and fourth clutches C3, C4 are disposed adjacent to each other, as indicated at an almost intermediate position of the collinear chart of FIGS. 9A and 10A as seen in the direction parallel to the horizontal axis, and the output rotary element in the form of the fourth rotary element RM4 is located on one side of a set of the third and fourth clutches C3, C4, while the first rotary element RM1 which is selectively connected to the second input path PA2 through the second clutch C2 and selectively brought into the stationary state by the first brake B1 is located on the other side of the set of the third and fourth clutches C3, C4. The seventh-speed and eighth-speed positions "7th", "8th" of the first group are selectively established by engaging the second clutch C2 and the first brake B1, respectively, while the third clutch C3 is held in its engaged state, and those positions "7th", "8th" of the second group are selectively established by engaging the second clutch C2 and the first brake B1, respectively, while the fourth clutch C4 is held in its engaged state. Thus, the first and second groups of operating positions are available with a relatively simple arrangement of the automatic transmission 50.

As described above, the first and second groups of operating positions of FIGS. 9 and 10 are different from each other, only in that the third clutch C3 as well as the second clutch C2 or first brake B1 is engaged for establishing the seventh- and eighth-speed positions "7th" and "8th" of the first group, while the fourth clutch C4 as well as the second clutch C2 or first brake B1 is engaged for establishing those positions of the second group. Except for the engaging and releasing actions of the second and third clutches C2, C3, the combinations of the engaging and releasing actions of the clutches and brakes to establish the seventh- and eighth-speed positions of the first group are the same as those to establish those positions of the second group. The same set of clutches and brakes is used for the two groups of operating positions. Thus, the present automatic transmission 50 can be simpler in construction and more compact and available at a lower cost, than an automatic transmission wherein different sets of clutches and brakes are used for the respective two groups of operating positions.

Further, the present automatic transmission 50 including the first shifting portion 14 and the second shifting portion 52 provides the eight forward-drive positions, with a relatively simple and compact arrangement using the four planetary gear sets 12, 54, 56, 58, the four clutches C1-C4 and the three brakes B1-B3, such that one of those eight successive forward-drive positions is selectable by engaging the appropriate one of eight different combinations of two frictional coupling devices selected from among the clutches C1-C4 and brakes B1-B3, so that the shifting of the automatic transmission 50 can be easily controlled with a reduced shifting shock.

In addition, the planetary gear sets 12, 54, 56, 58 have comparatively small diameters, with their gear ratios ρ1-ρ4 being kept within a range of about 0.3-0.6, and provide the eight forward-drive positions "1st" through "8th" having suitable speed ratios and stepping ratios, and the reverse-drive position "Rev" having a comparatively high speed ratio. Thus, the present automatic transmission 50 exhibits improved overall speed ratio characteristics.

Figure 11:
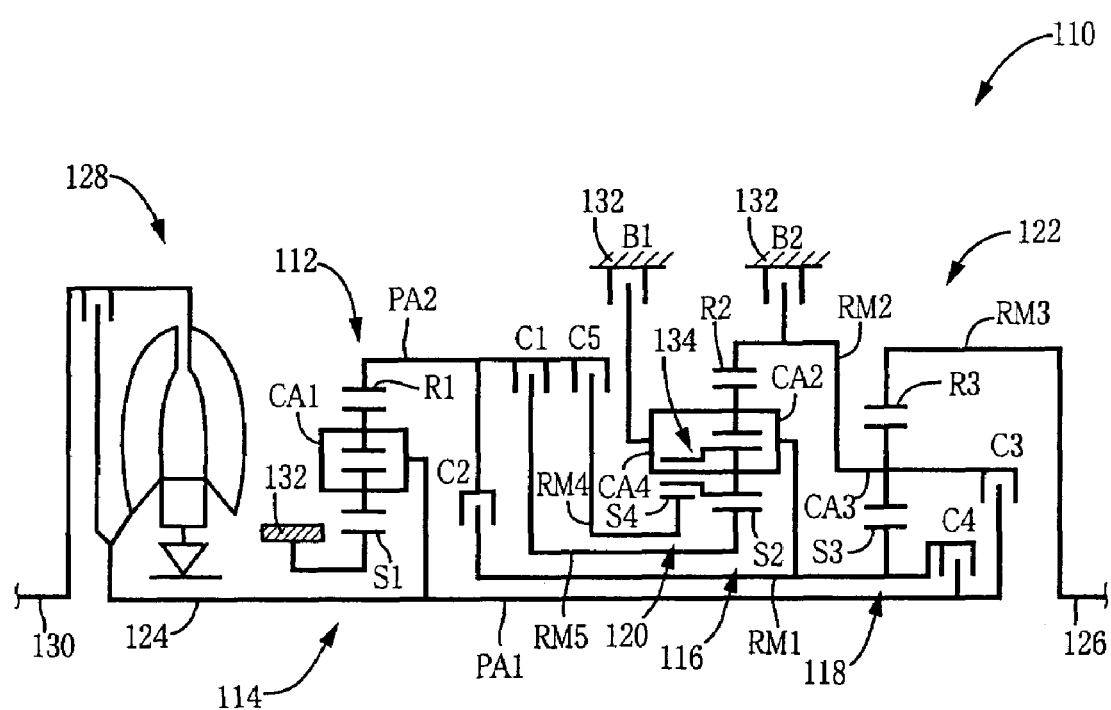
FIG. 11 is a schematic view illustrating a basic arrangement of an automatic transmission for a vehicle, which is constructed according to a fourth embodiment of the present invention.

Referring further to the schematic view of FIG. 11, there is illustrated a basic arrangement of an automatic transmission 110 suitable for use on a front-engine rear-drive motor vehicle, which is constructed according to the fourth embodiment of this invention. As shown in FIG. 11, the automatic transmission 110 includes a first shifting portion 114 constituted principally by a first planetary gear set 112 of double-pinion type, and a second shifting portion 122 constituted principally by a second planetary gear set 116 of double-pinion type, a third planetary gear set 118 of single-pinion type, and a fourth planetary gear set 120. The automatic transmission 110 has an input shaft 124 and an output shaft 126, and is arranged to transmit a rotary motion of the input shaft 124 to the output shaft 126 such that a speed ratio of the input shaft 124 and the output shaft 126 is controllable. The input shaft 124 and the output shaft 126 respectively function as an input member and an output member of the automatic transmission 110. The input shaft 124 receives, through a torque converter 128, a rotary motion of a crankshaft 130 of a drive power source in the form of an internal combustion engine. The crankshaft 130 is connected to a turbine shaft of the torque converter 128. The output shaft 126 is operatively connected to right and left drive wheels of the vehicle through a differential gear device.

The first planetary gear set 112 of the first shifting portion 114 has a carrier CA1 that is connected to and rotated by the input shaft 124, a sun gear S1 that is fixed to a casing 132 of the automatic transmission 110 and is not rotatable, and a ring gear R1 that functions as an intermediate output member for transmitting a rotary motion of the input shaft 124 to the second shifting portion 122 such that the speed of the rotary motion of the second shifting portion 122 is lower than that of the input shaft 124. Thus, a second input path PA2 for transmitting the rotary motion of the input shaft 124 to the second shifting portion 122 is defined by the carrier CA1 of the first planetary gear set 112, pinion gears of the carrier CA1, and the intermediate output member in the form of the ring gear R1 of the first planetary gear set 112. The speed of the rotary motion of the input shaft 124 is reduced during transmission of the rotary motion through the second input path PA2, at a speed ratio $1/(1-\rho1)$ which is determined by a gear ratio $\rho1$ of the first planetary gear set 112, which is a ratio of the number of teeth of the sun gear S1 to the number of teeth of the ring gear R1. In the present embodiment, the gear ratio $\rho1$ is 0.500, and the speed ratio of the second input path PA2 is 2.0, so that the speed of the input shaft 124 is reduced to a half during transmission of the rotary motion through the second input path PA2. In addition to the second input path PA2, there is also provided a first input path PA1 through which the rotary motion of the input shaft 124 is transmitted to the second shifting portion 122, without speed reduction, that is, at a speed ratio of 1.0.

The second shifting portion 122 is a primary shifting portion, wherein the second, third and fourth planetary gear sets 116, 118 and 120 are respectively primary first, second and third planetary gear sets. The second planetary gear set 116 has a stepped pinion 134 including a large-diameter portion functioning as a pinion gear and meshing with a sun gear S2, and a small-diameter portion meshing with a sun gear S4 of the fourth planetary gear set 120. This sun gear S4 corresponds to a third sun gear of the second shifting portion 122.

The second, third and fourth planetary gear sets 116, 118, 120 of the second shifting portion 122, which are partly connected to each other, have a total of five rotary elements RM1-RM5. Described in detail, a carrier CA2 of the second planetary gear set 116, a sun gear S3 of the third planetary gear set 118 and a carrier CA4 of the fourth planetary gear set 120 are connected to each other and cooperate to constitute the first rotary element RM1. A ring gear R2 of the second planetary gear set 116 and a carrier CA3 of the third planetary gear set 118 are connected to each other and cooperate to constitute the second rotary element RM2. The third planetary gear set 118 has a ring gear R3 functioning as the third rotary element RM3, and the above-indicated sun gear S4 of the fourth planetary gear set 118 functions as the fourth rotary element RM4, while the above-indicated sun gear S2 of the second planetary gear set 116 functions as the fifth rotary element RM5.

The first rotary element RM1 (carrier CA2, sun gear S3 and carrier CA4) is selectively fixed to the casing 132 by a first brake B1 and is thereby selectively brought into a stationary state, and the second rotary element RM2 (ring gear R2 and carrier CA3) is selectively fixed to the casing 132 by a second brake B2 and is thereby selective brought into a stationary state. The fifth rotary element RM5 (sun gear S2) is selectively connected through a first clutch C1 to the intermediate output member in the form of the ring gear R1 of the first planetary gear set 112, that is, to the second input path PA2. The first rotary element RM1 (carrier CA2, sun gear S3 and carrier CA4) is selectively connected through a second clutch C2 to the ring gear R2, that is, to the second input path PA2. The second rotary element RM2 (ring gear R2 and carrier CA3) is selectively connected through a third clutch C3 to the input shaft 124, that is, to the first input path PA1, and the first rotary element RM1 (carrier CA2, sun gear S3 and carrier CA4) is selectively connected through a fourth clutch C4 to the input shaft 124, that is, to the first input path PA1. The third rotary element RM3 (ring gear R5) is selectively connected through a fourth clutch C4 to the input shaft 26, that is, to the first input path PA1, and the fourth rotary element RM4 (sun gear S2) is selectively connected through a fifth clutch C5 to the ring gear R1, that is, to the second input path PA2. The third rotary element RM3 (ring gear R3) is integrally connected to the output shaft 126, so that the rotary motion is outputted from the automatic transmission 110 through the output shaft 126. The first clutch C1 corresponds to a first input clutch, and the fifth clutch C5 corresponds to a second input clutch. The fifth rotary element RM5 corresponds to a first input rotary element, and the fourth rotary element RM4 corresponds to a second input rotary element, while the third rotary element RM3 corresponds to an output rotary element. The first and second brakes B1 and B2, and the first through fifth clutches C1-C5 are all hydraulically operated, multiple-disc type frictional coupling devices, which are operable by respective hydraulic cylinders.

Figures 12A, 12B:
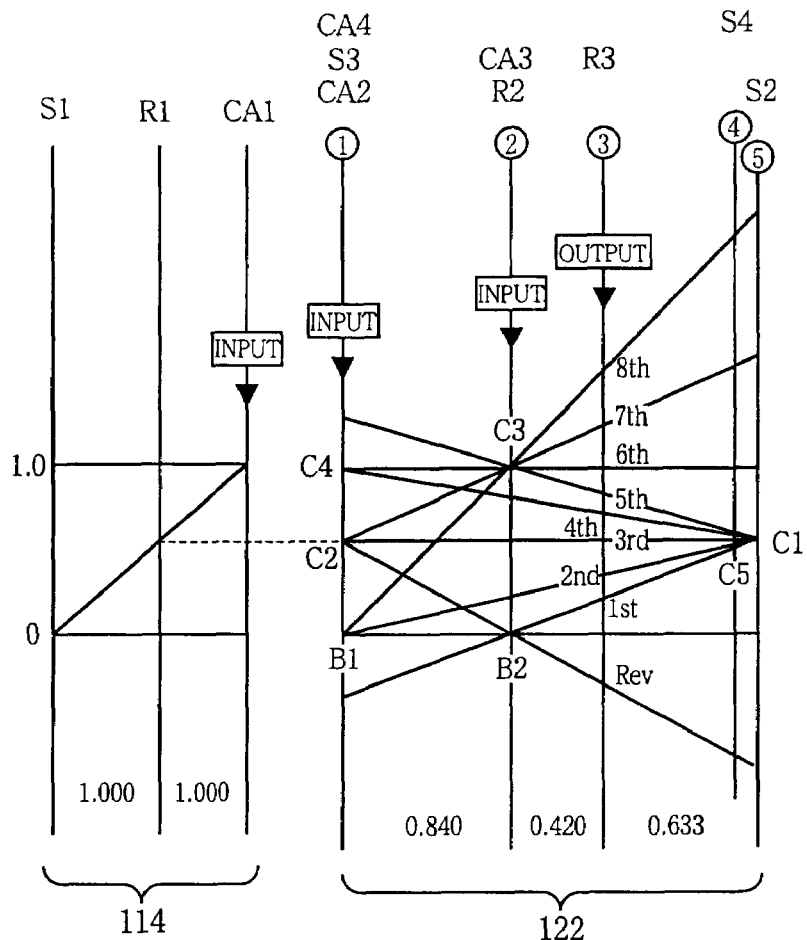
FIG. 12A is a collinear chart showing an operational relationship of the automatic transmission of FIG. 11 when a first group of operating positions of the transmission is selected.
FIG. 12B is a view indicating a relationship between the operating positions of the transmission of FIG. 11 and respective combinations of operating states of hydraulically operated frictional coupling devices, when the first group of operating positions is selected.

The collinear chart of FIG. 12A indicates, by straight lines, a relationship among the rotating speeds of the rotary elements of the first and second shifting portions 114, 122 when the automatic transmission 110 is placed in each of its operating positions. The collinear chart of FIG. 12A is a two-dimensional coordinate system having a vertical axis and a horizontal axis and wherein relative rotating speeds of the rotary elements are taken along respective eight straight lines parallel to the vertical axis, which straight lines are spaced apart from each other in a direction parallel to the horizontal axis, such that distances between adjacent ones of the three vertical straight lines corresponding to the three rotary elements S1, R1 and CA1 of the first shifting portion 114 are determined by a gear ratio $\rho1$ of 0.500 of the first planetary gear set 112, and such that distances between adjacent ones of the five vertical straight lines corresponding to the five rotary elements RM1-RM5 of the second shifting portion 122 are determined by a gear ratio $\rho2$ of 0.444 of the second planetary gear set 116, a gear ratio $\rho3$ of 0.500 of the third planetary gear set 118, and a gear ratio $\rho4$ of 0.483 of the fourth planetary gear set 120. A lower one of two horizontal straight lines corresponds to the rotating speed of 0, while the upper straight line corresponds to the rotating speed of 1.0, that is, indicates the rotating speed of the input shaft 124. The first three vertical straight lines as counted from the left to the right respectively correspond to the sun gear S1, ring gear R1 and carrier CA1, while the remaining five vertical straight lines as counted from the left to the right respectively correspond to the first rotary element RM1 (carrier CA2, sun gear S3 and carrier CA4), the second rotary element RM2 (ring gear R2 and carrier CA3), the third rotary element RM3 (ring gear R3), the fourth rotary element RM4 (sun gear S4), and the fifth rotary element RM5 (sun gear S2).

As indicated in FIG. 12B, the automatic transmission 110 have eight forward-drive positions and one rear-drive position "Rev". The forward-drive positions are: a first-speed position "1st", "2nd", "3rd", "4th", "5th", "6th", "7th" and "8th". The first-speed position "1st" has a highest speed ratio (rotating speed of the input shaft 124/rotating speed of the output shaft 126). As is apparent from the collinear chart of FIG. 12A, the first-speed position "1st" is established by engaging actions of the first clutch C1 and the second brake B2, which cause deceleration of the fifth rotary element RM5 through the first shifting portion 114, and stopping of the second rotary element RM2, so that the third rotary element RM3 connected to the output shaft 126 is rotated in the forward direction at a speed indicated by a point of intersection between the vertical straight line corresponding to the third rotary element RM3 and an inclined straight line indicated by "1st" in the collinear chart. The second-speed position "2nd" having a lower speed ratio than the first-speed position "1st" is established by engaging actions of the first clutch C1 and the first brake B1, which cause deceleration of the fifth rotary element RM5 through the first shifting portion 114 and stopping of the first rotary element RM1, so that the third rotary element RM3 is rotated at a speed indicated by a point of intersection between the vertical straight line corresponding to the third rotary element RM3 and an inclined straight line indicated by "2nd". The third-speed position "3rd" having a lower speed ratio than the second-speed position "2nd" is established by engaging actions of the first and second clutches C1 and C2, which cause deceleration of the second shifting portion 122 as a unit through the first shifting portion 114, so that the third rotary element RM3 is rotated at a speed indicated by a point of intersection between the vertical straight line corresponding to the third rotary element RM3 and an inclined line indicated by "3rd", that is, rotated at a speed equal to that of the ring gear R1 of the first shifting portion 114. The fourth-speed position "4th" having a lower speed ratio than the third-speed position "3rd" is established by engaging actions of the first and fourth clutches C1, C4, which cause deceleration of the fifth rotary element RM5 through the first shifting portion 114 and rotation of the first rotary element RM1 together with the input shaft 124, so that the third rotary element RM3 is rotated at a speed indicated by a point of intersection between the vertical straight line corresponding to the third rotary element RM3 and a horizontal straight line indicated by "4th". The fifth-speed position "5th" having a lower speed ratio than the fourth-speed position "4th" is established by engaging actions of the first and third clutches C1, C3, which cause deceleration of the fifth rotary element RM5 through the first shifting portion 114 and rotation of the second rotary element RM2 with the input shaft 124, so that the third rotary element RM3 is rotated at a speed indicated by a point of intersection between the vertical straight line corresponding to the third rotary element RM3 and an inclined line indicated by "5th".

The sixth-speed position "6th" having a lower speed ratio than the fifth-speed position "5th" is established by engaging actions of the third and fourth clutches C3, C4, which cause rotation of the second shifting portion 122 as a unit with the input shaft 124, so that the third rotary element RM3 is rotated at a speed indicated by a point of intersection between the vertical straight line corresponding to the third rotary element RM3 and an inclined line indicated by "6th", that is, rotated at a speed equal to that of the input shaft 124. This sixth-speed position "6th" has the speed ratio of 1.0. The seventh-speed position "7th" having a lower speed ratio than the sixth-speed position "6th" is established by engaging actions of the second and third clutches C2, C3, which cause deceleration of the first rotary element RM1 through the first shifting portion 114 and rotation of the second rotary element RM2 with the input shaft 124, so that the third rotary element RM3 is rotated at a speed indicated by a point of intersection between the vertical straight line corresponding to the third rotary element RM3 and an inclined line indicated by "7th". The eighth-speed position "8th" having a lower speed ratio than the seventh-speed position "7th" is established by engaging actions of the third clutch C3 and the first brake B1, which cause rotation of the second rotary element RM2 with the input shaft 124 and stopping of the first rotary element RM1, so that the third rotary element RM3 is rotated at a speed indicated by a point of intersection between the vertical straight line corresponding to the third rotary element RM3 and an inclined line indicated by "8th".

The reverse-drive position "Rev" is established by engaging actions of the second clutch C2 and the second brake B2, which cause deceleration of the first rotary element RM1 through the first shifting portion 114 and stopping of the second rotary element RM2, so that the third rotary element RM3 is rotated in the reverse direction, at a speed indicated by a point of intersection between the vertical straight line corresponding to the third rotary element RM3 and an inclined line indicated by "Rev".

Referring to FIG. 12B, there is indicated a relationship between the above-indicated nine operating positions of the automatic transmission 110 and respective combinations of operating states of the frictional coupling devices in the form of the clutches C1-C5 and brakes B1 and B2. It will be understood from FIG. 12B that a selected one of the eight successive forward-drive positions can be established by engaging the appropriate combination of two frictional coupling devices selected from among the five clutches C1-C4 and two brakes B1, B2. The speed ratios of the nine operating positions are determined by gear ratios $\rho1$-$\rho3$ of the first, second and third planetary gear sets 112, 116, 118. For example, the nine operating positions have speed ratios indicated in FIG. 12B, where the gear ratios $\rho1$-$\rho3$ are as follows: $\rho1$=0.500, $\rho2$=0.444, $\rho3$=0.500. In this specific example, the stepping ratios of the adjacent operating positions are almost equal to each other, and the overall range of the speed ratio ("spread"=5.014/0.667) of the forward-drive positions is as broad as about 7.521. Further, the reverse-drive position "Rev" has a suitably selected speed ratio of 4.000. Thus, the automatic transmission 110 as a whole exhibits satisfactory speed ratio characteristics.

Figures 13A, 13B:
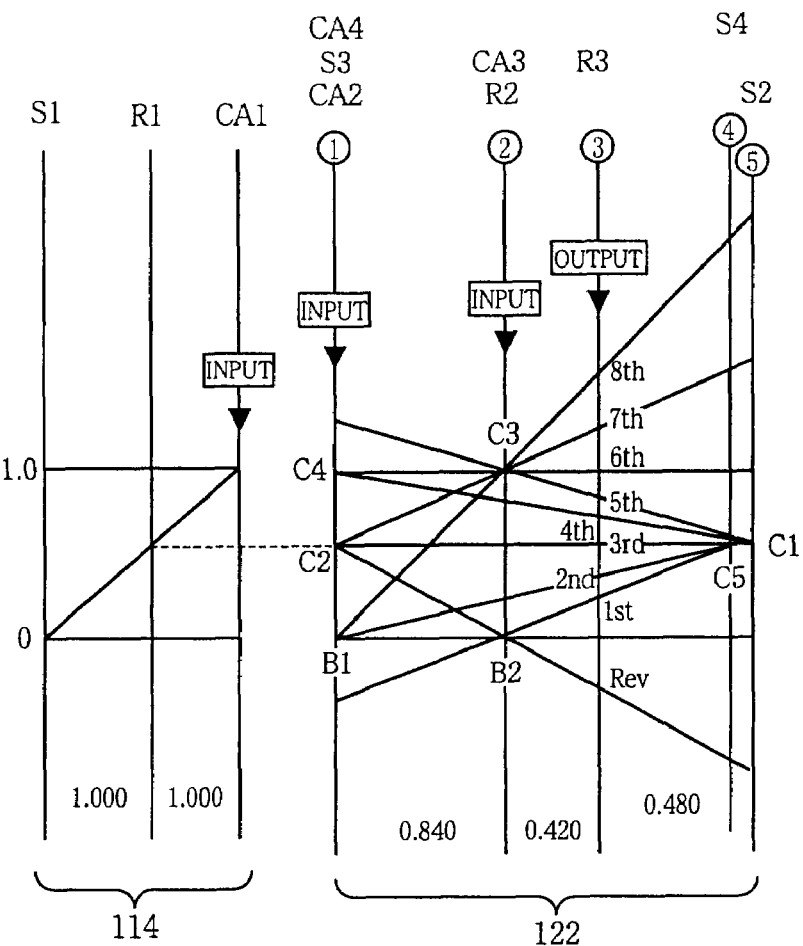
FIG. 13A is a collinear chart showing an operational relationship of the automatic transmission of FIG. 11 when a second group of operating positions of the transmission is selected.
FIG. 13B is a view indicating a relationship between the operating positions of the transmission of FIG. 11 and respective combinations of operating states of hydraulically operated frictional coupling devices, when the second group of operating positions is selected.

The eight forward-drive positions "1st" through "8th" indicated in FIGS. 12A and 12B form a first group of operating positions, wherein the first-speed, second-speed and third-speed positions "1st", "2nd" and "3rd" are established by engaging the first clutch C1 as well as the first or second brake B1, B2 or the second clutch C2. The automatic transmission 110 has a second group of operating positions wherein the first-speed, second-speed and third-speed positions "1st", "2nd" and "3rd" are established by engaging the fifth clutch C5 as well as the first or second brake B1, B2 or the second clutch C2, as indicated in FIGS. 13A and 13B, so as to rotate the fourth rotary element RM4 through the first shifting portion 114. The speed ratios of these first-speed, second-speed and third-speed positions of the second group of operating positions of FIG. 13B, which are established by engaging the fifth clutch C5, are different from those of the first group of operating positions of FIG. 12B, which are established by engaging the first clutch C1, and are determined by the position of the fourth rotary element RM4 (sun gear S4) in the direction parallel to the horizontal axis of the collinear chart of FIG. 13A. That is, the speed ratios of the first-speed, second-speed and third-speed positions are determined by a gear ratio ρ4 of the fourth planetary gear set 120.

As indicated in FIG. 13B, the first-speed position "1st" of the second group of operating positions, which has a highest speed ratio is established by the engaging actions of the fifth clutch C5 and the second brake B2, which cause deceleration of the fourth rotary element RM4 through the first shifting portion 114 and stopping of the second rotary element RM2, and the second-speed position "2nd" having a speed ratio lower than the first-speed position "1st" is established by the engaging actions of the fifth clutch C5 and the first brake B1, which cause rotation of the fourth rotary element RM4 through the first shifting portion 114 and stopping of the first rotary element RM1. Further, the third-speed position "3rd" having a speed ratio lower than the second-speed position "2nd" is established by the engaging actions of the second and fifth clutches C2, C5, which cause deceleration of the second shifting portion 122 as a unit through the first shifting portion 114. The third-speed position "3rd" may be established by the engaging action of the first clutch C1 as well as the engaging actions of the second and fifth clutches C2, C5.

As is apparent from FIG. 13B, a selected one of the eight successive forward-drive positions of the second group of operating positions can be established by engaging the appropriate combination of the two frictional coupling devices (C1-C5, B1, B2), except when the shifting takes place between the third-speed position "3rd" and the second-speed or fourth-speed position "2nd", "4th". The speed ratios of the first-speed, second-speed and third-speed positions "1st", "2nd" and "3rd" are determined by the gear ratio ρ4 of the fourth planetary gear set 120. For example, these positions "1st", "2nd" and "3rd" have the speed ratios indicated in FIG. 13B, where the gear ratio ρ4 is 0.483. Namely, the speed ratio of the third-speed position "3rd" of the second group is the same as that of the first group, but the speed ratio of the first-speed position "1st" of the second group is 4.286 slightly lower than the speed ratio of 0.5014 of the first-speed position of the first group, while the gear ratio of the eighth-speed position "8th" of the second group is 2.762 slightly lower than the speed ratio of 3.005 of the second-speed position of the first group. Accordingly, the automatic transmission 110 placed in the first-speed or second-speed position of the second group provides a smaller drive torque than in the corresponding position of the first group. The second group of operating positions of FIG. 13B has a spread (overall speed ratio range) of about 6.429, which is narrower than the spread of 7.521 of the first group of FIG. 12B.

The first group of operating positions of FIG. 12B including the first-speed, second-speed and third-speed positions established by engaging the first clutch C1 as well as the first or second brake B1, B2 or the second clutch C2 has a broader overall speed ration range, and assures a higher degree of starting and accelerating drivability of the vehicle, than the second group of operating positions of FIG. 13B including the first-speed, second-speed and third-speed positions established by engaging the fifth clutch C5 as well as the first or second brake B1, B2 or the second clutch.

The automatic transmission 110 having the two groups of operating positions as described above is also controlled by the shift control device 70 illustrated in the block diagram of FIG. 4, in the manner as described above. That is, the first or second group of operating positions is selected depending upon the selected position of the shift-position-group selector switch 86 while the MANUAL SHIFT mode is selected, and depending upon whether the POWER RUNNING mode is selected by the power-mode selector switch 80 while the MANUAL SHIFT mode is not selected. Accordingly, the shifting actions of the automatic transmission 110 of the present embodiment are controlled in a more adequate manner than those of the conventional automatic transmission.

The automatic transmission 110 according to the present fourth embodiment of this invention described above is arranged such that the fifth rotary element RM5 (first input rotary element) is selectively connected to the second input path PA2 through the first clutch C1 (first input clutch), for establishing the first-speed, second-speed, and third-speed positions "1st", "2nd" and "3rd" of the first group of operating positions of FIG. 12B, and such that the fourth rotary element RM4 (second input rotary element) is selectively connected to the second input path PA2 through the fifth clutch C5 (second input clutch), for establishing the first-, second- and third-speed positions of the second group of operating positions of FIG. 13B. The first or second group of operating positions is selected depending upon the selected position of the shift-position-group selector switch 86 while the MANUAL SHIFT mode is selected, and depending upon whether the POWER RUNNING mode is selected by the power-mode selector switch 80 while the MANUAL SHIFT mode is not selected. Accordingly, the shifting actions of the automatic transmission 110 of the present embodiment are controlled in a more adequate manner than those of the conventional automatic transmission.

Further, the rotary motion of the input shaft 124 is transmitted to the second shifting portion 122 through the first and second input paths PA1, PA2, and the first or second group of operating positions is selected by selecting the first clutch C1 or fifth clutch C5 to be engaged for transmission of the rotary motion received from the first input path PA1, so that the automatic transmission 110 can be relatively easily shifted to one of the first-speed, second-speed and third-speed positions of the selected first or second group, while the first or fifth clutch C1, C5 is held in the engaged state. Accordingly, the automatic transmission 110 can be simplified in construction and made compact, and is available at a comparatively low cost of manufacture, while permitting easy installation on the vehicle.

The fifth and fourth rotary elements RM5, RM4 connected to the second input path PA1 through the respective first and fifth clutches C1, C5 are disposed adjacent to each other, as indicated at one end of the collinear chart of FIGS. 12A and 13A as seen in the direction parallel to the horizontal axis, and the output rotary element in the form of the third rotary element RM3 is located on an inner side of a set of the fourth and fifth rotary elements RM4, RM5, while the first and second rotary elements RM1, RM2 are located on one side of the third rotary element RM3 which is remote from the fourth and fifth rotary elements RM4, RM5. In this arrangement, one of the successive operating positions (first-speed through fifth-speed positions) of the selected first or second group which have the speed ratios higher than 1.0 can be established by stopping the first and second rotary elements RM1, RM2 by the first and second brakes B1, B2, connecting these rotary elements RM1, RM2 to the second input path PA2 through the second clutch C2, or connecting the rotary elements RM1, RM2 to the first input path PA1 through the third and fourth clutches C3, C4. Thus, the first and second groups of operating positions are available with a relatively simple arrangement of the automatic transmission 110.

As described above, the first and second groups of operating positions of FIGS. 12 and 13 are different from each other, only in that the first clutch C1 as well as the first or second brake B1, B2 or the second clutch C2 is engaged for establishing the first-, second- and third-speed positions "1st", "2nd" and "3rd" of the first group, while the fifth clutch C5 as well as the first or second brake B1, B2 or the second clutch C2 is engaged for establishing those positions of the second group. Except for the engaging and releasing actions of the first and fifth clutches C1, C5, the combinations of the engaging and releasing actions of the clutches and brakes to establish the first-, second- and third-speed positions of the first group are the same as those to establish those positions of the second group. The same set of clutches and brakes is used for the two groups of operating positions. Thus, the present automatic transmission 110 can be made simpler in construction and more compact and available at a lower cost, than an automatic transmission wherein different sets of clutches and brakes are used for the respective two groups of operating positions.

In the present embodiment, the small-diameter portion of the stepped pinion 134 meshes with the sun gear S4 of the fourth planetary gear set 120, which is connected to the second input path PA2 through the fifth clutch C5 to establish the first-speed position "1st" through the fifth-speed position "5th" of the first group the speed ratios of which are higher than 1.0, and the large-diameter portion of the stepped pinion 134 meshes with the sun gear S2 of the second planetary gear set 116 which is connected to the second input path PA2 through the first clutch C5 to establish the first, second-speed and third-speed positions of the second group. This arrangement is also effective to simplify the construction and reduce the size and cost of manufacture of the present automatic transmission 110 wherein the first and second groups of operating positions are selectively available.

Further, the present automatic transmission 110 including the first shifting portion 114 and the second shifting portion 122 provides the eight forward-drive positions, with a relatively simple and compact arrangement using the three planetary gear sets 112, 116, 118, the sun gear S4 of the fourth planetary gear set 120, the five clutches C1C5 and the two brakes B1, B2, such that one of those eight successive forward-drive positions is selectable by engaging the appropriate one of eight different combinations of two frictional coupling devices selected from among the clutches C1-C5 and brakes B1, B2, so that the shifting of the automatic transmission 110 can be easily controlled with a reduced shifting shock.

In addition, the planetary gear sets 112, 116, 118, 120 have comparatively small diameters, with their gear ratios $\rho1$-$\rho4$ being kept within a range of about 0.3-0.6, and provide the eight forward-drive positions "1st" through "8th" having suitable speed ratios and stepping ratios, and an overall speed ratio range or "spread" as broad as at least 6, and the reverse-drive position "Rev" having a comparatively high speed ratio. Thus, the present automatic transmission 110 exhibits improved overall speed ratio characteristics.

Figure 14:
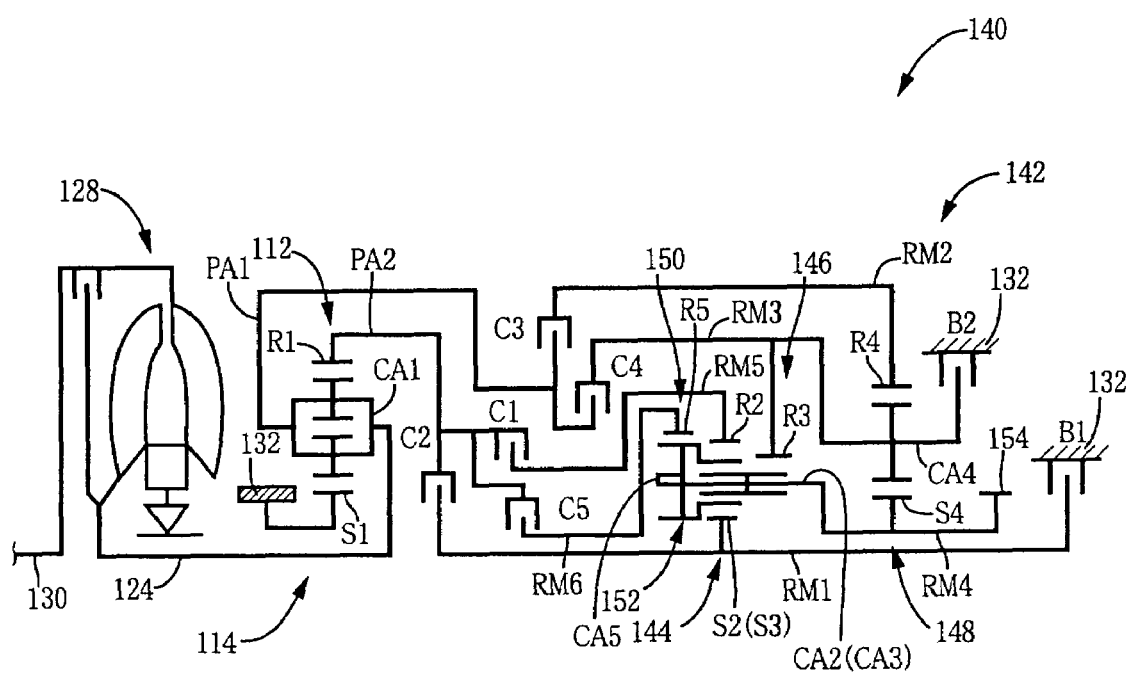
FIG. 14 is a schematic view illustrating a basic arrangement of an automatic transmission for a vehicle, which is constructed according to a fifth embodiment of the present invention.

Referring next to FIGS. 14-16 corresponding to FIGS. 1-3, there is shown a vehicle automatic transmission 140 constructed according to the fifth embodiment of this invention. The automatic transmission 140 is different from the automatic transmission 110 of the fourth embodiment, in the arrangement of the primary shifting portion in the form of a second shifting portion 142. The second shifting portion 142 is constituted principally by a second planetary gear set 144 of single-pinion type, a third planetary gear set 146 of double-pinion type, a fourth planetary gear set 148 of single-pinion type, and a fifth planetary gear set 150. The second, third, fourth and fifth planetary gear sets 144, 146, 148, 150 of the second shifting portion 142 are respectively primary first, second, third and fourth planetary gear sets. The second planetary gear set 144 has a stepped pinion 152 including a small-diameter portion functioning as its pinion gear, and a large-diameter portion meshing with a ring gear R5 of the fifth planetary gear set. This ring gear R5 corresponds to a fourth ring gear of the second or primary shifting portion 142. The second and third planetary gear sets 144, 146 have a common member functioning as their carrier CA2 and CA3, and a common member functioning as their sun gears S2 and S3. Further, the pinion gear (small-diameter portion of the stepped pinion 152) of the second planetary gear set 144 also functions as a first pinion gear of the third planetary gear set 146 (as a pinion gear meshing with the sun gear S3).

The second through fifth planetary gear sets 144, 146, 148, 150 of the second shifting portion 142 are partly connected to each other, and have a total of six rotary elements RM1-RM6. Described in detail, the sun gear S2 of the second planetary gear set 144 and the sun gear S3 of the third planetary gear set 146 are connected to each other, so as to provide the first rotary element RM1, while the ring gear R4 of the fourth planetary gear set 148 provides the second rotary element RM2. The ring gear R3 of the third planetary gear set 146 and the carrier CA4 of the fourth planetary gear set 148 are connected to each other, so as to provide the third rotary element RM3. The carrier CA2 of the second planetary gear set 144, the carrier CA3 of the third planetary gear set 146, the sun gear S4 of the fourth planetary gear set 148 and the carrier CA5 of the fifth planetary gear set 150 cooperate to provide the fourth rotary element RM4. The ring gear R2 of the second planetary gear set 144 provides the fifth rotary element, and the ring gear R5 of the fifth planetary gear set 150 provides the sixth rotary element RM6.

The first rotary element RM1 (sun gears S2 and S3) is selectively fixed to the casing 132 by the first brake B1 and is thereby selectively brought into a stationary state, and the third rotary element RM3 (ring gear R3 and carrier CA4) is selectively fixed to the casing 132 by the second brake B2 and is thereby selective brought into a stationary state. The fifth rotary element RM5 (ring gear R2) is selectively connected through the first clutch C1 to the intermediate output member in the form of the ring gear R1 of the first planetary gear set 112, that is, to the second output path PA2. The first rotary element RM1 (sun gears S2 and S3) is selectively connected through the second clutch C2 to the ring gear R1, that is, to the second input path PA2. The second rotary element RM2 (ring gear R4) is selectively connected through the third clutch C3 to the input shaft 124, that is, to the first input path PA1, and the third rotary element RM3 (ring gear R3 and carrier CA4) is selectively connected through the fourth clutch C4 to the input shaft 124, that is, to the first input path PA1. The sixth rotary element RM6 (ring gear R5) is selectively connected through the fifth clutch C5 to the ring gear R1, that is, to the second input path PA2, and the fourth rotary element RM4 (carriers CA2, CA3 and CA5 and sun gear S4) is integrally connected to the output member in the form of an output gear 154, so that the rotary motion is outputted from the automatic transmission 140 through the output gear 154. In the present fifth embodiment, the first input path PA1 is partly defined by the carrier CA1 of the first planetary gear set 112, and the first clutch C1 corresponds to a first input clutch, while the fifth clutch C5 corresponds to a second input clutch. Further, the fifth rotary element RM5 corresponds to a first input rotary element, and the sixth rotary element RM6 corresponds to a second input rotary element, while the fourth rotary element RM4 corresponds to an output rotary element.

Figures 15A, 15B:
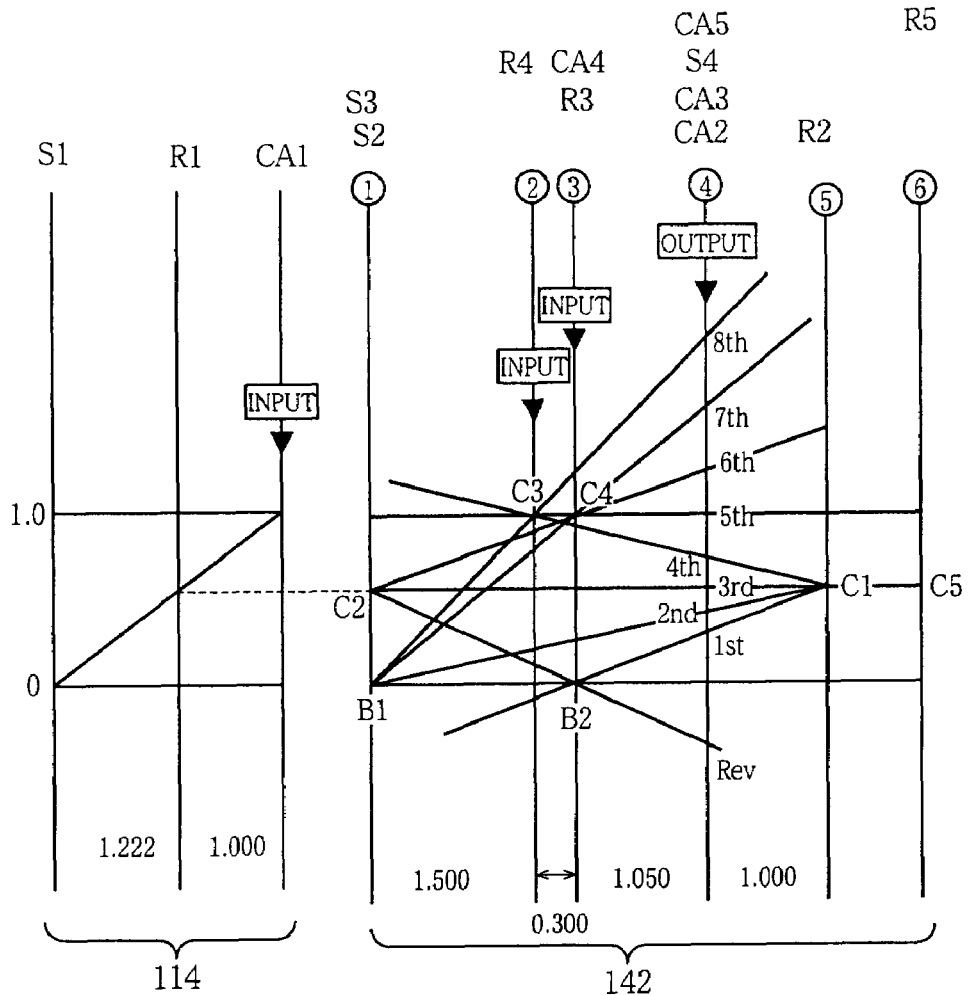
FIG. 15A is a collinear chart showing an operational relationship of the automatic transmission of FIG. 14 when a first group of operating positions of the transmission is selected.
FIG. 15B is a view indicating a relationship between the operating positions of the transmission of FIG. 14 and respective combinations of operating states of hydraulically operated frictional coupling devices, when the first group of operating positions is selected.

As indicated in FIG. 15B, the automatic transmission 140 also have the eight forward-drive positions "1st" through "8th", and the rear-drive position "Rev". As is apparent from the collinear chart of FIG. 15A, the first-speed position "1st" having the highest speed ratio is established by engaging actions of the first clutch C1 and the second brake B2, which cause deceleration of the fifth rotary element RM5 through the first shifting portion 114, and stopping of the third rotary element RM3, so that the fourth rotary element RM4 connected to the output gear 154 is rotated in the forward direction at a speed indicated by a point of intersection between the vertical straight line corresponding to the fourth rotary element RM4 and an inclined straight line indicated by "1st" in the collinear chart. The second-speed position "2nd" having a lower speed ratio than the first-speed position "1st" is established by engaging actions of the first clutch C1 and the first brake B1, which cause deceleration of the fifth rotary element RM5 through the first shifting portion 114 and stopping of the first rotary element RM1, so that the fourth rotary element RM4 is rotated at a speed indicated by a point of intersection between the vertical straight line corresponding to the fourth rotary element RM4 and an inclined straight line indicated by "2nd". The third-speed position "3rd" having a lower speed ratio than the second-speed position "2nd" is established by engaging actions of the first and second clutches C1, C2, which cause deceleration of the second shifting portion 142 as a unit through the first shifting portion 14 and stopping of the first rotary element RM1, so that the fourth rotary element RM4 is rotated at a speed indicated by a point of intersection between the vertical straight line corresponding to the fourth rotary element RM4 and an inclined line indicated by "3rd", that is, at a speed equal to that of the ring gear R1 of the first shifting portion 114. The fourth-speed position "4th" having a lower speed ratio than the third-speed position "3rd" is established by engaging actions of the first and third clutches C1, C3, which cause deceleration of the fifth rotary element RM5 through the first shifting portion 14 and rotation of the second rotary element RM2 together with the input shaft 124, so that the fourth rotary element RM4 is rotated at a speed indicated by a point of intersection between the vertical straight line corresponding to the fourth rotary element RM4 and a horizontal straight line indicated by "4th". The fourth-speed "4th" may be established by engaging actions of the first and fourth clutches C1, C4, rather than the first and third clutches C1, C3, which cause deceleration of the fifth rotary element RM5 through the first shifting portion 114 and rotation of the third rotary element RM3 together with the input shaft 124.

The fifth-speed position "5th" having a lower speed ratio than the fourth-speed position "4th" is established by engaging actions of the third and fourth clutches C3, C4, which cause rotation of the second shifting portion 142 as a unit together with the input shaft 124, so that the fourth rotary element RM4 is rotated at a speed indicated by a point of intersection between the vertical straight line corresponding to the fourth rotary element RM4 and an inclined line indicated by "5th". This fifth-speed position "5th" has a speed ratio of 1.0. The sixth-speed position "6th" having a lower speed ratio than the fifth-speed position "5th" is established by engaging actions of the second and fourth clutches C2, C4, which cause rotation of the first rotary element RM1 through the first shifting portion 114 and rotation of the third rotary element RM3 together with the input shaft 124, so that the fourth rotary element RM4 is rotated at a speed indicated by a point of intersection between the vertical straight line corresponding to the fourth rotary element RM4 and an inclined line indicated by "6th". The seventh-speed position "7th" having a lower speed ratio than the sixth-speed position "6th" is established by engaging actions of the fourth clutch C4 and the first brake B1, which cause rotation of the third rotary element RM3 together with the input shaft 124 and stopping of the first rotary element RM1, so that the fourth rotary element RM4 is rotated at a speed indicated by a point of intersection between the vertical straight line corresponding to the fourth rotary element RM4 and an inclined line indicated by "7th". The eighth-speed position "8th" having a lower speed ratio than the seventh-speed position "7th" is established by engaging actions of the third clutch C3 and the first brake B1, which cause rotation of the second rotary element RM2 together with the input shaft 124 and stopping of the first rotary element RM1, so that the fourth rotary element RM4 is rotated at a speed indicated by a point of intersection between the vertical straight line corresponding to the fourth rotary element RM4 and an inclined line indicated by "8th".

The reverse-drive position "Rev" is established by engaging actions of the second clutch C2 and the second brake B2, which cause deceleration of the first rotary element RM1 through the first shifting portion 114 and stopping of the third rotary element RM3, so that the fourth rotary element RM4 is rotated in the reverse direction, at a speed indicated by a point of intersection between the vertical straight line corresponding to the fourth rotary element RM4 and an inclined line indicated by "Rev".

Referring to FIG. 15B, there is indicated a relationship between the above-indicated nine operating positions of the automatic transmission 140 and respective combinations of operating states of the frictional coupling devices in the form of the clutches C1-C5 and brakes B1, B2. It will be understood from FIG. 15B that a selected one of the eight successive forward-drive positions can be established by engaging the appropriate combination of two frictional coupling devices selected from among the four clutches C1-C4 and two brakes B1, B2. The speed ratios of the nine operating positions are determined by gear ratios $\rho 1$-$\rho 4$ of the first, second, third and fourth planetary gear sets 112, 144, 146, 148. For example, the nine operating positions have speed ratios indicated in FIG. 15B, where the gear ratios $\rho 1$-$\rho 4$ are as follows: $\rho 1 = 0.450$, $\rho 2 = 0.351$, $\rho 3 = 0.368$, $\rho 4 = 0.286$. In this specific example, the stepping ratios of the adjacent operating positions are almost equal to each other, and the overall range of the speed ratio ("spread"=3.550/0.526) of the forward-drive positions is as broad as about 6.745. Further, the reverse-drive position "Rev" has a suitably selected speed ratio of 2.597. Thus, the automatic transmission 140 as a whole exhibits satisfactory speed ratio characteristics.

Figures 16A, 16B:
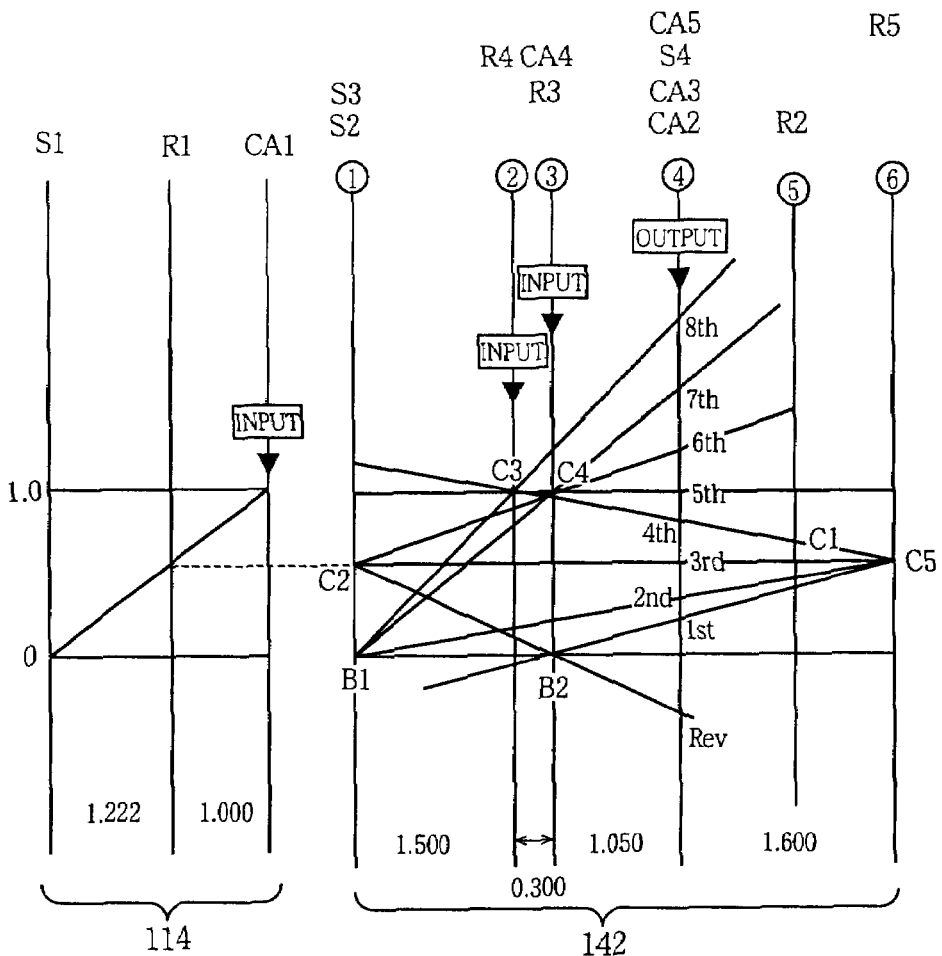
FIG. 16A is a collinear chart showing an operational relationship of the automatic transmission of FIG. 14 when a second group of operating positions of the transmission is selected.
FIG. 16B is a view indicating a relationship between the operating positions of the transmission of FIG. 14 and respective combinations of operating states of hydraulically operated frictional coupling devices, when the second group of operating positions is selected.

The eight forward-drive positions "1st" through "8th" indicated in FIGS. 15A and 15B form a first group of operating positions, wherein the first-speed through fourth-speed positions "1st" through 4th" having the speed ratios higher than 1.0 are established by engaging the first clutch C1 as well as another clutch C2, C3 or the first or second brake B1, B2. The automatic transmission 140 has a second group of operating positions wherein the first-speed through fourth-speed positions "1st" through "4th" are established by engaging the fifth clutch C5 as well as the clutch C2, C3 or brake B1, B2, as indicated in FIGS. 16A and 16B, so as to decelerate the sixth rotary element RM3 through the first shifting portion 114. The speed ratios of these first-speed through fourth-speed positions of the second group of operating positions of FIG. 16B, which are established by engaging the fifth clutch C4, are different from those of the first group of operating positions of FIG. 15B, which are established by engaging the first clutch C1, and are determined by the position of the sixth rotary element RM6 (ring gear R5) in the direction parallel to the horizontal axis of the collinear chart of FIG. 15A. That is, the speed ratios of the first-speed through fourth-speed positions of the second group are determined by the gear ratio ρ5 of the fifth planetary gear set 150. By suitably determining the gear ratio ρ5, the positions "1st" through "4th" of the second group have speed ratio characteristics different from those of the first group.

As indicated in FIG. 16B, the first-speed through fourth-speed positions "1st" through "4th" of the second group of operating positions are established by the engaging actions of the fifth clutch C5 in place of the first clutch C1, as well as the other clutch C2, C3 or the first or second brake B1, B2. Namely, the first-speed position "1st" having the highest speed ratio is established by engaging actions of the fifth clutch C5 and the second brake B2, which cause deceleration of the sixth rotary element RM6 through the first shifting portion 114 and stopping of the third rotary element RM3, and the second-speed position "2nd" is established by the engaging actions of the fifth clutch C5 and the first brake B1, which cause deceleration of the sixth rotary element RM6 through the first shifting portion 114 and stopping of the first rotary element RM1. Further, the third-speed position "3rd" is established by engaging actions of the fifth clutch C5 and the second clutch C2, which cause deceleration of the second shifting portion 142 as a unit through the first shifting portion 114, and the fourth-speed position "4th" is established by engaging actions of the fifth clutch C5 and the third clutch C3, which cause rotation of the second rotary element RM3 together with the input shaft 124 and deceleration of the sixth rotary element RM6 through the first shifting portion 114. This fourth-speed position "4th" may be established by engaging actions of the fifth clutch C5 and the fourth clutch C4, which cause rotation of the third rotary element RM3 together with the input shaft 124 and deceleration of the sixth rotary element RM6 through the first shifting portion 114.

By engaging the appropriate combination of the two frictional coupling devices (C1-C5, B1, B2), a selected one of the eight successive forward-drive positions of the second group of operating positions can be established. The speed ratios of the first-speed through fourth-speed positions "1st" through "4th" are determined by the gear ratio ρ5 of the fifth planetary gear set 150. For example, these positions "1st" through "4th" have the speed ratios indicated in FIG. 16B, where the gear ratio ρ5 is 0.561. Namely, the speed ratio of the third-speed position "3rd" of the second group is 1.818, that is, equal to that of the first group, but the speed ratio of the first-speed position "1st" is 4.589 slightly higher than the speed ratio of 3.550 of the first-speed position of the first group, and the gear ratio of the second-speed position "2nd" of the second group is 2.839 slightly higher than the speed ratio of 2.456 of the second-speed position of the first group. Accordingly, the automatic transmission 140 placed in the first-speed or second-speed position of the second group provides a larger drive torque than in the corresponding position of the first group. On the other hand, the speed ratio of the fourth-speed position "4th" of the second group is 1.259 slightly lower than the speed ratio of 1.349 of the fourth-speed position of the first group. The second group of operating positions of FIG. 16B has a spread (overall range of speed ratio) of about 8.719, which is broader than the spread of 6.745 of the first group of FIG. 15B.

The second group of operating positions of FIG. 16B including the first-speed through fourth-speed positions established by engaging the fifth clutch C5 as well as the second or third clutch C2, C3 or the first or second brake B1, B2 assures a higher degree of starting and accelerating drivability of the vehicle, than the first group of operating positions of FIG. 15B including the first-speed through fourth-speed positions established by engaging the first clutch C1 as well as the second or third clutch C2, C3 or the first or second brake B1, B2.

The automatic transmission 140 according to the present fifth embodiment of this invention described above is also arranged such that the fifth rotary element RM5 is selectively connected to the second input path PA2 through the first clutch C1, for establishing the first-speed through fourth-speed positions "1st" through "4th" of the first group of operating positions of FIG. 15B, and such that the sixth rotary element RM6 is selectively connected to the second input path PA2 through the fifth clutch C5, for establishing the first-speed through fourth-speed positions of the second group of operating positions of FIG. 16B. The first or second group of operating positions is selected depending upon the selected position of the shift-position-group selector switch 86 while the MANUAL SHIFT mode is selected, and depending upon whether the POWER RUNNING mode is selected while the MANUAL SHIFT mode is not selected. Accordingly, the shifting actions of the automatic transmission 140 of the present fifth embodiment are controlled in a more adequate manner than those of the conventional automatic transmission.

Further, the rotary motion of the input shaft 124 is transmitted to the second shifting portion 142 through the first and second input paths PA1, PA2, and the first or second group of operating positions is selected by selecting the first clutch C1 or fifth clutch C5 to be engaged for transmission of the rotary motion received from the second input path PA2, so that the automatic transmission 140 can be relatively easily shifted to a selected one of the first-speed through fourth-speed positions of the selected first or second group, while the first or fifth clutch C1, C5 is held in the engaged state. Accordingly, the automatic transmission 140 can be simplified in construction and made compact, and is available at a comparatively low cost of manufacture, while permitting easy installation on the vehicle.

The fifth and sixth rotary elements RM1, RM6 connected to the second input path PA2 through the respective first and fifth clutches C1, C5 are disposed adjacent to each other, as indicated at one end of the collinear chart of FIGS. 15A and 16A as seen in the direction parallel to the horizontal axis, and the output rotary element in the form of the fourth rotary element RM4 is located on an inner side of a set of the fifth and sixth rotary elements RM5, RM6, while the first, second and third rotary elements RM1-RM3 are located on one side of the fourth rotary element RM4 which is remote from the fifth and sixth rotary elements RM5, RM6. In this arrangement, one of the successive operating positions (first-speed through fourth-speed positions) of the selected first or second group which have the speed ratios higher than 1.0 can be established by stopping the first, second and third rotary elements RM1-RM3 by the first and second brakes B1, B2, connecting these rotary elements RM1-RM3 to the second input path PA2 through the second clutch C2, or connecting the rotary elements RM1-RM3 to the first input path PA1 through the third and fourth clutches C3, C4. Thus, the first and second groups of operating positions are available with a relatively simple arrangement of the automatic transmission 110.

As described above, the first and second groups of operating positions of FIGS. 15 and 16 are different from each other, only in that the first clutch C1 as well as the second or third clutch C2, C3 or the first or second brake B1, B2 is engaged for establishing the first-, second- third- and fourth-speed positions "1st", "2nd", "3rd" and "4th" of the first group, while the fifth clutch C5 as well as the second or third clutch C2, C3 or the first or second brake B1, B2 is engaged for establishing those positions of the second group. Except for the engaging and releasing actions of the first and fifth clutches C1, C5, the combinations of the engaging and releasing actions of the clutches and brakes to establish the first-speed through fourth-speed positions of the first group are the same as those to establish those positions of the second group. The same set of clutches and brakes is used for the two groups of operating positions. Thus, the present automatic transmission 140 can be made simpler in construction and more compact and available at a lower cost, than an automatic transmission wherein different sets of clutches and brakes are used for the respective two groups.

In the present fifth embodiment, the small-diameter portion of the stepped pinion 152 meshes with the ring gear R2 of the second planetary gear set 144, which is connected to the second input path PA2 through the first clutch C1 to establish the first-speed through fourth-speed positions "1st" through "4th" of the first group the speed ratios of which are higher than 1.0, and the large-diameter portion of the stepped pinion 152 meshes with the ring gear R5 of the fifth planetary gear set 150 which is connected to the second input path PA2 through the fifth clutch C5 to establish the first-speed through fourth-speed positions of the second group. This arrangement is also effective to simplify the construction and reduce the size and cost of manufacture of the present automatic transmission 140 wherein the first and second groups of operating positions are selectively available.

Further, the present automatic transmission 140 including the first shifting portion 114 and the second shifting portion 142 provides the eight forward-drive positions, with a relatively simple and compact arrangement using the four planetary gear sets 112, 144, 146, 148, the ring gear R4 of the fifth planetary gear set 150, the five clutches C1-C5 and the two brakes B1, B2, such that one of those eight successive forward-drive positions is selectable by engaging the appropriate one of eight different combinations of two frictional coupling devices selected from among the clutches C1-C5 and brakes B1, B2, so that the shifting of the automatic transmission 140 can be easily controlled with a reduced shifting shock.

In addition, the planetary gear sets 112, 144, 146, 150 have comparatively small diameters, with their gear ratios ρ1-ρ5 being kept within a suitably determined range, and provide the eight forward-drive positions "1st" through "8th" having suitable speed ratios and stepping ratios, and an overall speed ratio range (spread) of at least 6, and the reverse-drive position "Rev" having a comparatively high speed ratio. Thus, the present automatic transmission 50 exhibits improved overall speed ratio characteristics.

Although the automatic transmissions 10, 40, 50 according to the first, second and third embodiments have the eight forward-drive positions, the automatic transmissions 10, 40, 50 may be modified to have seven or smaller forward-drive positions including two positions corresponding to the seventh-speed and eighth-speed positions "7th" and "8th". For instance, the automatic transmission 10, 40, 50 may be modified to have seven forward-drive positions corresponding to the second-speed position "2nd" through the eighth-speed position "8th".

On the other hand, the automatic transmissions 110, 140 according to the fourth and fifth embodiments may be modified to have seven or smaller forward-drive positions, such as the first-speed through seventh-speed positions "1st" through "7th", the second-speed through eighth-speed positions "2nd" through "8th", or the first-speed through sixth-speed positions "1st" through "6th" and eighth-speed position "8th".

It is to be understood that the present invention may be embodied with various other changes, modifications and improvements, which may occur to those skilled in the art, in the light of the technical teachings of the present invention which have been described.

The invention claimed is:
1. An automatic transmission comprising:
an input member; and
a primary shifting portion having a plurality of operating positions and including an output member,
a plurality of planetary gear sets,
a plurality of clutches, and
a plurality of brakes, the plurality of planetary gear sets having a plurality of rotary elements which include an output rotary element connected to said output member and which are connected to each other such that the rotary elements are rotated relative to each other in predetermined relationships with each other, the automatic transmission having a first input path for transmitting a rotary motion of said input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member,
said primary shifting portion including at least four rotary elements including a first input rotary element and a second input rotary element, said plurality of clutches including a first input clutch for selectively connecting said first input rotary element to said second input path, and a second input clutch for selectively connecting said second input rotary element to said second input path;
said primary shifting portion having a first group of successive operating positions for outputting a rotary motion a speed of which is lower than a speed of the rotary motion received from the first input path, the successive operating positions of said first group being established with said first input rotary element being connected to said second input path by an engaging action of said first input clutch and a releasing action of said second input clutch, and by controlling engaging and releasing actions of the other of said plurality of clutches and said plurality of brakes;
said primary shifting portion having a second group of successive operating positions for outputting a rotary motion a speed of which is lower than the speed of the rotary motion received from the first input path, the successive operating positions of said second group being established with said second input rotary element being connected to said second input path by an engaging action of said second input clutch and a releasing action of said first input clutch, and by controlling engaging and releasing actions of the other of said plurality of clutches and said plurality of brakes, the successive operating positions of said second group having respective speed ratios different from those of the successive operating positions of said first group; and the automatic transmission being shiftable to a selected one of the successive operating positions of a selected one of said first and second groups.

2. The automatic transmission according to claim 1, wherein one of said first and second groups of successive operating positions is selected by a shift control device, and the automatic transmission is shifted to a selected one of the successive operating position of the selected group, under the control of said shift control device.

3. The automatic transmission according to claim 1, wherein said second input path is partially defined by a first planetary gear set having three rotary elements consisting of a first element which is connected to and rotated by said input member, a second element which is held stationary, and a third element which functions as an intermediate output member a rotary motion of which is transmitted to said primary shifting portion such that a speed of the rotary motion received from the input member is lowered during transmission of the rotary member through the second input path, and wherein said first input path is arranged such that the rotary motion of the input member is transmitted through said first input path to said primary shifting portion at a speed ratio of 1.0.

4. The automatic transmission according to claim 1, wherein combinations of operating states of said plurality of clutches and said plurality of brakes to establish the successive operating positions of the first group are the same as those to establish the successive operating positions of the second group, except for the operating states of said first and second input clutches.

5. The automatic transmission according to claim 1, wherein said plurality of brakes includes a first brake that selectively brings a first rotary element into a stationary state, and a second brake that selectively brings a second rotary element into a stationary state, a third rotary element being connected to said output member, and wherein a fifth, fourth and said third rotary elements respectively serve as said first input rotary element, said second input rotary element and said output rotary element, and said plurality of clutches includes at least fie clutches, wherein first and fifth clutches respectively serve as said first and second input clutches.

6. The automatic transmission according to claim 5, wherein said plurality of positions of said primary shifting portion include a plurality of operating positions selected from among a first-speed position which is established by engaging actions of said first or fifth clutch and said second brake and which has a highest speed ratio, a second-speed position which is established by engaging actions of said first or fifth clutch and said first brake and which has a speed ratio lower than the first-speed position, a third-speed position which is established by engaging actions of at least two of said first, second and fifth clutches and which has a speed ratio lower than the second-speed position, a fourth-speed position which is established by engaging actions of said first or fifth clutch and said fourth clutch and which has a speed ratio lower than the third-speed position, a fifth-speed position which is established by engaging actions of said first or fifth clutch and said third clutch and which has a speed ratio lower than the fourth-speed position, a sixth-speed position which is established by engaging actions of said third and fourth clutches and which has a speed ratio lower than the fifth-speed position, a seventh-speed position which is established by engaging actions of said second and third clutches and which has a speed ratio lower than the sixth-speed position, and an eighth-speed position which is established by engaging actions of said third clutch and said first brake and which has a speed ratio lower than the seventh-speed position, and wherein said first group of successive operating positions consist of a plurality of successive positions selected from among said first-speed through fifth-speed positions, each of said plurality of successive positions being established by the engaging action of said first clutch serving as said first input clutch, and the engaging action of another of said plurality of clutches or one of said plurality of brakes, and said second group of successive operating positions consist of said plurality of successive positions each of which is established by the engaging action of said fifth clutch serving as said second input clutch, and the engaging action of said another of said plurality of clutches and said one of said plurality of brakes.

7. The automatic transmission according to claim 5, wherein said primary shifting portion includes a primary first planetary gear set of double-pinion type, a primary second planetary gear set of single-pinion type, and a primary third planetary gear set, and wherein said first rotary element includes a carrier of said primary first planetary gear set that is connected to a sun gear of said primary second planetary gear set and that is connected to a carrier of said primary third planetary gear set, said second rotary element includes a ring gear of said primary first planetary gear set that is connected to a carrier of said primary second planetary gear set, said third rotary element is a ring gear of said primary second planetary gear set, said fourth rotary element is a sun gear of said primary third planetary gear set, and said fifth rotary element is a sun gear of said primary first planetary gear set.

8. The automatic transmission according to claim 7, wherein said primary first planetary gear set has a stepped pinion which has a large-diameter portion meshing with a ring gear of a primary fourth planetary gear set, and a small-diameter portion which serve a pinion gear of the primary first planetary gear set.

9. The automatic transmission according to claim 7, wherein said primary first planetary gear set includes stepped pinion that includes a large-diameter portion that that meshes with a sun gear of said primary first planetary gear set, and that includes a small-diameter portion that meshes with a sun gear of said primary third planetary gear set.

10. The automatic transmission according to claim 1, wherein said primary shifting portion has six rotary elements consisting of a first rotary element, a second rotary element, a third rotary element, a fourth rotary element, a fifth rotary element, and a sixth rotary element, which are arranged according to a collinear chart having a vertical axis and a horizontal axis and wherein relative rotating speeds of said five rotary elements are taken along respective six straight lines parallel to said vertical axis, which six straight lines are spaced apart from each other in a direction parallel to said horizontal axis from one of opposite ends of the collinear chart toward the other end, such that distances between adjacent ones of said six straight lines in said direction are determined by gear ratios of said plurality of planetary gear sets, said plurality of clutches consisting of a first clutch through which said fifth rotary element is selectively connected to said second input path, a second clutch through which said first rotary element is selectively connected to said second input path, a third clutch through which said second rotary element is selectively connected to said first input path, a fourth clutch through which said third rotary element is selectively connected to said first input path, and a fifth clutch through which said sixth rotary element is selectively connected to said second input path, said plurality of brakes consisting of a first brake by which said first rotary element is selectively brought into a stationary state, and a second brake by which said third rotary element is selectively brought into a stationary state, said third rotary element being connected to said output member, and wherein said fifth, sixth and fourth rotary elements respectively serve as said first input rotary element, said second input rotary element and said output rotary element, and said first and second clutches respectively serve as said first and second input clutches.

11. The automatic transmission according to claim 10, wherein said plurality of operating positions of said primary shifting portion include a plurality of positions selected from among a first-speed position which is established by engaging actions of said first or fifth clutch and said second brake and which has a highest speed ratio, a second-speed position which is established by engaging actions of said first or fifth clutch and said first brake and which has a speed ratio lower than the first-speed position, a third-speed position which is established by engaging actions of at least two of said first, second and third clutches and which has a speed ratio lower than the second-speed position, a fourth-speed position which is established by engaging actions of said first or second clutches and said third or fourth clutch and which has a speed ratio lower than the third-speed position, a fifth-speed position which is established by engaging actions of said third and fourth clutches and which has a speed ratio lower than the fourth-speed position, a sixth-speed position which is established by engaging actions of said second and fourth clutches and which has a speed ratio lower than the fifth-speed position, a seventh-speed position which is established by engaging actions of said fourth clutch and said second brake and which has a speed ratio lower than the sixth-speed position, and an eighth-speed position which is established by engaging actions of said third clutch and said first brake and said first brake and which has a speed ratio lower than the seventh-speed position, and wherein said first group of successive operating positions consist of a plurality of successive positions selected from among said first-speed through fourth-speed positions, each of said plurality of successive positions being established by the engaging action of said first clutch serving as said first input clutch, and the engaging action of another of said plurality of clutches or one of said plurality of brakes, and said second group of successive operating positions consist of said plurality of successive positions each of which is established by the engaging action of said fifth clutch serving as said second input clutch, and the engaging action of said another of said plurality of clutches and said one of said plurality of brakes.

12. The automatic transmission according to claim 10, wherein said primary shifting portion includes a primary first planetary gear set of single-pinion type, a primary second planetary gear set of double-pinion type, a primary third planetary gear set of single-pinion type, and a primary fourth planetary gear set, and wherein said first rotary element consists of mutually connected sun gears of said primary first and second planetary gear sets, said second rotary element consisting of a ring gear of said primary third planetary gear set, said third rotary element consisting of a ring gear of said primary second planetary gear set and a carrier of said primary third planetary gear set, which are connected to each other, said fourth rotary element consisting of carriers of said primary first, second and fourth planetary gear sets and a sun gear of said primary third planetary gear set, which are connected to each other, said fifth rotary element consisting of a ring gear of said primary first planetary gear set, and said sixth rotary element consisting of a ring gear of said primary fourth planetary gear set.

13. The automatic transmission according to claim 12, wherein said primary first planetary gear set has a stepped pinion having a large-diameter portion and a small-diameter portion one of which functions as a pinion gear of said primary first planetary gear set, and the other of which meshes with the ring gear of said primary fourth planetary gear set.

14. An automatic transmission comprising
an input member; and
a primary shifting portion having a plurality of operating positions and including an output member,
a plurality of planetary gear sets,
a plurality of clutches, and
a plurality of brakes, the plurality of planetary gear sets having a plurality of rotary elements which include an output rotary element connected to said output member and which are connected to each other such that the rotary elements are rotated relative to each other in predetermined relationships with each other, the automatic transmission having a first input path for transmitting a rotary motion of said input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member,
said primary shifting portion includes at least four rotary elements including a first input rotary element, a second input rotary element, a first intermediate rotary element, and a second intermediate rotary element said plurality of clutches including a first input clutch that selectively connects said first input rotary element to said second input path, and a second input clutch that selectively connects said second input rotary element to said second input path; and
each of said first and second intermediate rotary elements are selectively connected to said first input path and/or said second input path by at least one of said plurality of clutches other than said first and second input clutches or brought into a stationary state by at least one of said plurality of brakes,
wherein said at least four rotary elements are arranged in said primary shifting portion such that when the relationships among the rotating speeds of said at least rotary elements and said output member are plotted on a two-dimensional coordinate system that includes a vertical axis, a horizontal axis and relative rotating speeds of said at least four rotary elements and said output member respectively plotted as five straight lines parallel to the vertical axis, the five straight lines are spaced apart in a horizontal direction that is parallel to the horizontal axis such that distances between adjacent ones of the five straight lines are determined by gear ratios of said plurality of gear sets, such that two of the five straight lines that correspond to said first and second input rotary elements are plotted on a first side with respect to the horizontal direction of one of the five straight lines that corresponds to said output member, and such that two of the five straight lines that correspond to said first and second intermediate rotary elements are plotted on a second side opposite to the first side with respect to the horizontal direction of the one of the five straight lines that corresponds to said output member.

15. The automatic transmission according to claim 14, wherein said first and second input rotary elements are ring gears or sun gears of two adjacent ones of said plurality of planetary gear sets, said two adjacent planetary gear sets having a common stepped pinion which has a large-diameter portion and a small-diameter portion, said ring gears or sun gears of the two adjacent planetary gear sets each respectively meshing with of said large-diameter or small-diameter portions.

16. The automatic transmission according to claim 14, wherein said second input path is partially defined by a first planetary gear set having three rotary elements consisting of a first element which is connected to and rotated by said input member, a second element which is held stationary, and a third element which functions as an intermediate output member a rotary motion of which is transmitted to said primary shifting portion such that a speed of the rotary motion received from the input member is lowered during transmission of the rotary member through the second input path, and wherein said first input path is arranged such that the rotary motion of the input member is transmitted through said first input path to said primary shifting portion at a speed ratio of 1.0.

17. The automatic transmission according to claim 2, wherein said primary shifting portion has a first group of successive operating positions for outputting a rotary motion a speed of which is lower than a speed of the rotary motion received from the first input path, the successive operating positions of said first group being established by an engaging action of said first input clutch, together with an engaging action of said at least one clutch corresponding to said first or second intermediate rotary element, and an engaging action of said at least one brake corresponding to said first or second intermediate rotary element, respectively, and wherein said primary shifting portion has a second group of successive operating positions for outputting a rotary motion a speed of which is lower than the speed of the rotary motion received from the first input path, the successive operating positions of said second group being established by an engaging action of said second input clutch, together with the engaging action of said at least one clutch corresponding to the first or second intermediate rotary element, and the engaging action of said at least one brake corresponding to the first or second intermediate rotary element, respectively, the successive operating positions of said second group having respective speed ratios different from those of the successive operating positions of said first group, the automatic transmission being shiftable to a selected one of the successive operating positions of a selected one of said first and second groups.

18. The automatic transmission according to claim 17, wherein combinations of engaging and releasing actions of said plurality of clutches and said plurality of brakes to establish the successive operating positions of the first group are the same as those to establish the successive operating positions of the second group, except for the engaging and releasing actions of said first and second input clutches.

19. The automatic transmission according to claim 17, wherein one of said first and second groups of successive operating positions is selected by a shift control device, and the automatic transmission is shifted to a selected one of the successive operating position of the selected group, under the control of said shift control device.

20. The automatic transmission according to claim 17, wherein said primary shifting portion includes five rotary elements, said five rotary elements including a first rotary element, a second rotary element, a third rotary element, a fourth rotary element, and a fifth rotary element, said plurality of clutches including a first clutch through which said fifth rotary element is selectively connected to said second input path, a second clutch through which said first rotary element is selectively connected to said second input path, a third clutch through which said second rotary element is selectively connected to said first input path, a fourth clutch through which said first rotary element is selectively connected to said first input path, and a fifth clutch through which said fourth rotary element is selectively connected to said second input path, said plurality of brakes including a first brake by which said first rotary element is selectively brought into a stationary state, and a second brake by which said second rotary element is selectively brought into a stationary state, said third rotary element being connected to said output member, and wherein said fifth, fourth and third rotary elements respectively serve as said first input rotary element, said second input rotary element and said output rotary element, and said first and fifth clutches respectively serve as said first and second input clutches.

21. The automatic transmission according to claim 20, wherein said plurality of positions of said primary shifting portion include a plurality of operating positions selected from among a first-speed position which is established by engaging actions of said first or fifth clutch and said second brake and which has a highest speed ratio, a second-speed position which is established by engaging actions of said first or fifth clutch and said first brake and which has a speed ratio lower than the first-speed position, a third-speed position which is established by engaging actions of at least two of said first, second and fifth clutches and which has a speed ratio lower than the second-speed position, a fourth-speed position which is established by engaging actions of said first or fifth clutch and said fourth clutch and which has a speed ratio lower than the third-speed position, a fifth-speed position which is established by engaging actions of said first or fifth clutch and said third clutch and which has a speed ratio lower than the fourth-speed position, a sixth-speed position which is established by engaging actions of said third and fourth clutches and which has a speed ratio lower than the fifth-speed position, a seventh-speed position which is established by engaging actions of said second and third clutches and which has a speed ratio lower than the sixth-speed position, and an eighth-speed position which is established by engaging actions of said third clutch and said first brake and which has a speed ratio lower than the seventh-speed position, and wherein said first group of successive operating positions consist of a plurality of successive positions selected from among said first-speed through fifth-speed positions, each of said plurality of successive positions being established by the engaging action of said first clutch serving as said first input clutch, and the engaging action of another of said plurality of clutches or one of said plurality of brakes, and said second group of successive operating positions consist of said plurality of successive positions each of which is established by the engaging action of said fifth clutch serving as said second input clutch, and the engaging action of said another of said plurality of clutches and said one of said plurality of brakes.

22. The automatic transmission according to claim 20, wherein said primary shifting portion includes a primary first planetary gear set of double-pinion type, a primary second planetary gear set of single-pinion type, and a primary third planetary gear set, and wherein said first rotary element includes a carrier of said primary first planetary gear set that is connected to a sun gear of said primary second planetary gear set and that is connected to a carrier of said primary third planetary gear set, said second rotary element includes a ring gear of said primary first planetary gear set that is connected to a carrier of said primary second planetary gear set, said third rotary element is a ring gear of said primary second planetary gear set, said fourth rotary element is a sun gear of said primary third planetary gear set, and said fifth rotary element is a sun gear of said primary first planetary gear set.

23. The automatic transmission according to claim 22, wherein said primary first planetary gear set includes stepped pinion that includes a large-diameter portion that that meshes with a sun gear of said primary first planetary gear set, and that includes a small-diameter portion that meshes with a sun gear of said primary third planetary gear set.

24. The automatic transmission according to claim 17, wherein said primary shifting portion has six rotary elements including a first rotary element, a second rotary element, a third rotary element, a fourth rotary element, a fifth rotary element, and a sixth rotary element, said plurality of clutches including a first clutch through which said fifth rotary element is selectively connected to said second input path, a second clutch through which said first rotary element is selectively connected to said second input path, a third clutch through which said second rotary element is selectively connected to said first input path, a fourth clutch through which said third rotary element is selectively connected to said first input path, and a fifth clutch through which said sixth rotary element is selectively connected to said second input path, said plurality of brakes consisting of a first brake by which said first rotary element is selectively brought into a stationary state, and a second brake by which said third rotary element is selectively brought into a stationary state, said third rotary element being connected to said output member, and wherein said fifth, sixth and fourth rotary elements respectively serve as said first input rotary element, said second input rotary element and said output rotary element, and said first and second clutches respectively serve as said first and second input clutches.

25. The automatic transmission according to claim 24, wherein said plurality of operating positions of said primary shifting portion include a plurality of positions selected from among a first-speed position which is established by engaging actions of said first or fifth clutch and said second brake and which has a highest speed ratio, a second-speed position which is established by engaging actions of said first or fifth clutch and said first brake and which has a speed ratio lower than the first-speed position, a third-speed position which is established by engaging actions of at least two of said first, second and third clutches and which has a speed ratio lower than the second-speed position, a fourth-speed position which is established by engaging actions of said first or second clutches and said third or fourth clutch and which has a speed ratio lower than the third-speed position, a fifth-speed position which is established by engaging actions of said third and fourth clutches and which has a speed ratio lower than the fourth-speed position, a sixth-speed position which is established by engaging actions of said second and fourth clutches and which has a speed ratio lower than the fifth-speed position, a seventh-speed position which is established by engaging actions of said fourth clutch and said second brake and which has a speed ratio lower than the sixth-speed position, and an eighth-speed position which is established by engaging actions of said third clutch and said first brake and said first brake and which has a speed ratio lower than the seventh-speed position, and wherein said first group of successive operating positions consist of a plurality of successive positions selected from among said first-speed through fourth-speed positions, each of said plurality of successive positions being established by the engaging action of said first clutch serving as said first input clutch, and the engaging action of another of said plurality of clutches or one of said plurality of brakes, and said second group of successive operating positions consist of said plurality of successive positions each of which is established by the engaging action of said fifth clutch serving as said second input clutch, and the engaging action of said another of said plurality of clutches and said one of said plurality of brakes.

26. The automatic transmission according to claim 24, wherein said primary shifting portion includes a primary first planetary gear set of single-pinion type, a primary second planetary gear set of double-pinion type, a primary third planetary gear set of single-pinion type, and a primary fourth planetary gear set, and wherein said first rotary element consists of mutually connected sun gears of said primary first and second planetary gear sets, said second rotary element consisting of a ring gear of said primary third planetary gear set, said third rotary element consisting of a ring gear of said primary second planetary gear set and a carrier of said primary third planetary gear set, which are connected to each other, said fourth rotary element consisting of carriers of said primary first, second and fourth planetary gear sets and a sun gear of said primary third planetary gear set, which are connected to each other, said fifth rotary element consisting of a ring gear of said primary first planetary gear set, and said sixth rotary element consisting of a ring gear of said primary fourth planetary gear set.

27. The automatic transmission according to claim 26, wherein said primary first planetary gear set has a stepped pinion having a large-diameter portion and a small-diameter portion one of which functions as a pinion gear of said primary first planetary gear set, and the other of which meshes with the ring gear of said primary fourth planetary gear set.

28. An automatic transmission comprising:
an input member; and
a primary shifting portion having a plurality of operating positions and including an output member,
a plurality of planetary gear sets, a plurality of clutches, and a plurality of brakes, the plurality of planetary gear sets having a plurality of rotary elements which include an output rotary element connected to said output member and which are connected to each other such that the rotary elements are rotated relative to each other in predetermined relationships with each other, the automatic transmission having a first input path for transmitting a rotary motion of said input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, said primary shifting portion including at least four rotary elements including a first input rotary element and a second input rotary element, said plurality of clutches including a first input clutch for selectively connecting said first input rotary element to said second input path, and a second input clutch for selectively connecting said second input rotary element to said second input path;

said primary shifting portion having a first group of successive operating positions for outputting a rotary motion a speed of which is lower than a speed of the rotary motion received from the first input path, the successive operating positions of said first group being established by an engaging action of said first input clutch and a releasing action of said second input clutch, for connection of said first input rotary element to said second input path, and by controlling engaging and releasing actions of the other of said plurality of clutches and said plurality of brakes;

said primary shifting portion having a second group of successive operating positions for outputting a rotary motion a speed of which is lower than the speed of the rotary motion received from the first input path, the successive operating positions of said second group being established by an engaging action of said second input clutch and a releasing action of said first input clutch, for connection of said second input rotary element through said second input path, and by controlling engaging and releasing actions of the other of said plurality of clutches and said plurality of brakes, the successive operating positions of said second group having respective speed ratios different from those of the successive operating positions of said first group; and the automatic transmission being shiftable to a selected one of the successive operating positions of a selected one of said first and second groups, wherein said first and second input rotary elements are ring gears or sun gears of two adjacent ones of said plurality of planetary gear sets, said two adjacent planetary gear sets having a common stepped pinion which has a large-diameter portion and a small-diameter portion, said ring gears or sun gears of the two adjacent planetary gear sets each respectively meshing with one of said large-diameter or small-diameter portions.

29. An automatic transmission comprising:

an input member; and a primary shifting portion having a plurality of operating positions and including an output member, a plurality of planetary gear sets, a plurality of clutches, and a plurality of brakes, the plurality of planetary gear sets having a plurality of rotary elements which include an output rotary element connected to said output member and which are connected to each other such that the rotary elements are rotated relative to each other in predetermined relationships with each other, the automatic transmission having a first input path for transmitting a rotary motion of said input member at a predetermined first speed ratio, and a second input path for transmitting the rotary motion of the input member at a predetermined second speed ratio higher than the first speed ratio, such that a speed of the rotary motion received from the input member is lowered during transmission of the rotary motion through the second input path, the clutches being selectively engaged to connect selected ones of the rotary elements to the first or second input path, and the brakes being selectively engaged to hold selected ones of the rotary elements in a stationary state, so that a selected one of the operating positions is established by controlling engaging and releasing actions of the clutches and brakes, whereby the rotary motion of the output rotary element connected to the output member is transmitted from the primary shifting portion through the output member, wherein said primary shifting portion includes a primary first planetary gear set of double-pinion type, a primary second planetary gear set of single-pinion type, and a primary third planetary gear set, and has five rotary elements that include a first rotary element, a second rotary element, a third rotary element, a fourth rotary element and a fifth rotary element, wherein said first rotary element includes a carrier of said primary first planetary gear set, a sun gear of said primary second planetary gear set and a carrier of said primary third planetary gear set, which are connected to each other, said second rotary element including a ring gear of said primary first planetary gear set and a carrier of said primary second planetary gear set, which are connected to each other, said third rotary element being a ring gear of said primary second planetary gear set, said fourth rotary element being a sun gear of said primary third planetary gear set, said fifth rotary element being a sun gear of said primary first planetary gear set, and wherein said plurality of clutches includes a first clutch through which said fifth rotary element is selectively connected to said second input path, a second clutch through which said first rotary element is selectively connected to said second input path, a third clutch through which said second rotary element is selectively connected to said first input path, a fourth clutch through which said first rotary element is selectively connected to said first input path, and a fifth clutch through which said fourth rotary element is selectively connected to said second input path, said plurality of brakes includes a first brake by which said first rotary element is selectively brought into a stationary state, and a second brake by which said second rotary element is selectively brought into a stationary state, said third rotary element being connected to said output member.

30. The automatic transmission according to claim 29, wherein said plurality of positions of said primary shifting portion include a plurality of operating positions selected from among a first-speed position which is established by engaging actions of said first or fifth clutch and said second brake and which has a highest speed ratio, a second-speed position which is established by engaging actions of said first or fifth clutch and said first brake and which has a speed ratio lower than the first-speed position, a third-speed position which is established by engaging actions of at least two of said first, second and fifth clutches and which has a speed ratio lower than the second-speed position, a fourth-speed position which is established by engaging actions of said first or fifth clutch and said fourth clutch and which has a speed ratio lower than the third-speed position, a fifth-speed position which is established by engaging actions of said first or fifth clutch and said third clutch and which has a speed ratio lower than the fourth-speed position, a sixth-speed position which is established by engaging actions of said third and fourth clutches and which has a speed ratio lower than the fifth-speed position, a seventh-speed position which is established by engaging actions of said second and third clutches and which has a speed ratio lower than the sixth-speed position, and an eighth-speed position which is established by engaging actions of said third clutch and said first brake and which has a speed ratio lower than the seventh-speed position, and wherein said first group of successive operating positions consist of a plurality of successive positions selected from among said first-speed through fifth-speed positions, each of said plurality of successive positions being established by the engaging action of said first clutch serving as said first input clutch, and the engaging action of another of said plurality of clutches or one of said plurality of brakes, and said second group of successive operating positions consist of said plurality of successive positions each of which is established by the engaging action of said fifth clutch serving as said second input clutch, and the engaging action of said another of said plurality of clutches and said one of said plurality of brakes.

31. The automatic transmission according to claim 29, wherein said second input path is partially defined by a first planetary gear set having three rotary elements consisting of a first element which is connected to and rotated by said input member, a second element which is held stationary, and a third element which functions as an intermediate output member a rotary motion of which is transmitted to said primary shifting portion such that a speed of the rotary motion received from the input member is lowered during transmission of the rotary member through the second input path, and wherein said first input path is arranged such that the rotary motion of the input member is transmitted through said first input path to said primary shifting portion at a speed ratio of 1.0.

32. The automatic transmission according to claim 29, wherein said primary first planetary gear set includes stepped pinion that includes a large-diameter portion that meshes with a sun gear of said primary first planetary gear set, and that includes a small-diameter portion that meshes with a sun gear of said primary third planetary gear set.

* * * * *